United States Patent
Anand et al.

(10) Patent No.: US 9,137,165 B2
(45) Date of Patent: Sep. 15, 2015

(54) METHODS OF LOAD BALANCING USING PRIMARY AND STAND-BY ADDRESSES AND RELATED LOAD BALANCERS AND SERVERS

(71) Applicant: TELEFONAKTIEBOLAGET L M ERICSSON (PUBL), Stockholm (SE)

(72) Inventors: Prashant Anand, Bangalore (IN); Mustafa Arisoylu, San Jose, CA (US); Jayasenan Sundara Ganesh, Cupertino, CA (US); Nandan Mahadeo Sawant, Stanford, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 235 days.

(21) Appl. No.: 13/919,411

(22) Filed: Jun. 17, 2013

(65) Prior Publication Data

US 2014/0369204 A1    Dec. 18, 2014

(51) Int. Cl.
*H04L 12/803* (2013.01)
*H04L 29/08* (2006.01)
*H04L 12/819* (2013.01)

(52) U.S. Cl.
CPC ........ *H04L 47/125* (2013.01); *H04L 29/08144* (2013.01); *H04L 29/08153* (2013.01); *H04L 29/08234* (2013.01); *H04L 47/21* (2013.01)

(58) Field of Classification Search
None
See application file for complete search history.

(56) References Cited

U.S. PATENT DOCUMENTS

| | | | |
|---|---|---|---|
| 5,960,431 A | 9/1999 | Choy | |
| 6,282,605 B1 | 8/2001 | Moore | |
| 6,601,084 B1 * | 7/2003 | Bhaskaran et al. | 718/105 |
| 6,944,678 B2 | 9/2005 | Lu et al. | |
| 7,321,926 B1 | 1/2008 | Zhang et al. | |
| 7,328,237 B1 * | 2/2008 | Thubert et al. | 709/203 |
| 7,647,424 B2 | 1/2010 | Kim et al. | |
| 7,653,700 B1 | 1/2010 | Bahl et al. | |
| 7,808,897 B1 | 10/2010 | Mehta et al. | |
| 7,822,871 B2 | 10/2010 | Stolorz et al. | |
| 7,908,605 B1 | 3/2011 | Graupner et al. | |
| 8,136,025 B1 | 3/2012 | Zhu et al. | |
| 8,547,878 B2 | 10/2013 | Sundararaman et al. | |
| 8,929,374 B2 | 1/2015 | Tonsing et al. | |
| 2002/0032798 A1 * | 3/2002 | Xu | 709/238 |

(Continued)

OTHER PUBLICATIONS

Mori T. et al., "Identifying Elephant Flows Through Periodically Sampled Packets," In *Proceedings of the 4th ACM SIGCOMM conference on Internet measurement* (IMC '04). ACM, New York, NY, USA, Oct. 2004, pp. 115-120.

Ben Fredj S. et al., "Statistical Bandwidth Sharing: A Study of Congestion at Flow Level," In Proceedings of ACM SIGCOMM, pp. 111-122, Aug. 2001.

(Continued)

*Primary Examiner* — Christopher Crutchfield

(57) ABSTRACT

A first data packet of a data flow may be addressed to a primary address and include information for the data flow and a bucket ID may be computed based on the information. Responsive to the bucket ID mapping to first and second servers and the first data packet being addressed to the primary address, the first data packet may be transmitted to the first server. A second data packet may be received addressed to a stand-by address and including the information for the data flow, and a bucket ID may be computed based on the information with the bucket IDs for the first and second packets being the same. Responsive to the bucket ID for the second data packet mapping to first and second servers and the second data packet being addressed to the stand-by address, the second data packet may be transmitted to the second server.

21 Claims, 25 Drawing Sheets

(56) References Cited

U.S. PATENT DOCUMENTS

| | | |
|---|---|---|
| 2002/0194342 A1 | 12/2002 | Lu et al. |
| 2002/0194345 A1 | 12/2002 | Lu et al. |
| 2002/0194350 A1 | 12/2002 | Lu et al. |
| 2003/0065762 A1 | 4/2003 | Stolorz et al. |
| 2006/0233106 A1 | 10/2006 | Achlioptas |
| 2006/0288119 A1 | 12/2006 | Kim et al. |
| 2009/0201935 A1 | 8/2009 | Hass et al. |
| 2010/0080233 A1 | 4/2010 | Kwapniewski et al. |
| 2011/0145386 A1 | 6/2011 | Stolorz et al. |
| 2011/0185065 A1 | 7/2011 | Stanisic et al. |
| 2011/0191477 A1 | 8/2011 | Zhang et al. |
| 2012/0002546 A1 | 1/2012 | Sundararaman et al. |
| 2012/0020210 A1 | 1/2012 | Sonnier et al. |
| 2012/0095974 A1 | 4/2012 | Bentkofsky et al. |
| 2012/0179607 A1 | 7/2012 | Abifaker et al. |
| 2012/0281698 A1 | 11/2012 | Forster et al. |
| 2013/0064088 A1 | 3/2013 | Yu et al. |
| 2013/0136011 A1 | 5/2013 | Tardo et al. |
| 2013/0297798 A1 | 11/2013 | Arisoylu et al. |
| 2014/0108638 A1* | 4/2014 | Ko et al. ............... 709/224 |
| 2014/0372567 A1* | 12/2014 | Ganesh et al. ........... 709/219 |
| 2014/0372616 A1* | 12/2014 | Arisoylu et al. .......... 709/226 |

OTHER PUBLICATIONS

Mori, T., et al. "On the characteristics of Internet traffic variability: Spikes and Elephants," In Proceedings of IEEE/IPSJ SAINT, Tokyo, Japan, Jan. 2004, the whole document.

Papagiannaki K. et al., "On the Feasibility of Identifying Elephants in Internet Backbone Traffic," Sprint ATL Technical Report TR01-ATL-110918, Sprint Labs, Nov. 2001, the whole document.

Thompson K. et al., "Wide-area internet traffic patterns and characteristics," IEEE Network, vol. 11, No. 6, Nov./Dec. 1997, pp. 10-23.

Lu, Y. et al., "ElephantTrap: A low cost device for identifying large flows," High-Performance Interconnects, Symposium on, 15th Annual IEEE Symposium on High-Performance Interconnects (HOTI 2007), pp. 99-108.

McKeown N. et al., "OpenFlow: Enabling Innovation in Campus Networks," Mar. 14, 2008, the whole document.

Uppal H. et al. "OpenFlow Based Load Balancing," University of Washington CSE651: Networking Project Report, reproduced Jun. 27, 2013, the whole document.

"OpenFlow Switch Specification," Version 1.1.0 Implemented (Wire Protocol 0x02), Feb. 28, 2011, the whole document.

* cited by examiner

|  | Flexible Load Balancing | Deterministic Load Balancing | Simple Load Balancer | Support for all traffic type | Support for in service removal addition of servers | Support for simple HA for load balancer |
|---|---|---|---|---|---|---|
| Stateful | ✓ | ✓ | ✗ | ✓ | ✓ | ✗ |
| Stateless Static | ✓ | ✗ | ✓ | ✓ | ✗ | ✓ |
| Stateless Per Packet | ✗ | ✓ | ✓ | ✗ | ✓ | ✓ |
| Stateless Protocol Specific | ✓ | ✓ | ✓ | ✗ | ✓ | ✓ |

Figure 9A

| Bucket ID | Blade ID | Old Blade ID |
|---|---|---|
| 1 | 3 | - |
| 2 | 1 | - |
| 3 | 2 | - |
| 4 | 1 | - |
| ... | | |
| B | 2 | - |

→ Blade 4 is Added →

Figure 9B

| Bucket ID | Blade ID | Old Blade ID |
|---|---|---|
| 1 | 3 | - |
| 2 | 4 | 1 |
| 3 | 4 | 2 |
| 4 | 1 | - |
| ... | | |
| B | 2 | - |

Figure 10A

| Bucket ID | Blade ID | Old Blade ID |
|---|---|---|
| 1 | 3 | - |
| 2 | 1 | - |
| 3 | 2 | - |
| 4 | 1 | - |
| ... | | |
| B | 2 | - |

→ Blade 3 is Removed →

Figure 10B

| Bucket ID | Blade ID | Old Blade ID |
|---|---|---|
| 1 | 2 | 3 |
| 2 | 1 | - |
| 3 | 2 | - |
| 4 | 1 | - |
| ... | | |
| B | 2 | - |

Figure 11A

| Bucket ID | Blade ID | Old Blade ID |
|---|---|---|
| 1 | 3 | - |
| 2 | 1 | - |
| 3 | 2 | - |
| 4 | 1 | - |
| ... | | |
| B | 2 | - |

→ Rescheduling →

Figure 11B

| Bucket ID | Blade ID | Old Blade ID |
|---|---|---|
| 1 | 3 | - |
| 2 | 1 | - |
| 3 | 2 | - |
| 4 | 3 | 1 |
| ... | | |
| B | 2 | - |

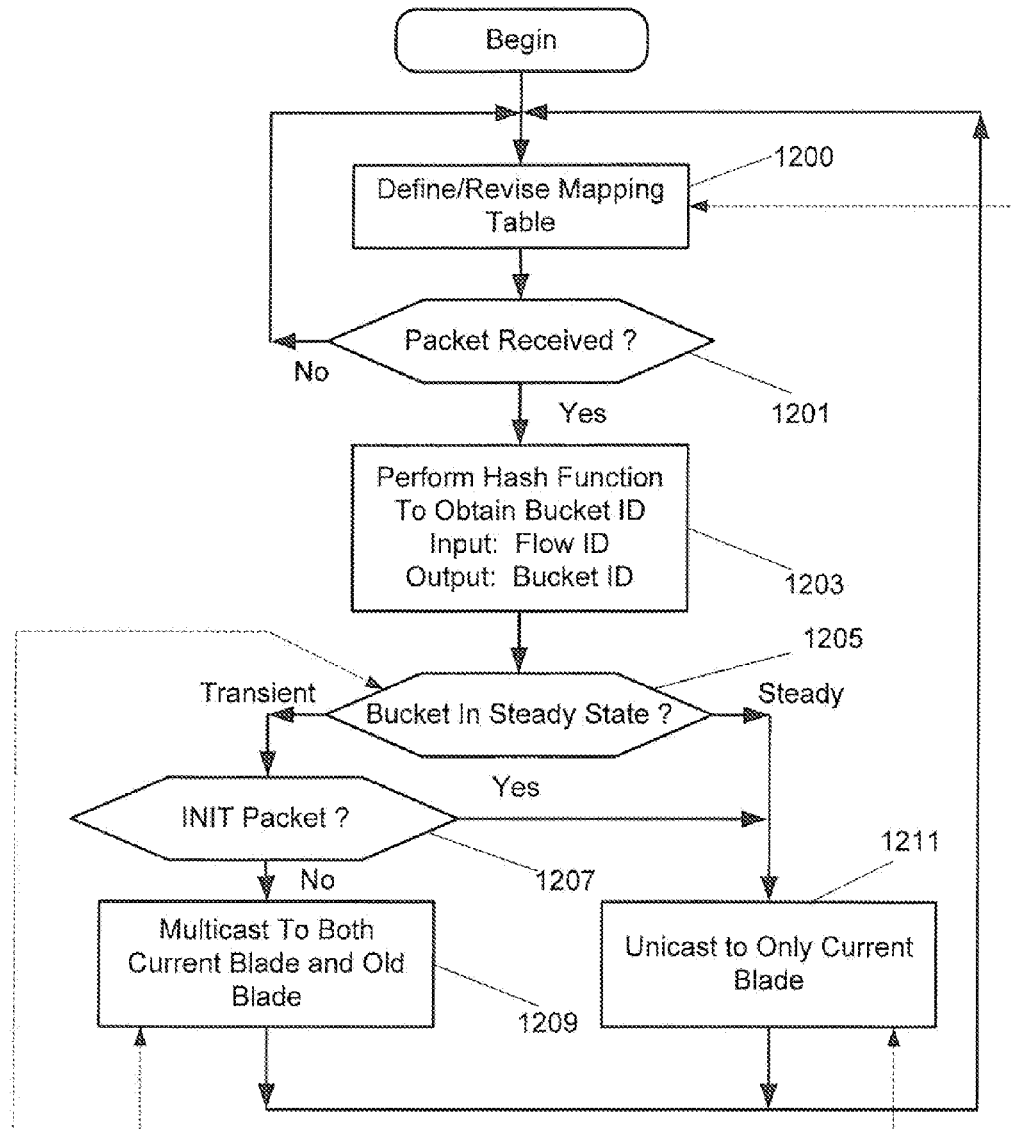

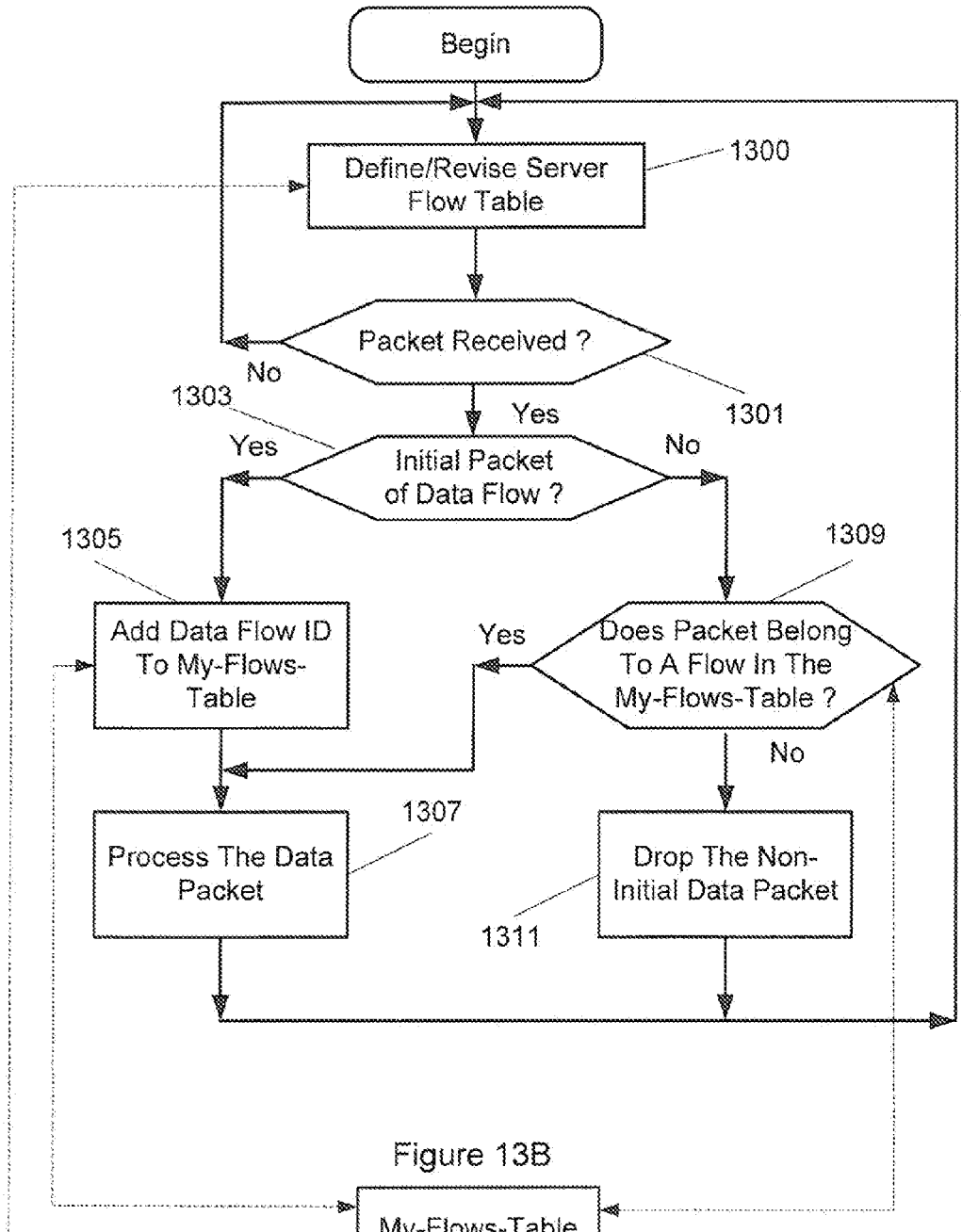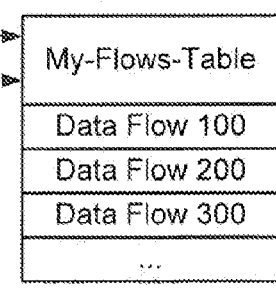

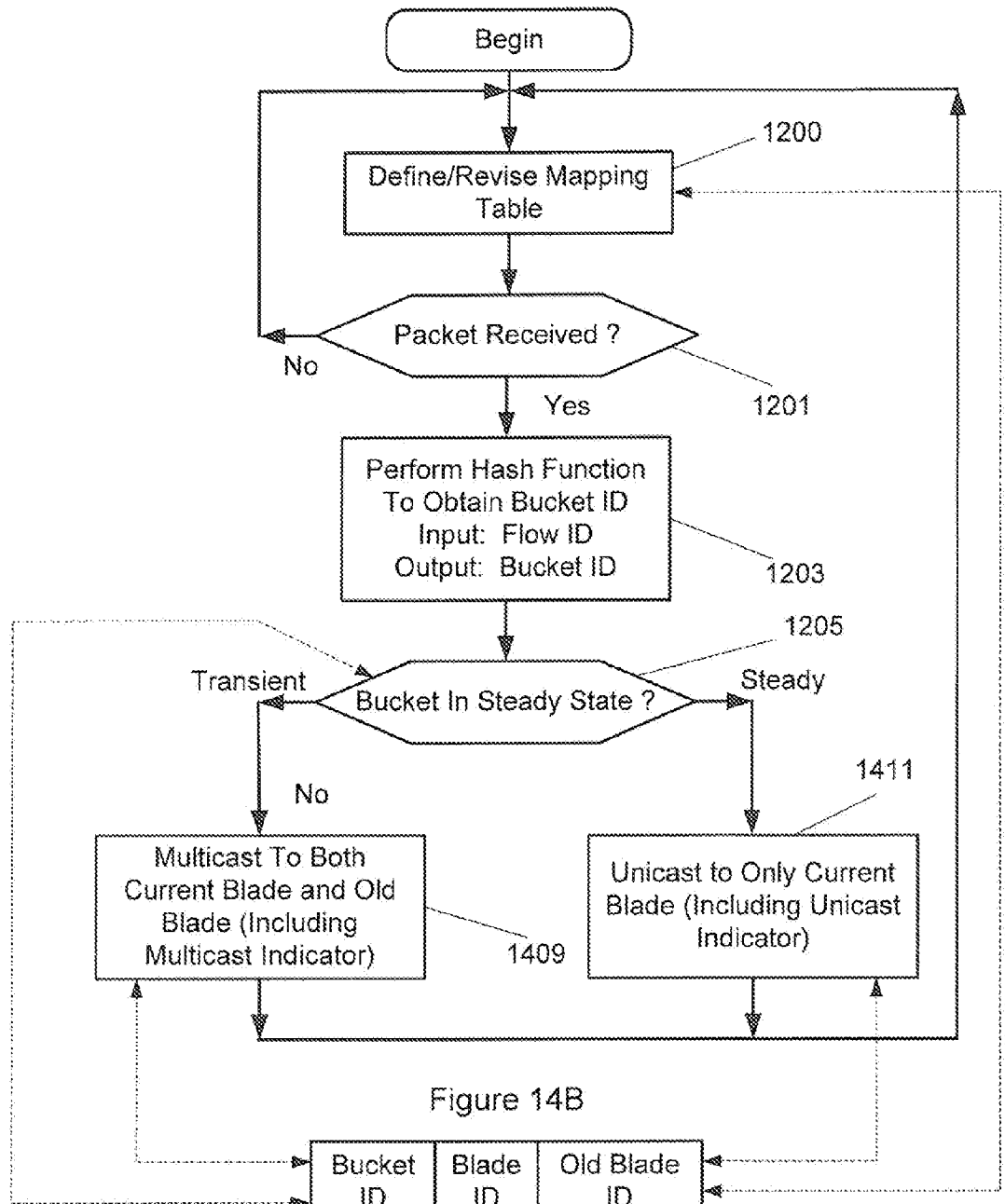

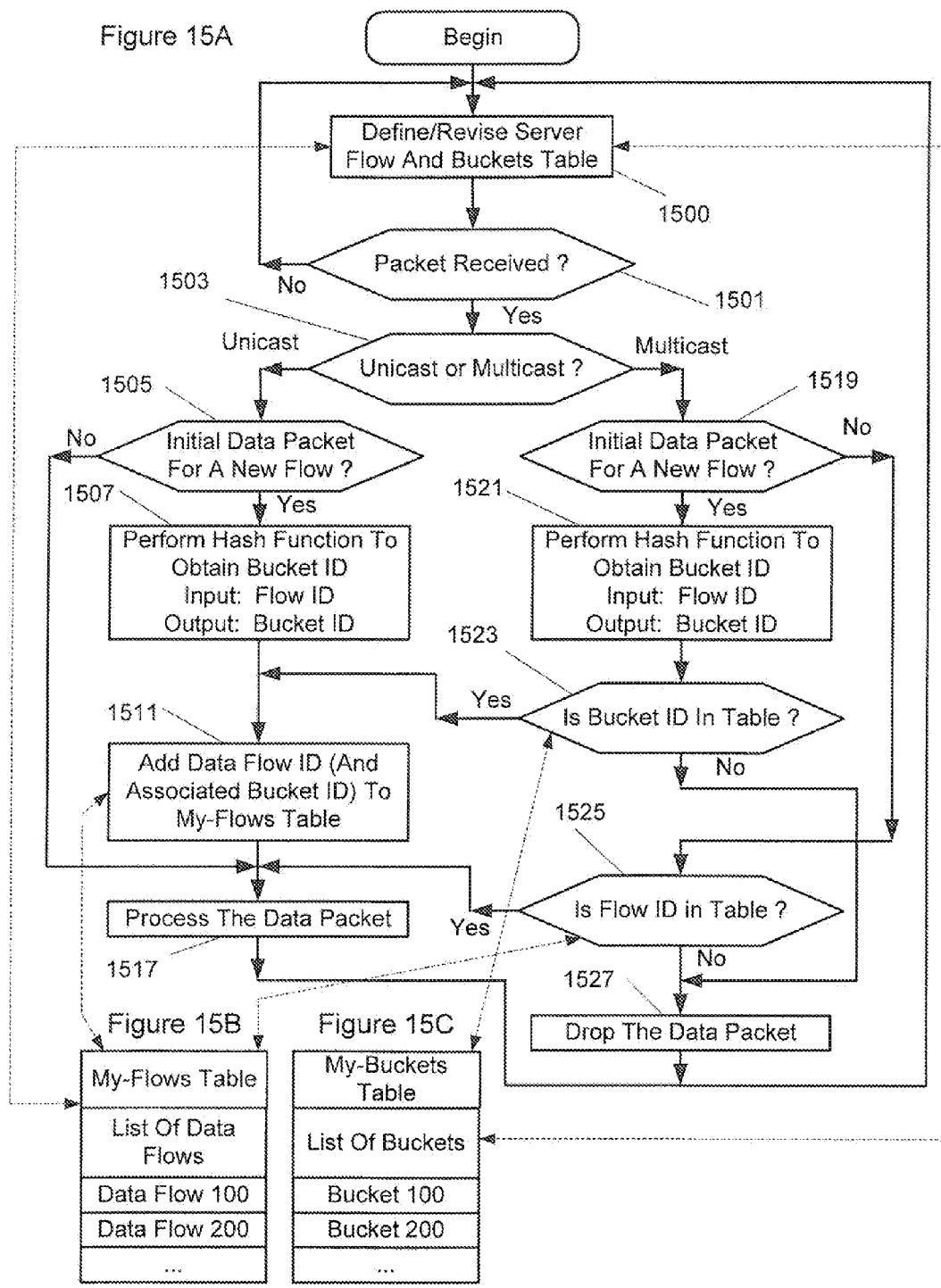

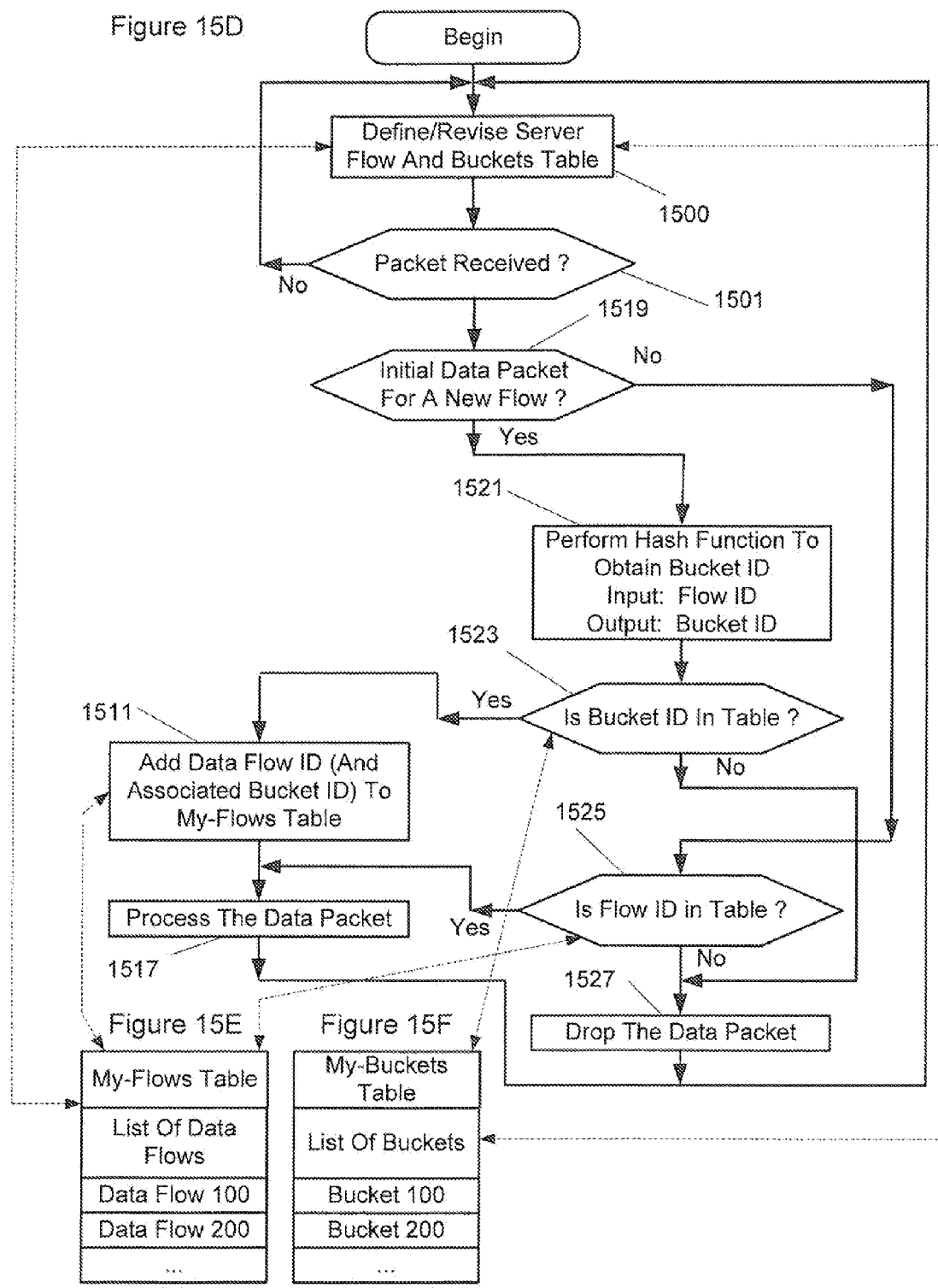

Figure 16A

| My-Flows-Table ||||
|---|---|---|---|
| Flow ID | Bucket ID | Bit-Rate | Timer |
| 216.43.56.23 | 5 | 1.2 | 19:15:55 |
| 112.34.200.2 | 2 | 18.2 | 19:21:59 |
| 200.1.12.10 | 5 | 5.4 | 19:22:14 |
| 67.112.230.5 | 1 | 0.03 | 19:22:30 |
| ... | ... | ... | ... |
| F | 5 | 0.2 | 19:22:40 |

Figure 16B

| Consolidated Flows Table ||||
|---|---|---|---|
| Bucket ID | # Connect. | Net Bit-Rate | Timer |
| 1 | 10 | 0.7 | 19:23:01 |
| 2 | 2 | 54.7 | 19:22:14 |
| 5 | 54 | 76.8 | 19:22:30 |
| ... | ... | ... | ... |
| 178 | 10 | 34.0 | 19:22:40 |

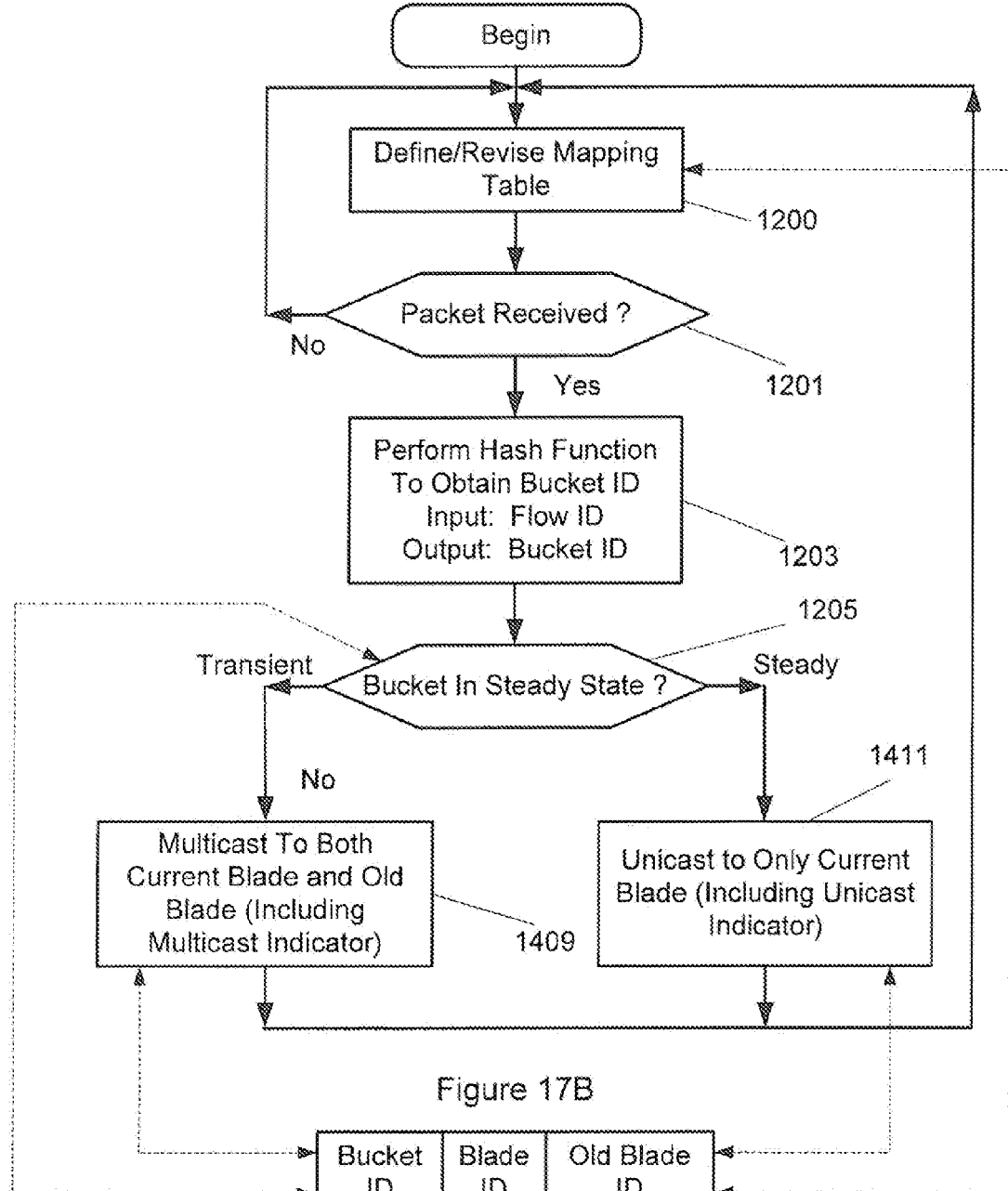

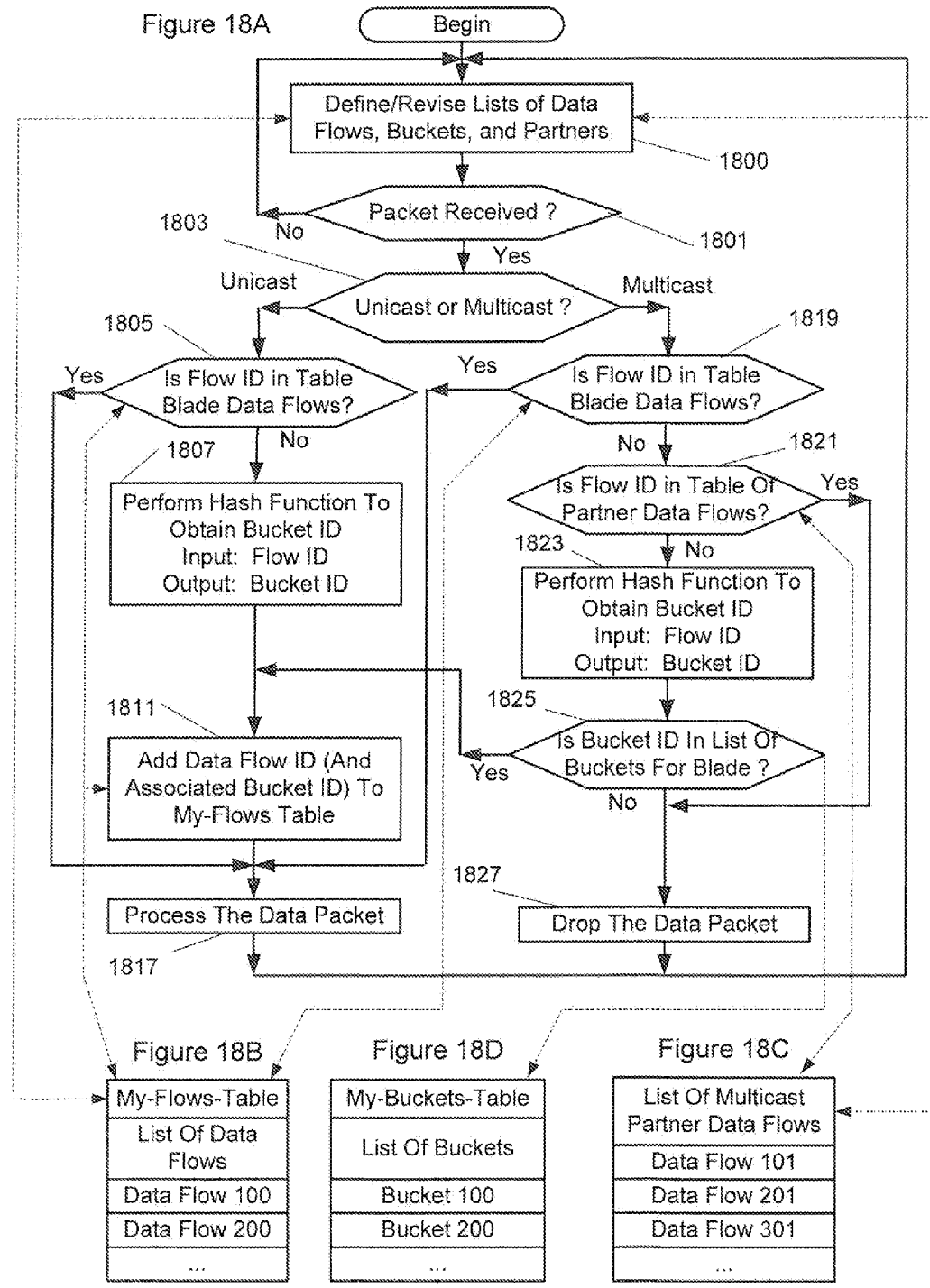

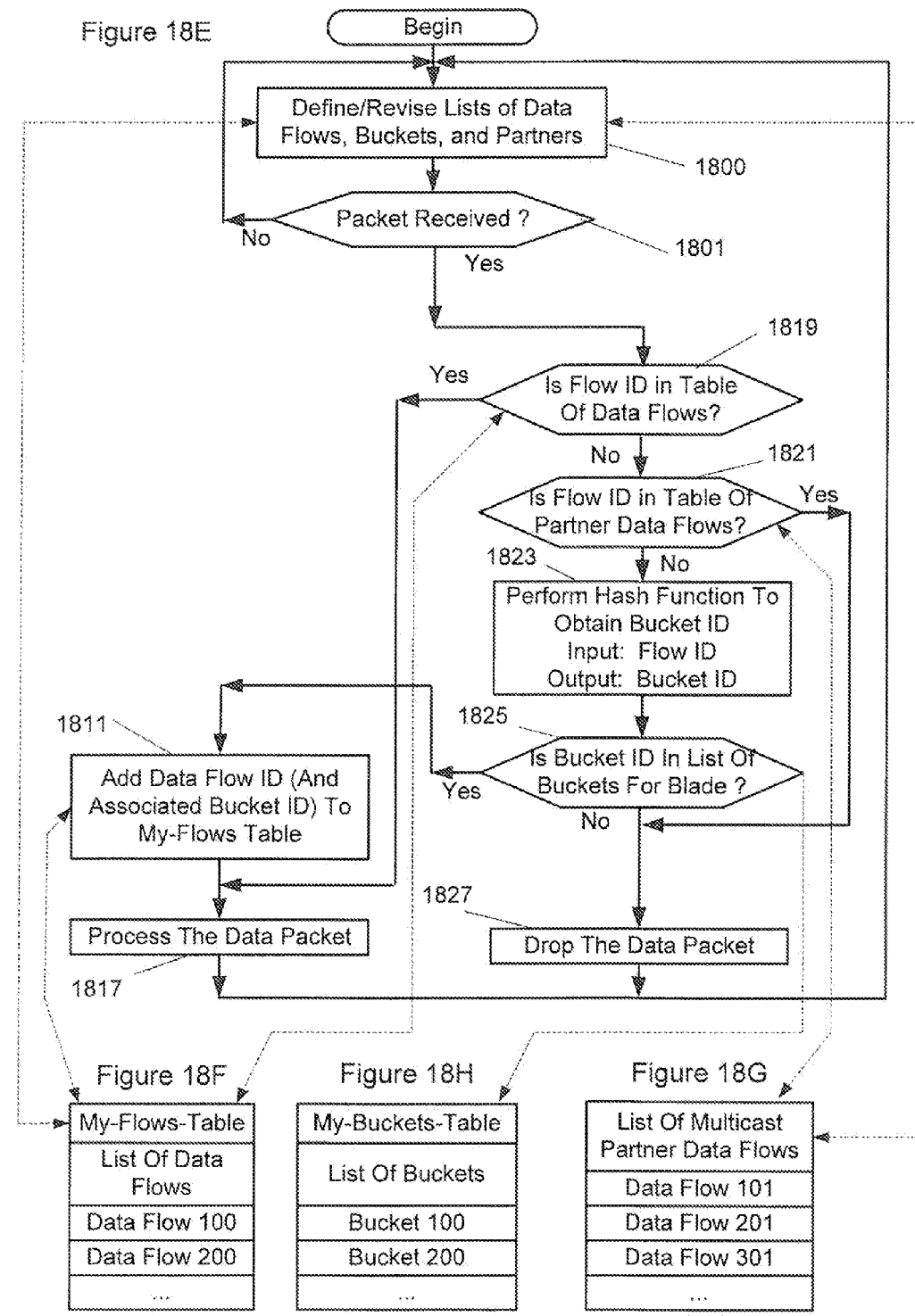

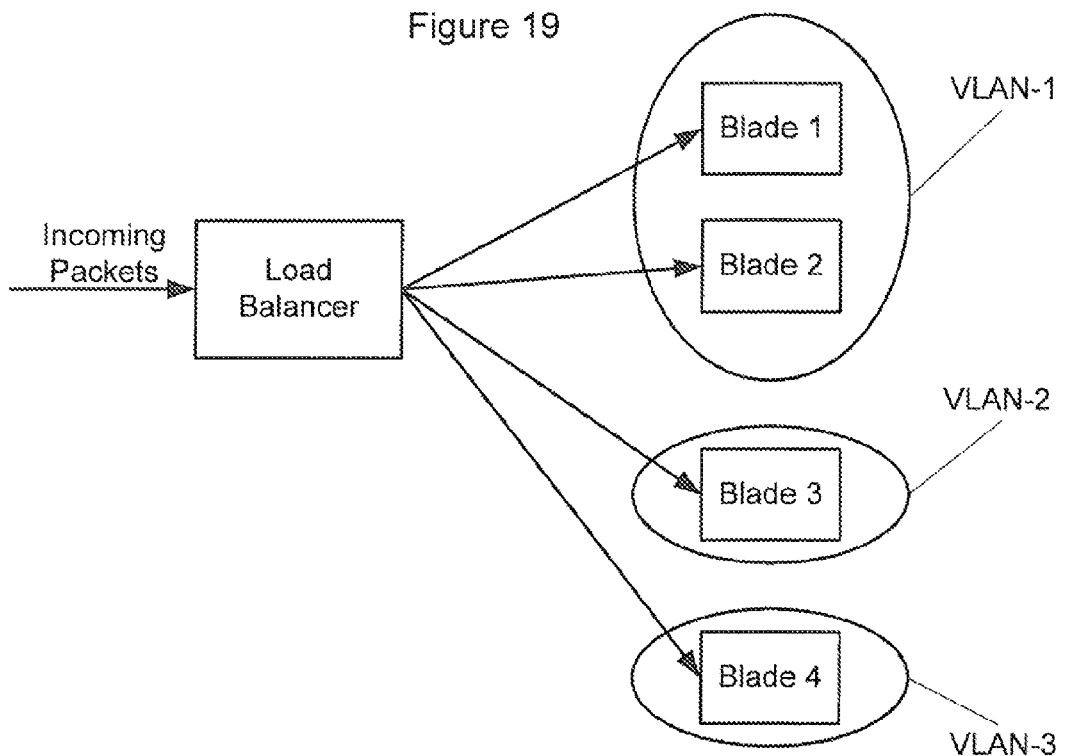

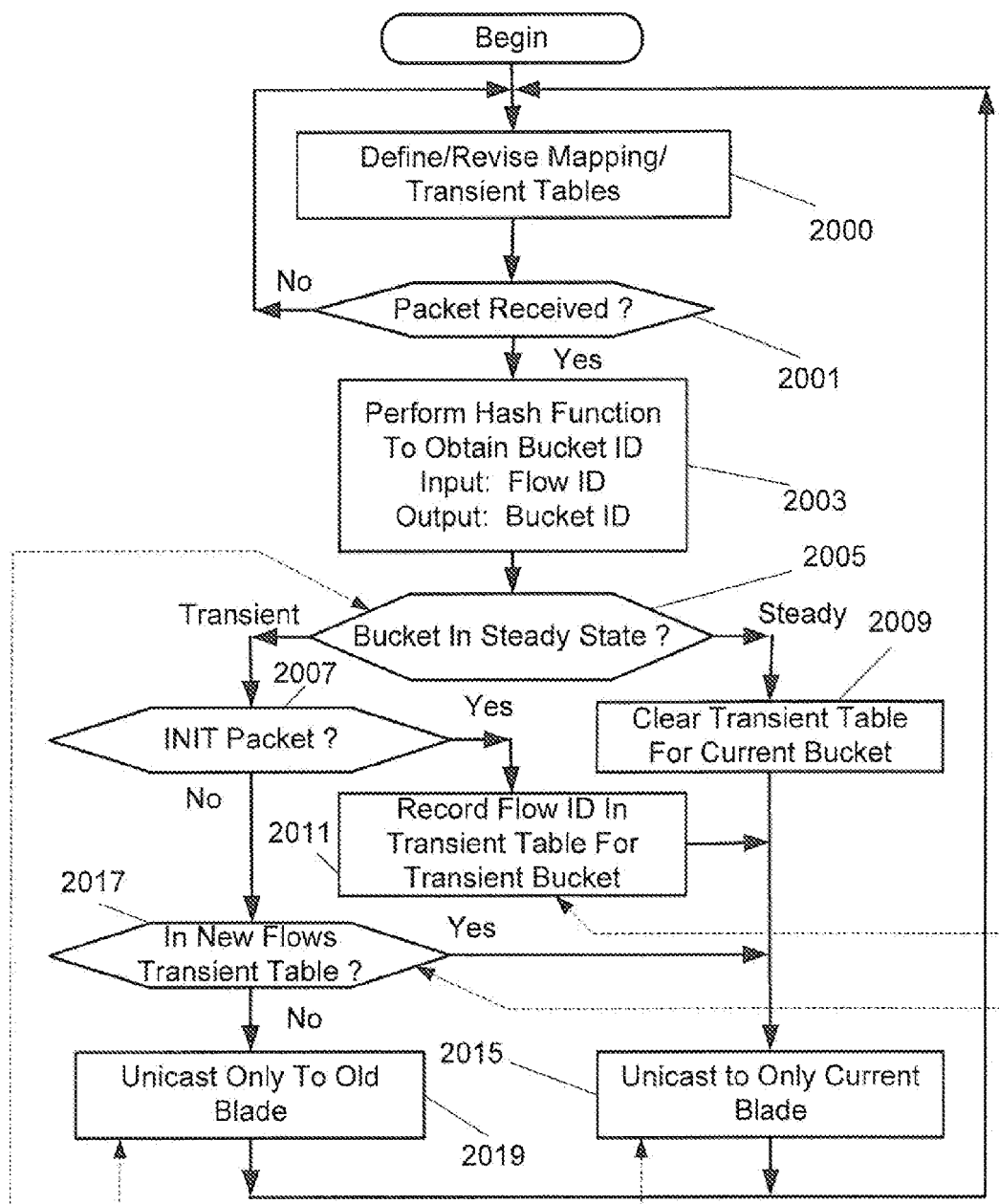

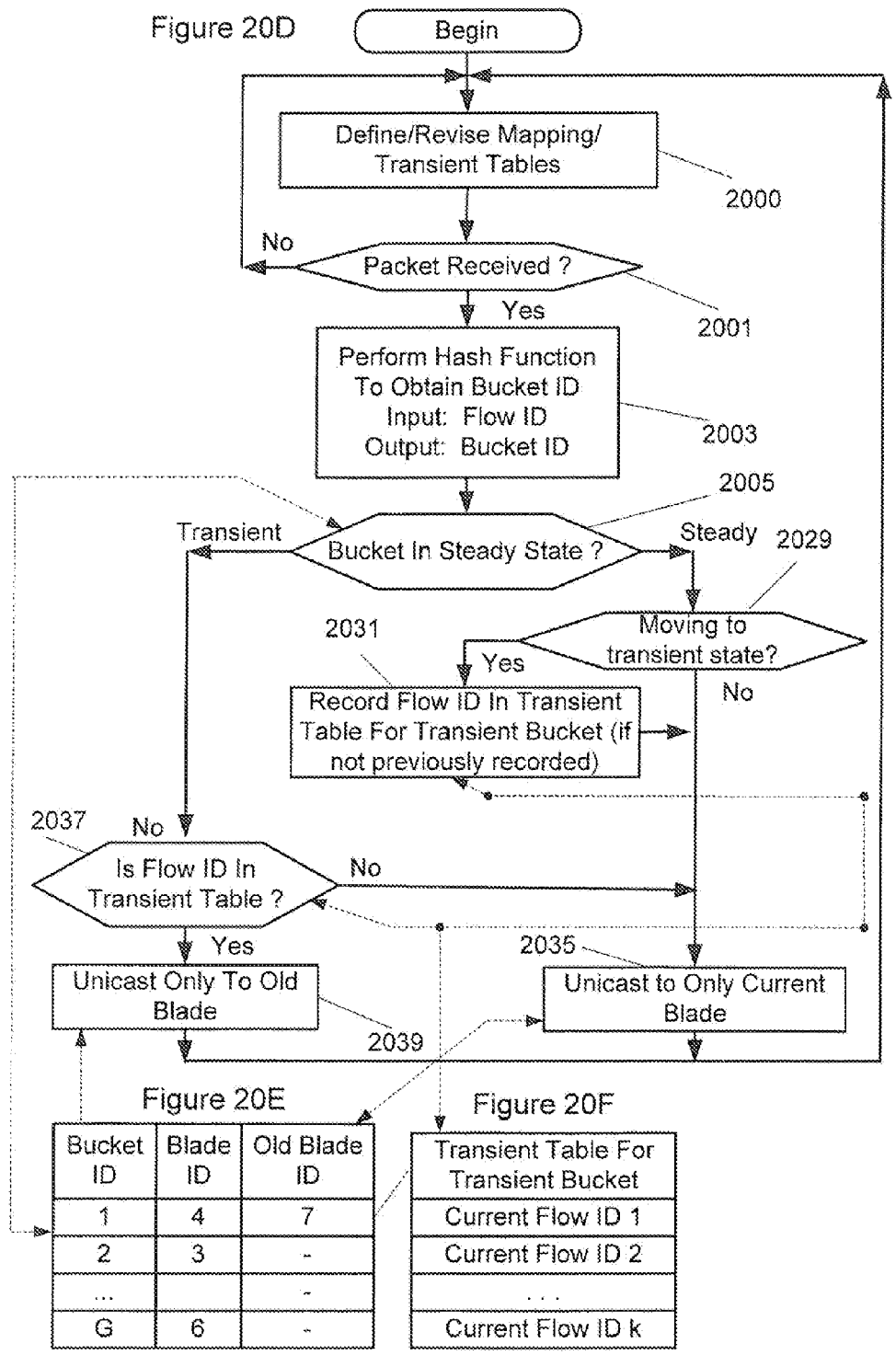

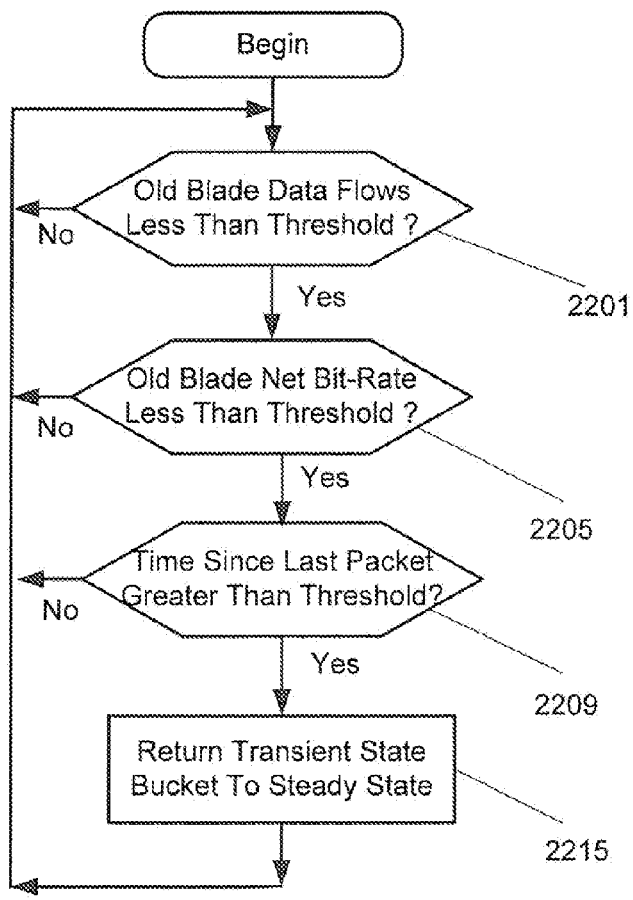

Figure 23A

| Bucket ID | Blade ID | New Blade ID |
|---|---|---|
| 1 | 3 | - |
| 2 | 1 | - |
| 3 | 2 | - |
| 4 | 1 | - |
| B | 2 | - |

Figure 23B

| Bucket ID | Blade ID | New Blade ID |
|---|---|---|
| 1 | 3 | - |
| 2 | 1 | 4 |
| 3 | 2 | 4 |
| 4 | 1 | - |
| B | 2 | - |

Figure 23C

| Bucket ID | Blade ID | New Blade ID |
|---|---|---|
| 1 | 3 | - |
| 2 | 4 | - |
| 3 | 4 | - |
| 4 | 1 | - |
| B | 2 | - |

Blade 4 is added.

Control Signal: Original Blade IDs are no longer needed

Figure 24A

| Bucket ID | Blade ID | New Blade ID |
|---|---|---|
| 1 | 3 | - |
| 2 | 1 | - |
| 3 | 2 | - |
| 4 | 1 | - |
| B | 2 | - |

Figure 24B

| Bucket ID | Blade ID | New Blade ID |
|---|---|---|
| 1 | 3 | 2 |
| 2 | 1 | - |
| 3 | 2 | - |
| 4 | 1 | - |
| B | 2 | - |

Figure 24C

| Bucket ID | Blade ID | New Blade ID |
|---|---|---|
| 1 | 2 | - |
| 2 | 1 | - |
| 3 | 2 | - |
| 4 | 1 | - |
| B | 2 | - |

Blade 3 is removed.

Control Signal: Original Blade IDs are no longer needed

Figure 25A

| Bucket ID | Blade ID | New Blade ID |
|---|---|---|
| 1 | 3 | - |
| 2 | 1 | - |
| 3 | 2 | - |
| 4 | 1 | - |
| ... | | |
| B | 2 | - |

*Rescheduling*

Figure 25B

| Bucket ID | Blade ID | New Blade ID |
|---|---|---|
| 1 | 3 | - |
| 2 | 1 | - |
| 3 | 2 | - |
| 4 | 1 | 3 |
| ... | | |
| B | 2 | - |

*Control Signal — Original Blade IDs are no longer needed*

Figure 25C

| Bucket ID | Blade ID | New Blade ID |
|---|---|---|
| 1 | 2 | - |
| 2 | 1 | - |
| 3 | 2 | - |
| 4 | 3 | - |
| ... | | |
| B | 2 | - |

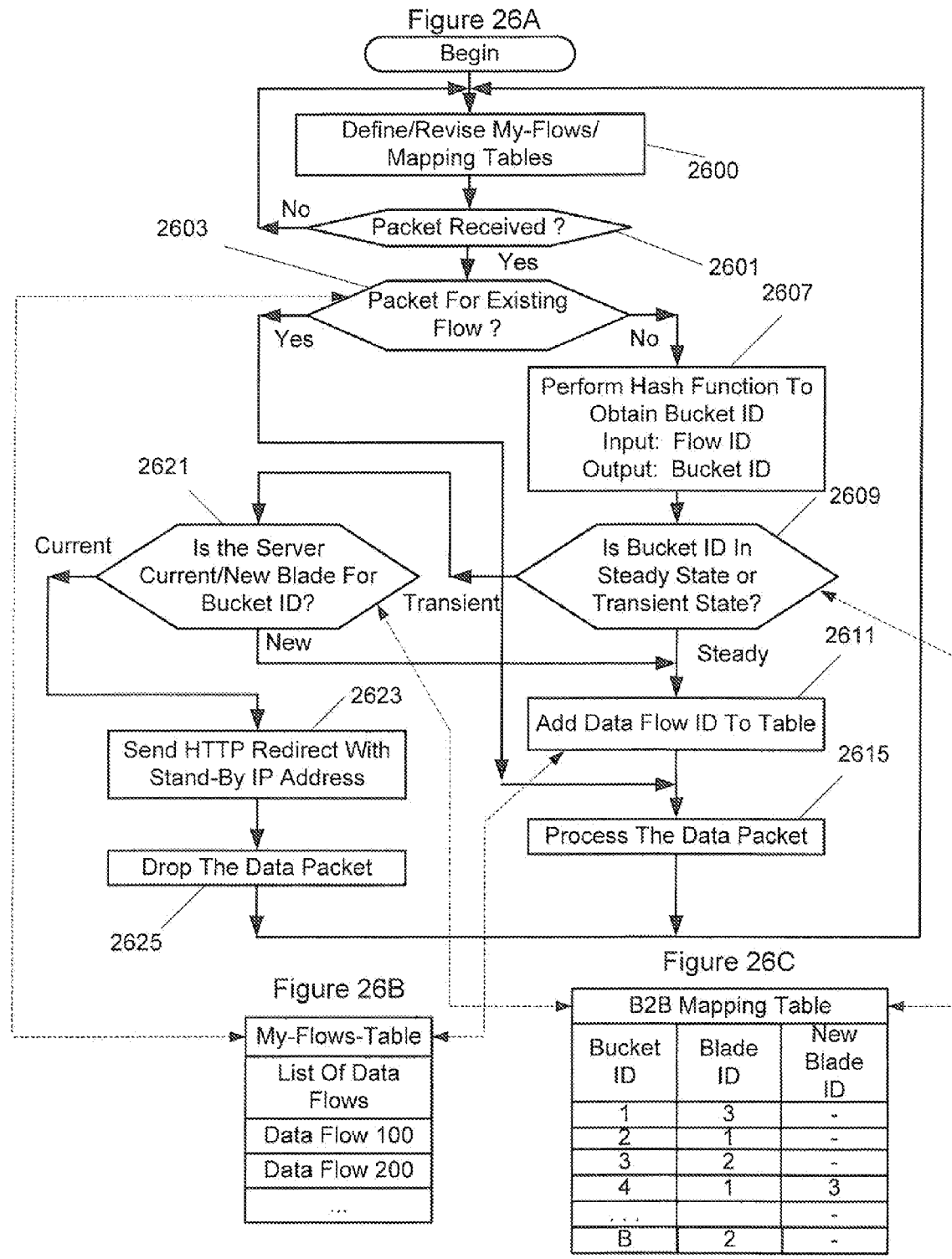

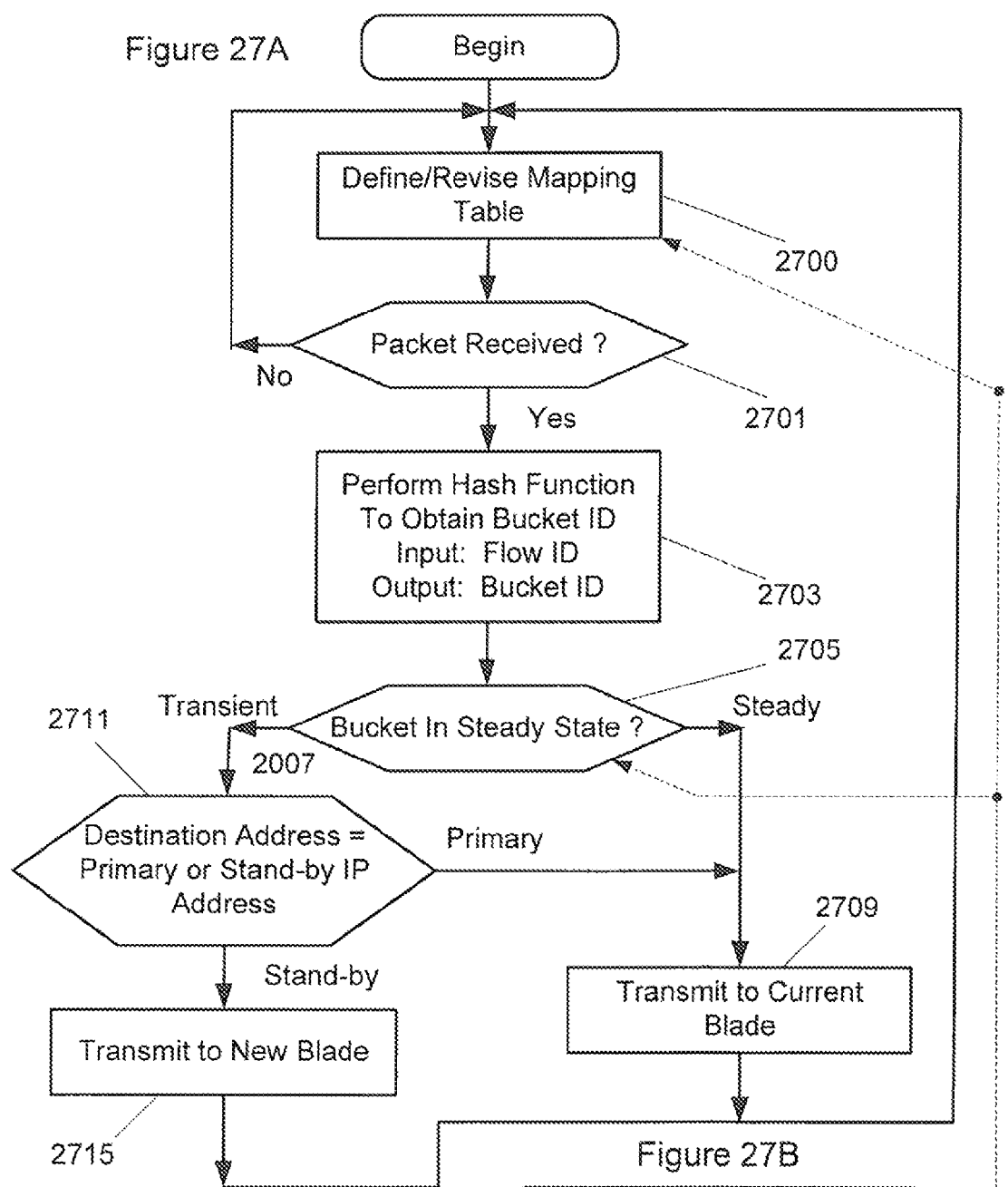

METHODS OF LOAD BALANCING USING PRIMARY AND STAND-BY ADDRESSES AND RELATED LOAD BALANCERS AND SERVERS

TECHNICAL FIELD

The present disclosure is directed to data networks and, more particularly, to data network load balancing and related methods, load balancers, and servers.

BACKGROUND

A Client is defined as any combination of hardware and software (e.g., including operating systems and client applications) that is capable of accessing services over a network connection.

A Server is defined as any combination of hardware and software (e.g., operating systems and server applications) that is capable of providing services to clients. A Blade is defined herein as any combination of hardware and software (e.g., operating systems and client and/or server applications software) which is capable of acting not only as a server but also as a client. A Blade Server is an instance of a server on a blade, whereas a Blade Client is an instance of a client on a blade. A blade can both be a client and a server at the same time. The terms blade server and server may be used interchangeably herein.

A Blade ID is a unique value that identifies a blade among other blades.

A Load Balancer is a network device that receives requests/packets coming from clients and distributes the requests/packets among the blade servers.

Server-Side Load Balancing is a technology whereby service requests are distributed among a pool of blade servers in a relatively transparent manner. Server-side load balancing may introduce advantages such as scalability, increased performance, and/or increased availability (e.g., in the event of a failure or failures).

As shown in FIG. 1, a system (i.e., Load Balancing Site) may include one or more load balancers and multiple blades, with the load balancer(s) providing coupling between the blades and outside clients/servers through a network (such as the Internet). The pool of blades may seem to be a single virtual server or client to the outside world (e.g., multiple blades at a load balancing site may use a same IP address for outside communications). Multiple load balancers (e.g., two in FIG. 1) can be used to provide resiliency/redundancy such that when one of the load balancers fail, the other load balancer takes over server load balancing. As discussed herein, a load balancing site may be realized in different ways. For example, a load balancing site can be a single network node (on a single or on multiple chassis) where the load balancers are realized using line cards of the network node, and the blade servers are realized using other service/server cards of the same network node. In this case, connections between the load balancers and the blades can be realized using a backplane of the network node. Alternatively, a load balancing site may be realized using multiple network nodes where a load balancer can be realized by a separate network node and may or may not be co-located with the blades/servers.

An Outside Node (e.g., an outside server and/or client) is defined as a network node which is located outside the load balancing site. An outside node can be a client requesting a service from one of the blade servers, or an outside node can be an outside server which is serving a blade client inside the load balancing site.

As used herein, a data flow is defined as network traffic made of up data packets and transmitted between a client and a server that can be identified by a set of attributes. Sample attributes may include 5 tuple parameters (e.g., Src/Dest IP addresses, Protocol, Src/Dest TCP/UDP Port), Src/Dest (Source/Destination) Mac address, or any other set of bits in the data packets (e.g., PCP bits, VLAN IDs, etc) of the data flow, or simply source and destination nodes of the network traffic. For example, over a certain link (e.g., from node a to node b) in a network, a packet passing through with a specific source IP address (e.g., IP1) is part of a flow identified by the source IP address over that link with the attributes (IP1, a, b). As another example, in an access network, traffic originated from a subscriber can also be considered as a flow where that flow can be identified as the traffic passing through a UNI/NNI/ANI port of a RG (Residential Gateway). Such subscriber flows in access and edge networks can be also identified by subscriber IP addresses. Upstream/downstream subscriber flow (e.g., flow from the subscriber/network side to the network side/subscriber) may have the IP address of the subscriber as the source/destination IP address respectively.

A flow ID is an ID or tag used to identify a flow. For example, the set of attributes used to identify a flow may be mapped to natural numbers to construct Flow IDs. Also, a Flow ID uniquely identifies a flow.

An incoming Flow is network traffic that enters the Load Balancing site and that originated from outside the Load Balancing site. An incoming flow includes not only data traffic that is destined to the load balancing site to be terminated at the load balancing site but also data traffic that is to be forwarded by the load balancing site after corresponding processing. An Incoming Packet is a packet belonging to an incoming flow.

Outgoing Flow is the network traffic that is about to leave the load balancing site. The outgoing flow includes not only the network traffic that is originated by the load balancing site (e.g., by the blade servers/clients) but also network traffic (originated by an outside node) that is forwarded by the load balancing site (after further processing at load balancer and/or the blade servers) to another location. An outgoing packet is a packet belonging to an outgoing flow.

Granularity of a flow refers to the extent to which a larger (coarse-grained) flow is divided into smaller (finer-grained) sub-flows. For example, an aggregate flow passing thorough a link (from node a to node b) with multiple destination IP addresses may have a coarser granularity than a sub-flow passing through the same link with a certain destination IP address. The former flow can be referred to as link flow and the latter flow can be referred to as link, destination IP flow.

A flow can be made up of many flows. Accordingly, the Flow ID that can be derived from a packet of an arbitrary incoming flow at the load balancing site may be a random variable. A probability distribution of the Flow ID may depend on what and how the packet header fields are associated with the Flow ID. (The header fields of an incoming packet that include the Flow ID can also be random variables, and mapping between the header fields and the Flow ID may govern the probability distribution of the Flow ID of incoming packets). For example, assuming that the Flow ID simply depends on a respective source IP address, then the probability distribution of the Flow ID of incoming packets will depend on factors such as how a DHCP server allocates the IP addresses, demographic distribution in case of correlation between geography and IP addresses, etc.

A connection is an example of a flow that can be identified using 5-tuple parameters (Src/Dest IP address, Protocol, Src/Dest TCP/UDP Port). TCP (Transmission Control Protocol)

or UDP (User Datagram Protocol) connections can be considered as an example. As used herein, Src means source, Dest means destination, PCT means Priority Code Point, UNI means User Network Interface, NNI means Network Network Interface, ANI means application network interface, and HA means high availability.

A Type-1 Flow is a type of flow for which it is possible to detect the start of the flow or the first data packet of the flow by considering only the bits in the first packet of the flow (without consulting other information). For example, an initial data packet of a connection can be identified using a SYN (sequence) flag in TCP packets and an INIT (initial) flag in SCTP (Stream Control Transmission Protocol) packets. Many connection oriented protocols have a way of telling the server about the start of a new connection. For example, a subscriber level flow can be identified by subscriber IP address (e.g., Source/Destination IP address of the upstream/downstream traffic). In such a case, a RADIUS start request or DHCP (Dynamic Host Configuration Protocol) request may indicate the start of the subscriber level flow. Because the Flow ID (identification) is based on the source IP address, a new flow for a subscriber can be detected by sensing the RADIUS packet or DHCP packet which is generated to establish the subscriber session.

A Type-2 Flow is a flow that may be defined arbitrarily such that it may be difficult to determine initial packets of a flow by considering only packet headers.

Load Balancer Traffic Management

When client sends a request to a load balancing site, a load balancer of the load balancing site forwards the request to one of the available blade servers. Once the data flow is established, the load balancer is in charge of distributing subsequent data packets of the data flow to the appropriate blade server(s). In this case, the blade server may be the flow/connection end point where, for example, the corresponding TCP connection has an end point at the blade server.

In an alternative, one of the blade clients in the load balancing site may initiate a data flow to an outside node. In this latter case, load balancer may still be responsible for forwarding all the response packets of the connection to the original blade client.

In addition, an outside client node can originate/initiate a connection which is destined to an outside node but which needs to traverse the load balancing site for further processing. As an example, subscriber management nodes and/or nodes/sites for deep packet inspection can be considered. In such scenarios, it is possible that certain flows may need to be associated with specific blade servers so that the processing can be performed consistently. In other words, it is possible that all the data packets of some flows may need to travel to the same blade server during the life time of the flow.

In summary, regardless of the origin of a data flow, the traffic of the data flow may need to be forwarded by the load balancer in a convenient fashion.

Flow Aware Server Load Balancing: Maintaining the Flow Stickiness

In flow level load balancing, the load balancer first allocates a new flow to a blade. That is, the initial data packet of an incoming data flow (e.g., SYN packet of a TCP connection, INIT packet of an SCTP connection) is forwarded to an available blade server with respect to a scheduling mechanism (e.g., weighted round robin, etc). All of the subsequent data packets associated with the flow are then processed by the same blade. In other words, the flow 'stickiness' to a particular blade should be maintained by the load balancer.

Most transport protocols such as TCP and SCTP may require connection level load balancing such that data packets belonging to a same connection are handled by a same blade server. On the other hand, UDP can sometimes cope with packet level load balancing where each individual packet can be handled by a different blade server.

A requirement/goal of sending subsequent packets associated with a data flow to the previously assigned blade server may make load balancing more challenging. Such Load Balancing may be referred to as Flow Aware, Session-Aware, and/or Connection-Aware Load Balancing.

Load Balancers

As discussed in greater detail below, requirements/goals of load balancers may include: flexible, deterministic, and dynamic load distribution; hitless support of removal and addition of servers; simplicity; support for all traffic types; and/or Load Balancer HA.

An ideal load balancer may distribute the incoming traffic to the servers in a flexible, deterministic and dynamic manner. Determinism refers to the fact that the load on each server can be kept at a targeted/required level (throughput this specification uniformity and deterministic load balancing are used interchangeably) whereas dynamicity refers to the fact that as load indicators over the servers change over time, the load balancer should be able to dynamically change the load distribution accordingly to keep the targeted/required load levels (e.g., a lifetime of each data flow/connection may be arbitrary so that load distributions may change).

Flexibility in load distribution refers to the granularity of load balancing such that the load balancer should support per flow load balancing where the flow can be defined in a flexible manner such as 5-tuple connection level (e.g., relatively fine granular load balancing) or only source IP flows (e.g., coarser granular load balancing). Flow-level load balancing refers to the fact that all data packets of the same data flow may need to be sent over the same server/blade during the lifetime of a connection (this may also be called as flow-aware load balancing preserving the flow stickiness to the servers/blades).

Hitless Support of Removal and Addition of Servers: The load balancer should be able to support dynamicity of resources (e.g., servers) without service disruption to the existing flows. Dynamicity refers to planned/unplanned additions and/or removals of blades. That is, whenever the number of active blades changes, the load balancer should incorporate this change in a manner to reduce disruptions in existing data flows. (Support for dynamicity of resources may be a relatively trivial requirement as most of server pools operate in a high availability configuration. Moreover, graceful shutdowns as well as rolling upgrades may require planned removal(s)/restart(s) of blades/servers).

The Load Balancer should be as simple as possible. Simplicity is a goal/requirement which, for example, may provide TTM (Time To Market) and/or cost effectiveness advantages.

As a goal, the load balancer should support all kinds of traffic/protocols (i.e., the load balancer may be Traffic-type agnostic).

Load Balancer HA: In cases where load balancer level redundancy is provided, it may be desirable that no state/data replication is required on the back up load balancer for each flow, and the switch over to back up should take place rapidly and/or almost immediately in the event that the primary load balancer fails.

Table-based flow level server load balancing is considered as a stateful mechanism such that the scheduling decision of each data flow is maintained as a state in the load balancer.

Table-based flow level load balancing is a stateful approach which uses a look-up table at the load balancer to record previous load balancing decisions so that subsequent packets of an existing data flow follow a same blade server assignment decision. Accordingly, the load balancer may need to keep the state of each active flow in the form of a Flow ID (e.g., 5 tuple parameters for connections) to Blade ID (e.g., IP address of the blade) mapping table. The first packet of the flow is scheduled/assigned to a blade server by the load balancer with respect to a scheduling algorithm.

As shown in FIG. 2, a first packet of a new data flow (e.g., including SYN for TCP or including INIT for SCTP) is scheduled to an available blade server, the state of the connection is recorded in the look-up table of the load balancer, and the packet is sent to the scheduled blade server. For the subsequent data packets of the same connection, the scheduled blade ID is identified in the look-up table, and the data packet is sent to the identified blade server.

Using load balancing operations of FIG. 2, the load balancer communicates with the blade servers regarding their availability for server load balancing.

Stateful Load Balancing with Scheduling Offload

As shown in FIG. 3, the load balancer (LB) may only keep the Flow ID to Blade ID mapping table, with intelligence/control being provided at a separate controller. The scheme of FIG. 3 basically offloads scheduling tasks from the load balancer to the controller to allow potentially more sophisticated scheduling schemes to be used, depending on a capacity of the controller.

As a data packet arrives at the load balancer, the load balancer extracts the Flow ID and performs a table look up operation. If the load balancer finds a match with the Flow ID in the table, the data packet is forwarded to the indicated Blade (having the Blade ID matching the Flow ID as stored in the mapping table). If the data packet is from type 1 data flow, then the load balancer can use the packet header to identify the data packet as an initial data packet of a new flow without using the mapping table. Otherwise, if no match is found for the Flow ID in the mapping table, the load balancer can determine that the data packet is an initial packet belonging to a new data flow.

The load balancer then either sends the new packet to the controller or otherwise communicates with the controller regarding this new data flow. Responsive to this communication from the load balancer, the controller instructs the load balancer to add a Flow ID to Blade ID mapping entry to the mapping table, and the controller forwards the data packet to the corresponding Blade. Hereafter, all data packets belonging to the data flow will be forwarded by the load balancer to the corresponding Blade because the table now has a mapping entry for the data flow.

Accordingly, the controller is responsible for communicating with the blade servers for their availability and load, and the controller performs the scheduling and updates the load balancer mapping table. The load balancer in this case may be a dumb device which only receives the commands from the controller to add/delete/modify the mapping entries in the mapping table and perform data packet forwarding according to the mapping table.

Stateless Load Balancing

For stateless load balancing algorithms/operations, there may be no need to maintain any sort of state. By considering only a packet header, a scheduling decision can be made whether it is the first packet of the flow or not. In other words, no state is kept with respect to the Flow and Blade IDs to make the scheduling decision of the later packets of a flow.

Static Mapping: Hash-Based Flow-Aware Server Load Balancing

A Hash-based approach is a stateless scheme that maps/hashes any Flow ID (e.g., 5 tuple parameters) to a Blade ID. In that respect, hash based scheduling maintains flow stickiness as the Flow ID to Blade ID mapping is static.

As an example, in a load balancing site with N (e.g., N=10) blade servers and a single load balancer, a hash function may take the last byte of the source IP address (e.g., 192.168.1.122) of a packet as an integer (e.g., 122) and take modulo N. The resulting number (e.g., 2) is in the range of 0 to N−1 which points to the blade server to which the packet is to be forwarded. In the event of a server failure, the hash function (i.e., in this case the module N function) needs to be updated.

In a more sophisticated example, a set of fields in the packet header is first hashed/mapped to a large number of M buckets such that M>>N (N being the number of servers with the number of buckets M being much greater than the number of servers N). Then, a second level mapping from the M buckets to the N servers is performed. This two-level hashing/mapping based mechanism may provide an ability to cope with server failures, such that in the event of a failure, only second level (i.e., M bucket to N Server) mapping needs to be updated without any change in the original hash function.

A good hashing function may generate substantially uniformly distributed outputs. Weighted uniformity can also be achieved using hash functions. In other words, weights can be assigned to each blade server with respect to its capacity, and the distribution of the traffic may be expected to assume a (weighted) substantially uniform distribution with respect to capacity over the blade servers.

Non Static Mapping schemes (Per Packet Server Load Balancing)

In some cases, a flow may be comprised of a single packet, and/or per packet server load balancing may be required. Transport protocols such as UDP (User Datagram Protocol) may tolerate such per packet server load balancing. In such cases, the load balancer may uniformly selects a blade server to schedule an incoming packet. By doing so, the Flow ID to Blade ID mapping is not necessarily maintained meaning that the same Flow ID may not necessarily map to the same Blade ID each time the scheduling algorithm (e.g., Random Blade Selection, Round Robin, Weighted Round Robin, etc.) is executed.

As mentioned above, alternatively if a data flow is only consists of a single data packet (which is both the first and the last packet of the flow), then even flow based stateful load balancing may becomes a non-static mapping scheme, because there is no need to keep a Flow-ID to blade ID table.

Protocol Specific Load Balancing (Stateless)

Some load balancing schemes have exploited the nature of protocol specific handshakes, acknowledgements, and/or other mechanisms to leverage flow aware load balancing in a stateless manner.

For protocols like GTP and SCTP, the information about the assigned blade can be embedded in the packet headers which can be used for flow stickiness as briefly explained below.

New Connection Assignment

A new flow is identified by considering the packet header fields (e.g., an INIT flag of a SCTP packet). The new flow is then assigned to a blade server using a scheduling algorithm such as a Round Robin, Hash based method that may exploit the random nature of bits (if any) in the header, etc.

Maintaining Flow Stickiness

For protocols like SCTP and GTP, information about the blade assigned to the first packet of a data flow can be embedded in the headers of the subsequent flow packets. For example, a V_tag field in SCTP packets can store information about the Blade ID of the assigned blade server. Once a flow has been identified as an existing one (e.g., reading SYN flag which is 0 for the subsequent packets of a SCTP connection), the information about the assigned blade server can be extracted from the packet header and the packets can then be forwarded to the correct blades.

Other Flow Aware Load Balancing Techniques

In DNS (Domain Name System) based server load balancing mechanisms, each server/blade has a unique IP address which is know by the DNS servers. When a client/outside node initiates a connection, the corresponding DNS request is sent to the DNS servers which choose one of the IP addresses of the blade servers and sends the response back. The client/outside node than directs the connection/flow towards the specific blade server. In other words, the destination IP address of the packets of the flow belongs to the blade server in question. The load balancer in this case performs a route lookup (e.g., a FIB lookup or Forwarding Information Base lookup based on the destination IP address) for all the flows to be forwarded to the correct blade server. No scheduling may need to be performed at the load balancer. Accordingly, various client requests are load balanced over the blade servers.

Table-Based Server Load Balancing (Stateful)

Centralized Scheduling and Table Look up at the Load Balancer

As discussed above, flow aware server side load balancing may require all the packets belonging to the same flow to be forwarded to the same blade server. For a table-based approach, a state for each flow (e.g., Flow ID to Blade ID mapping) existing on the blades may need to be maintained.

Table-based load balancing may be compatible with server load aware (dynamic) load balancing techniques. As an example, using weighted round robin scheduling in conjunction with table based server load balancing, weights can be changed for each blade server dynamically based on the load on each blade server. As the number of flows increases, however, the size of the table as well as the time it takes to search the table also increases. Also, the table search/lookup has to be performed for every incoming packet which may significantly increase processing overhead on the load balancer as the size of the table increases. With this approach, the load balancer may become more vulnerable to resource exhaustion (both cpu and memory resource exhaustion) in conditions of high traffic load.

Moreover, for every new flow/connection, the load balancer may need to perform scheduling operations and update the table accordingly. As a rate of new connections/flows increases, scale problems may arise because there is a single processing entity.

In addition, in standard deployments of a load balancing system, multiple load balancers may be deployed in parallel to provide increased availability in the event of a load balancer failure(s). In such deployments, flow replication mechanisms may be deployed to provide failover for active flows on a failed load balancer. Flow replication mechanisms may require all active flow state information to be replicated and distributed among all participating load balancers (i.e., synchronizing the table providing the flow ID to Blade ID mappings for the participating load balancers). Synchronization among the load balancers for such session state information may introduce significant communication and processing overhead.

In addition, the time it takes for a new flow (e.g., the first packet of a session) to be redirected to one of the load balancers until the other load balancer is ready for the failover for that session (called Peering Delay) can be very high in event of a high incoming flow rate. Peering delay is a known issue for resilient load balancing such that the state of the flows with lifetimes less than or equal to the peering delay would not be replicated at the other load balancer.

In summary, stateful server side load balancing may suffer from resource exhaustion, and also from the memory and processing overhead, inefficiency, and other issues (e.g., peering delay) of standard state replication mechanisms.

Stateful Load Balancing with Scheduling Offload

This scheme may share disadvantages of the Stateful scheme discussed above because the load balancer keeps the state table (e.g., a Flow ID to Blade ID mapping table). This state table may become very large when handling large numbers of data flows, thereby increasing memory requirements and table lookup times on the load balancer.

In addition, the controller node may be responsible for scheduling and updating the mapping table on the load balancer and may thus have the same/similar scale issues as discussed above with respect to other load balancing implementations.

Stateless Load Balancing

Static Mapping: Hash-Based Server Load Balancing

Hash-based server load balancing may depend on the arbitrariness of the traffic parameters (e.g., Flow ID, 5-tuple parameters, etc.) to provide a desired/required (e.g., substantially uniform) load distribution. If the probability distribution of the Flow ID of incoming data packets is known a priori, then it may be possible to design a Flow ID to Blade ID mapping (stateless, e.g., Hash) with Flow IDs as keys, that can substantially guarantee a desired/required (e.g., substantially uniform) flow distribution across the blades over a sufficiently large period of time. In many of the cases, however, a probability distribution of the Flow ID may not be known in advance and may change over time. Another challenge is that even if the statistical characteristics of the Flow IDs can be estimated accurately, lifetimes of the connections/flows are generally arbitrary. Accordingly, loads on the servers may change overtime even with a hash function aligned with the Flow ID pattern of the traffic. Any hash based scheme or static mapping may thus not guarantee uniformity at all times.

Also, hash-based server load balancing approaches may not sufficiently support load aware (e.g., dynamic, adaptive) load balancing. Considering dynamic traffic load characteristics (e.g., lifetimes of each connection and arrival rates), techniques in question may result in asymmetric load balancing among the blade servers. Changing the weights on the fly with respect to the load on the blade servers may be a challenge in this approach, because with the new weights, the existing flow can be reassigned to a new blade server which may terminate the flow.

Similarly, adding/removing blades to/from the load balancing site dynamically may be complicated in hash-based server load balancing, because any change in one of the hashing function parameters (i.e., number of blade servers to be load balanced) has the risk of spoiling the existing flows to blade server associations which may terminate the existing flows. To be more precise, removal of a blade may be easier than addition of a blade. As discussed above with respect to static mapping, when a blade is removed, the flows mapped to the blade can be re-mapped to the other active blades while keeping the mapping on the active blades intact. Hence, there may be no disruption in flows existing on previously active blades (assuming the hash bucket size is much larger than the number of servers, otherwise the uniformity of the load balancing may become an issue).

When a blade is added, however, some of the flows mapped to the previously active blades should be re-mapped to the added blade (for uniformity/resource utilization) which may cause disruption of existing flows. Otherwise, the load balancer may need to identify which connection is added before and after the blade/server addition which may require state keeping in the load balancer.

If a backup load balancer is used for purposes of redundancy and/or resiliency, there is no need for flow state (e.g., table entries for flowIDs and server IDs) replication between the active and standby load balancers. The only thing to be synchronized between active and backup load balancers is the hash function itself.

Non Static Mapping Schemes (Per Packet Server Load Balancing)

As discussed above, with non-static mapping schemes a load balancer does not keep a flow ID to blade/server ID mapping table because load balancing decisions (i.e., scheduling decisions) are made per packet.

A disadvantage may be that these schemes alone cannot be used for load balancing with flow awareness. For example, if 5-tuple parameter connection level load balancing is required and per packet server load balancing is performed, all the connections may eventually be terminated because the packets of a single connection may end up with several blades/servers, only one of which has the connection state information.

For flow aware scheduling, these schemes may be used in conjunction with stateful schemes (e.g., Table based), which may have other disadvantages as discussed above.

Protocol Specific Load Balancing

Protocol specific load balancing techniques may have a disadvantage of being non-generic as these techniques may only be applied to specific protocols such as SCTP and/or GTP. For example, such techniques may not apply to IP traffic.

Other Techniques

As discussed above, different load balancing techniques are provided for different data applications. In general, however, each of these load balancing techniques may only be suited to specific respective applications and may have limited scope for usage in other applications. A summary of characteristics of stateful, stateless static, stateless per packet, and stateless protocol specific load balancing schemes is provided in the table of FIG. 4.

Hash Based Implementation of the Load Balancer

Architecture of the Load Balancer

FIG. 5 illustrates a hash based implementation of a load balancing architecture. As shown, incoming traffic is first segmented into Hash Buckets, each of which is in turn assigned to a blade for processing. The architecture includes two stages in the load balancer. A first stage is a hash module that maps the a portion of the header field (e.g., flow ID, connection ID, and/or session ID) of the data packet to a Hash Bucket. As used herein, the terms hash bucket, and bucket may be used interchangeably. Each Hash Bucket is identified by an ID known as or Bucket ID. A bucket ID, for example, can be selected from a set including 1 up to a fixed number B. A second stage includes a table that maps Buckets to Blades. This table is known as or Bucket-to-Blade (B2B) Mapping Table. With Bucket IDs varying 1 through B, this table would have B rows.

For every incoming packet, the load balancer first computes the hash of the packet header (e.g., a hash of a Flow ID included in the packet header) to obtain a corresponding Bucket ID. The load balancer then maps the computed Bucket ID to a Blade ID using a look-up over the B2B (Bucket to Blade) Mapping Table. The load balancer then forwards the packet to the corresponding blade.

The first stage hash is a static mapping from Flow IDs to Buckets or Bucket IDs. Also, Bucket-to-Blade mapping can be considered static over a period of time. Therefore, this scheme may have an ability to maintain flow-level granularity. Determinism and dynamicity may be provided by modifying the B2B mapping table. In fact, it can be shown that a reasonably good algorithm to map Buckets to Blades may allow this scheme to have improved uniformity relative to a one-stage static hash from Flow IDs to Blades.

The load balancer of FIG. 5 may be relatively easy to implement. Because the table size is fixed to a distinct number of Bucket IDs, the table size may be fixed irrespective of the number of connections being supported. Accordingly, there is reduced risk that the load balancer may run out of memory as a number of connections increases. Because Bucket IDs are finite and ordered, table look up may be simplified.

Load balancing schemes of FIG. 5, however, may not provide sufficiently hitless support for addition and removal of servers (e.g., addition/removal of servers without effecting existing traffic flows). In general, data flows may be interrupted/lost when adding a blade, when removing a blade, and/or when remapping of Bucket ID to blade ID to provide load balancing (dynamicity), for example, to provide automatic load correction. Automatic load correction, for example, may occur in a VM (Virtual Machine) based service deployment where the VMs can be migrated from one Service Card SC (e.g., a Smart Service Card or SSC) to another for may purposes. For example, VMs can be consolidated in certain SSC cards so that other cards can be turned off when the traffic demand is lower for the purpose of saving energy.

In a scenario when a new blade is added, for example, a "Blade n+1" may be added to the original system of n blades illustrated in FIG. 5. To provide more uniform load balancing, Bucket IDs may be remapped from existing mapping to the "Blade n+1". For example, Bucket 'g' may be one of the remapped buckets (i.e., Bucket ID 'g') is remapped to Blade n+1 from its initial mapping to Blade K). Packets for Bucket 'g' from previously existing flows/sessions which were destined to Blade K, however, will now be sent to Blade n+1, thereby disrupting the flow stickiness for these previously existing flows/sessions.

Similarly, a random blade K may be removed abruptly or as a pre-planned downtime. In this situation, all group IDs that were mapped to Blade K will now be remapped to some other Blade. The packets from existing flows/sessions that were being forwarded to Blade K will now be forwarded to the other blade and may thus be subsequently dropped (thereby disrupting the flow stickiness).

Buckets-to-Blades (B2B) mapping may thus be changed to provide better load balancing (uniformity). This situation is not unlikely because Bucket ID is nothing but a hash of flow ID of the packet, the distribution of which is unknown and may be sufficiently arbitrary that it causes uneven loads and/or numbers of connections to each bucket. In such a scenario, when a bucket is remapped from an initial blade ID to a new blade ID, all the existing flows which were destined towards the original blade will now be directed to the new blade and may therefore be disrupted.

In summary, the current implementations of load balancing may cause flow disruptions when B2B (Bucket to Blade) mapping is changed. Moreover, hash based load balancing may not support sufficiently hitless addition/removal of blades and/or remapping of blades. Stated in other words, existing connections through a bucket may be affected/lost when a mapping of a bucket is changed from one server/blade to another.

SUMMARY

It may therefore be an object to address at least some of the above mentioned disadvantages and/or to improve network performance. According to some embodiments, for example, loss of existing data flows may be reduced during load balancing when a mapping of a bucket changes from one server/blade to another.

According to some embodiments, a method of forwarding data packets from a load balancer to a plurality of servers may include receiving a first data packet of a data flow with the first data packet being addressed to a primary address for the load balancer and with the first data packet including information for the data flow. A bucket ID may be computed for the first data packet as a function of the information for the data flow. Responsive to the bucket ID for the first data packet mapping to first and second servers of the plurality of servers and responsive to the first data packet being addressed to the primary address for the load balancer, the first data packet may be transmitted to the first server. A second data packet of the data flow may be received with the second data packet being addressed to a stand-by address for the load balancer and with the second data packet including the information for the data flow, and a bucket ID may be computed for the second data packet as a function of the information for the data flow wherein the bucket IDs for the first and second packets are the same bucket ID. Responsive to the bucket ID for the second data packet mapping to first and second servers of the plurality of servers and responsive to the second data packet being addressed to the stand-by address for the load balancer, the second data packet may be transmitted to the second server.

The data flow may be a first data flow and the bucket ID for the first and second data packets may be a first bucket ID. A third data packet of a second data flow may be received with the third data packet being addressed to a primary address for the load balancer and with the third data packet including information for the second data flow. A second bucket ID for the third data packet may be computed as a function of the information for the second data flow, and responsive to the second bucket ID for the third data packet mapping only to a third server of the plurality of servers, the third data packet may be transmitted to the third server.

Before receiving the first, second, and third data packets, a mapping table may be defined including a plurality of bucket identifications (IDs) identifying a respective plurality of buckets. The mapping table may map the first bucket ID to the first server as a current server for the first bucket ID, the mapping table may map the first bucket ID to the second server as a new server for the first bucket ID, and the mapping table may map the second bucket ID to only the third server as a current server for the second bucket ID.

After transmitting the first, second, and third data packets, the mapping table may be revised so that the mapping table maps the first bucket ID only to the second server as a current server for the first bucket ID, and the mapping table may map the second bucket ID to only the third server as a current server for the second bucket ID.

After revising the mapping table, a fourth data packet may be received with the fourth data packet being addressed to the primary address for the load balancer and with the fourth data packet including information for the first data flow. The first bucket ID for the fourth data packet may be computed as a function of the information for the first data flow, and responsive to the first bucket ID for the fourth data packet mapping only to the second server of the plurality of servers, the fourth data packet may be transmitted to the second server.

The primary address may be a primary Internet Protocol (IP) address for the load balancer, and the stand-by address may be a stand-by Internet Protocol (IP) address for the load balancer.

Computing the bucket ID for the first data packet may include performing a hash function on the information for the data flow. The information for the data flow may include a data flow identification (ID) for the data flow, and performing the hash function may include performing the hash function on the data flow ID.

According to some other embodiments, a load balancer may be configured to forward data packets to a plurality of servers. The load balancer may include a network interface configured to receive data packets from an outside network, a server interface configured to forward data packets to the servers, and a processor coupled to the network interface and the server interface. The processor may be configured to receive a first data packet of a data flow through the network interface with the first data packet being addressed to a primary address for the load balancer and with the first data packet including information for the data flow, and to compute a bucket ID for the first data packet as a function of the information for the data flow. The processor may be further configured to transmit the first data packet through the server interface to the first server responsive to the bucket ID for the first data packet mapping to first and second servers of the plurality of servers and responsive to the first data packet being addressed to the primary address for the load balancer. The processor may also be configured to receive a second data packet of the data flow through the network interface with the second data packet being addressed to a stand-by address for the load balancer and with the second data packet including the information for the data flow, and to compute a bucket ID for the second data packet as a function of the information for the data flow with the bucket IDs for the first and second packets being the same bucket ID. In addition, the processor may be configured to transmit the second data packet through the server interface to the second server responsive to the bucket ID for the second data packet mapping to first and second servers of the plurality of servers and responsive to the second data packet being addressed to the stand-by address for the load balancer.

The data flow may be a first data flow and the bucket ID for the first and second data packets may be a first bucket ID. In addition, the processor may be configured to receive a third data packet through the network interface with the third data packet being addressed to the primary address for the load balancer and with the third data packet including information for a second data flow, to compute a second bucket ID for the third data packet as a function of the information for the second data flow, and to transmit the third data packet to a third server responsive to the second bucket ID for the third data packet mapping only to the third server of the plurality of servers.

The load balancer may also include memory coupled to the processor. Before receiving the first, second, and third data packets, the memory may be configured to define a mapping table including a plurality of bucket identifications (IDs) identifying a respective plurality of buckets. The mapping table may map the first bucket ID to the first server as a current server for the first bucket ID, the mapping table may map the first bucket ID to the second server as a new server for the first bucket ID, and the mapping table may map the second bucket ID to only the third server as a current server for the second bucket ID.

According to some other embodiments, a method of receiving data from a load balancer at a server may include defining a server flow table for the server, with the server flow table including data flow identifications for data flows being processed by the server. A data packet of a data flow may be received at the server from the load balancer with the data packet including information for the data flow. Responsive to a data flow identification of the data flow being omitted from the server flow table, a bucket identification (ID) for the data packet may be computed as a function of the information for the data flow. Responsive to the bucket ID for the data packet mapping to only the first server, a data flow identification for the data flow may be added to the server flow table; and the data packet may be processed.

The data packet may include a first data packet, and the data flow may include a first data flow. After adding the data flow identification for the first data flow to the server flow table, a second data packet of a second data flow may be received at the server from the load balancer with the second data packet including information for the second data flow. Responsive to a second data flow identification of the data flow being omitted from server flow table, a bucket identification (ID) for the second data packet may be computed as a function of the information for the second data flow, with the first and second data flows being different and with the bucket identifications for the first and second packets being the same. Responsive to the bucket ID for the first and second data packets mapping to the first server and to a second server and responsive to the bucket ID being mapped to the first server before being mapped to the second server, a redirect request associated with a stand-by address may be transmitted, and the second data packet may be dropped.

The stand-by address may include a stand-by Internet Protocol (IP) address and transmitting the redirect request may include transmitting a Hypertext Transfer Protocol (HTTP) redirect request including the stand-by IP address.

The second data packet may originate from a client device, and transmitting the redirect request may include transmitting the redirect request associated with the stand-by address to the client device.

The data packet may be a first data packet, and the data flow may be a first data flow. A second data packet of a second data flow may be received at the server from the load balancer with the second data packet including information for the second data flow. Responsive to a second data flow identification of the data flow being omitted from the server flow table, a bucket identification (ID) for the second data packet may be computed as a function of the information for the second data flow, with the first and second data flows being different and with the bucket identifications for the first and second packets being the same. Responsive to the bucket ID for the second data packet mapping to the first server and to a second server and responsive to the bucket ID being mapped to the second server before being mapped to the first server, a data flow identification for the second data flow may be added to the server flow table, and the second data packet may be processed.

The data packet may be a first data packet, and the data flow may be a first data flow. In addition, a second data packet of a second data flow may be received at the first server from the load balancer with the second data packet including information for the second data flow. Responsive to a data flow identification of the second data flow being included in the list of data flow identifications for data flows being processed by the first server, the second data packet may be processed at the first server.

Computing the bucket ID for the data packet may include performing a hash function on the information for the data flow. For example, the information for the data flow may include the data flow identification (ID) for the data flow, and performing the hash function may include performing the hash function on the data flow ID.

According to still other embodiments, a server may be configured to process data packets, and the server may include a load balancer interface configured to receive data packets from a load balancer, a memory configured to store a server flow table for the server with the server flow table including data flow identifications for data flows being processed by the server, and a processor coupled to the load balancer interface and to the memory. The processor may be configured to receive a data packet of a data flow through the load balancer interface from the load balancer wherein the data packet includes information for the data flow, and to compute a bucket identification (ID) for the data packet as a function of the information for the data flow responsive to a data flow identification of the data flow being omitted from server flow table. The processor may be further configured to add a data flow identification for the data flow to the server flow table responsive to the bucket ID for the data packet mapping to only the first server, and to process the data packet responsive to the bucket ID for the data packet mapping to only the first server.

The data packet may include a first data packet with the data flow including a first data flow. In addition, the processor may be configured to receive a second data packet of a second data flow through the load balancer interface from the load balancer wherein the second data packet includes information for the second data flow after adding the data flow identification for the first data flow to the server flow table. The processor may also be configured to compute a bucket identification (ID) for the second data packet as a function of the information for the second data flow responsive to a second data flow identification of the data flow being omitted from server flow table with the first and second data flows being different and with the bucket identifications for the first and second packets being the same. The processor may be further configured to transmit a redirect request associated with a stand-by address responsive to the bucket ID for the first and second data packets mapping to the first server and to a second server and responsive to the bucket ID being mapped to the first server before being mapped to the second server, and to drop the second data packet responsive to the bucket ID for the first and second data packets mapping to the first and second servers and responsive to the bucket ID being mapped to the first server before being mapped to the second server.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings:

FIGS. 9A and 9B are tables illustrating modification of bucket to blade mappings responsive to adding a server;

FIGS. 10A and 10B are tables illustrating modification of bucket to blade mappings responsive to removing a server;

FIGS. 11A and 11B are tables illustrating modification of bucket to blade mappings responsive to load rescheduling without adding or removing a server;

FIG. 12A is a flow chart illustrating load balancer operations for type-1 data flows using transient multicast/broadcast based distributed approaches, and FIG. 12B is a B2B mapping table according to some embodiments;

FIG. 13A is a flow chart illustrating blade/server operations for type-1 data flows using transient multicast/broadcast based distributed approaches corresponding to load balancer operations of FIG. 12A, and FIG. 13B is a my-flows-table according to some embodiments;

FIG. 14A is a flow chart illustrating load balancer operations for data flows using transient multicast/broadcast based distributed approaches, and FIG. 14B is a B2B mapping table according to some embodiments.

FIG. 15A is a flow chart illustrating blade/server operations for type-1 data flows using transient multicast/broadcast based distributed approaches corresponding to load balancer operations of FIG. 14A, FIG. 15B is a my-flows-table, and FIG. 15C is a my-buckets-table according to some embodiments;

FIG. 15D is a flow chart illustrating blade/server operations for type-1 data flows using distributed approaches corresponding to load balancer operations of FIG. 14A, FIG. 15E is a my-flows-table, and FIG. 15F is a my-buckets-table according to some embodiments;

FIGS. 16A and 16B are respective my flows and consolidated flows tables for a blade according to some embodiments;

FIG. 17A is a flow chart illustrating load balancer operations for data flows using transient multicast/broadcast based distributed approaches for type-2 data flows, and FIG. 17B is a B2B mapping table according to some embodiments;

FIG. 18A is a flow chart illustrating blade/server operations for type-2 data flows using transient multicast/broadcast based distributed approaches corresponding to load balancer operations of FIG. 17A, and FIGS. 18B, 18C, and 18D illustrate tables supporting operations of FIG. 18A according to some embodiments;

FIG. 18E is a flow chart illustrating blade/server operations for type-2 data flows using transient multicast/broadcast based distributed approaches corresponding to load balancer operations of FIG. 17A, and FIGS. 18F, 18G, and 18H illustrate tables supporting operations of FIG. 18A according to some embodiments;

FIG. 19 is VLAN Broadcast based implementation alternative for multicast operations according to some embodiments;

FIG. 20A is a flow chart illustrating load balancer operations for data flows using transient table based approaches for type-1 data flows according to some embodiments, FIG. 20B is a B2B mapping table according to some embodiments, and FIG. 20C is a transient table according to some embodiments;

FIG. 20D is a flow chart illustrating load balancer operations for data flows using transient table based approaches for type-1 data flows according to some embodiments, FIG. 20E is a B2B mapping table according to some embodiments, and FIG. 20F is a transient table according to some embodiments;

FIG. 21 illustrates a load balancer control table according to some embodiments;

FIG. 22 is a flow chart illustrating criteria used to determine when to return a transient state bucket to the steady state according to some embodiments;

FIGS. 23A, 23B, and 23C are tables illustrating reallocation of bucket to blade mappings responsive to addition of a new blade according to some embodiments;

FIGS. 24A, 24B, and 24C are tables illustrating reallocation of bucket to blade mappings responsive to removal of a blade according to some embodiments;

FIGS. 25A, 25B, and 25C are tables illustrating reallocation of bucket to blade mappings according to some embodiments;

FIG. 26A is a flow chart illustrating blade/server operations for data flows using redirect based approaches according to some embodiments, and FIGS. 26B and 26C illustrate tables supporting operations of FIG. 26A according to some embodiments;

FIG. 27a is a flow chart illustrating load balancer operations for data flows using redirect based approaches according to some embodiments, and FIG. 27B illustrates a mapping table supporting operations of FIG. 27A;

DETAILED DESCRIPTION

Embodiments of present inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. It should also be noted that these embodiments are not mutually exclusive. Components from one embodiment may be tacitly assumed to be present/used in one or more other embodiments. According to embodiments disclosed herein, a blade may be interpreted/implemented as a server and/or a server may be interpreted/implemented as a blade.

Figure 6:
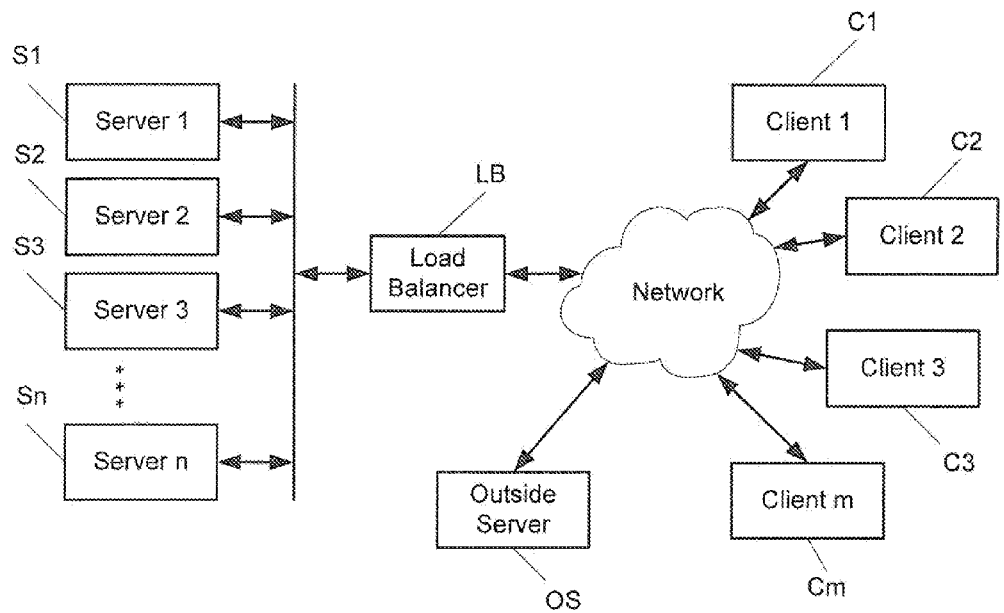
FIG. 6 is a block diagram illustrating processing systems including servers and a load balancer according to some embodiments.
Figure 7:
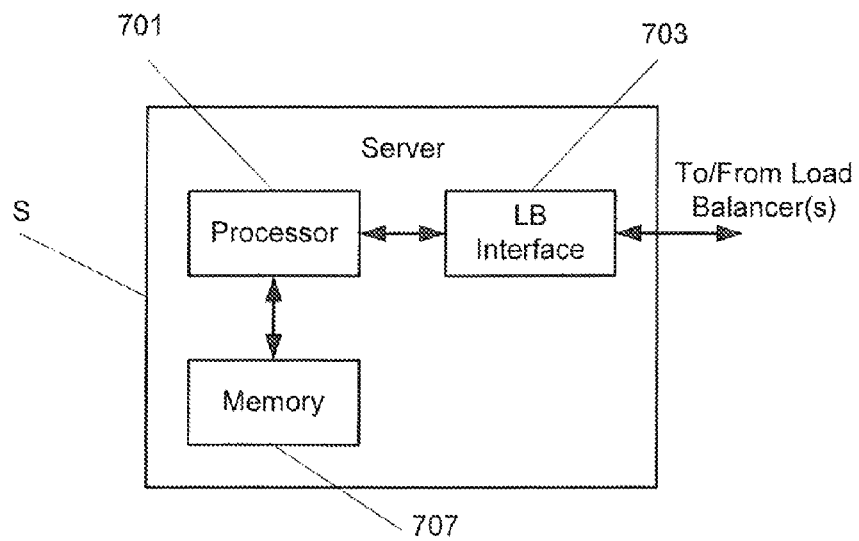
FIGS. 7 and 8 are block diagrams respectively illustrating a server and a load balancer of FIG. 6.
Figure 8:
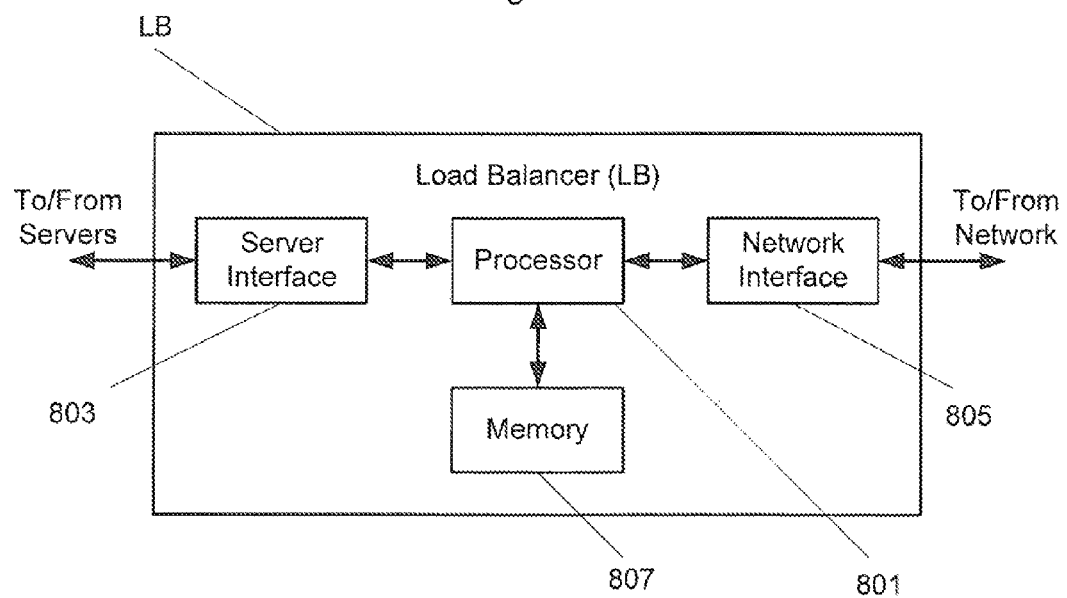

As shown in FIG. 6, processing systems according to some embodiments of inventive concepts disclosed herein may include a plurality of servers S1 to Sn and one or more load balancers LB coupled with a plurality of clients C1 to Cm and/or one or more outside servers OS through a network N (such as a local area network, a wide area network, the Internet, etc.). As shown in FIG. 7, each server S may include a processor 701, memory 707, and a load balancer interface 703 providing a communications interface with load balancer LB. Load balancer interface 703 may thus support transmission/reception of communications (including data packets and flows of data packets) between processor 701 and load balancer LB. As shown in FIG. 8, load balancer LB may include a processor 801, memory 807, server interface 803, and network interface 805. Server interface 803 may thus support transmission/reception of communications (including data packets and flows of data packets) to/from servers 51 to Sn, and network interface 805 may support transmission/reception of communications (including data packets and flows of data packets) to outside clients and/or servers over the network. As discussed in greater detail below, load balancer processor 801 may map different data flows/packets to different servers, and/or server processor 701 may accept/reject data flows/packets received from load balancer LB. While one load balancer LB is shown in FIG. 6, a plurality of load balancers may be provided for purposes of redundancy/resiliency.

According to some embodiments, hitless dynamic behavior (e.g., hitless addition and/or removal of blades/servers, hitless changes in the load distribution, etc.) and/or reduced hit dynamic behavior in hash based load balancing architectures may be provided while maintaining flow stickiness. In some embodiments, load balancing approaches may include: (1) Multicast/Broadcast Based Distributed Approaches; (2) Transient Table Based Approaches; and/or (3) HTTP Redirect based Approaches.

In multicast/broadcast based distributed approaches, packets in each bucket may be multicast to both original and new target blades for that bucket while Bucket to Blade (B2B) mapping changes dynamically. These approaches may maintain flow stickiness and hitless (or reduced hit) support for addition/removal/remapping of blades for both type 1 and type 2 flows. Load balancing operations may run in a distributed fashion (i.e., partially on the load balancer and partially on the blades themselves). Related load balancing operations are discussed, for example, in U.S. patent application Ser. No. 13/464,608 entitled "Two Level Packet Distribution With Stateless First Level Packet Distribution To A Group Of Servers And Stateful Second Level Packet Distribution To A Server Within The Group" filed May 4, 2012, the disclosure of which is hereby incorporated herein in its entirety by reference.

In transient tables based approaches, load balancing operations may be handled on the load balancer without burdening blades with additional operations to support load balancing. Moreover, load balancer LB provides unicast transmissions of packets thereby saving bandwidth. More particularly, transient tables are temporarily maintained in memory 807 at load balancer LB while changing bucket to blade mappings. Transient tables based approaches, however, may only support type 1 flows.

HTTP redirect based approaches are based on a concept of HTTP (Hypertext Transfer Protocol) redirect within an application layer. Each blade uses HTTP redirect to point the incoming flows to their new destination blade when the Bucket-to-Blade (B2B) mapping is modified. In this mechanism, there is no multicast of packets and/or there are no additional tables to be maintained. HTTP redirect based approaches may support both type-1 and type-2 flows, but may work only for HTTP traffic.

Multicast/broadcast based distributed approaches, transient table based approaches, and HTTP redirect based approaches are discussed in greater detail below.

Modifying a Bucket-to-Blade (B2B) Mapping Table

According to some embodiments, a bucket to blade (B2B) mapping table is maintained in memory 807 of load balancer LB, and the B2B mapping table includes a first column for bucket IDs, a second column for blade IDs (also referred to as current blade IDS), and a third column for old blade IDs. When a server/blade is added to, removed from, or reassigned within the plurality of servers/blades of FIG. 6, the B2B (Bucket-to-Blade) mapping table in load balancer memory 807 is modified. When a Blade ID (blade identification) corresponding to a certain bucket changes from Blade A to Blade B, for example, the original Blade ID (i.e., Blade A) is recorded in an additional column referred to as an Old Blade ID column, and this entry (the old blade ID) may be erased by control plane operations when it is no longer needed. In addition, the new blade ID (now the current blade ID or just blade ID) is recorded in the Current Blade ID column (or just the Blade ID column).

Addition of a Blade

Modification of a B2B mapping table responsive to adding a blade is illustrated in FIGS. 9A and 9B. Initially Buckets 1 through B are mapped to Blades 1, 2, and 3 using the mapping table of FIG. 9A saved in load balancer memory 807. When blade 4 is added to the plurality of blades of FIG. 6, Buckets 2 and 3 are remapped to Blade 4 as shown in the blade ID column (or current blade ID column) of FIG. 9B. The new Blade ID (i.e., Blade 4) is thus identified in the Blade ID column (also referred to as the current blade ID column) while the original (or old) Blade IDs (i.e., Blade ID 1 for Bucket ID 2 and Blade ID 2 for Blade ID 3 respectively) are preserved in the Old Blade ID column as shown in FIG. 9B.

By adding a new Blade (e.g., Blade 4) to the plurality of blades, additional capacity may be added to the system, and buckets originally mapped to previously existing blades may be remapped to the new blade to provide load balancing. Accordingly, data traffic to previously existing blades may be reduced while providing traffic for the newly added blade. In addition, the old blade ID column may be used according to some embodiments to support data flows from buckets 2 and 3 that began before and continue after the remapping.

A bucket is defined to be in steady-state when the Old Blade ID field corresponding to that bucket is empty. In FIG. 9A, for example, buckets 1, 2, 3, 4, and B are in steady state because no old blade ID is recorded for any of the buckets. In FIG. 9B, buckets 1, 4, and B are in steady state for the same reason.

A bucket is defined to be in a transient state if the Old Blade ID field corresponding to that bucket identifies an old blade ID (e.g., the old blade ID field is non-empty). Buckets 2 and 3 of FIG. 9B are considered to be in the transient state because old blade IDs 1 and 2 are respectively identified for buckets 2 and 3. Once a bucket has entered the transient state, the bucket may reenter the steady state when the old blade ID entry is erased, for example, by control plane operations.

Removal of a Blade

Modification of a B2B mapping table responsive to removing a blade is illustrated in FIGS. 10A and 10B. Initially, Buckets 1 through B are mapped to Blades 1, 2 and 3 with all buckets in the steady state as shown in FIG. 10A. Blade 3 is then removed, for example, for scheduled maintenance. Bucket 1 (which was originally mapped to and served by Blade 3) is now assigned/mapped to Blade 2 as shown in FIG. 10B, and this change is reflected in the Blade ID (or current blade ID) and old blade ID columns of FIG. 10B. In particular, the original Blade ID (i.e., Blade 3) is now recorded in the Old Blade ID column for bucket 1, and the new blade ID (i.e., Blade 2) is now recorded in the blade ID (or current blade ID) column for bucket 1. Once the mapping table is modified as shown in FIG. 10B, Bucket 1 is considered to be in the transient state while buckets 2, 3 and 4 are considered to be in steady state.

By removing a Blade (e.g., Blade 3) from the plurality of blades, capacity may be reduced, and buckets originally mapped to the blade that is removed may be remapped to a remaining blade to provide load balancing. Accordingly, data traffic to previously existing blades may be increased. In addition, the old blade ID column may be used according to some embodiments to support data flows from bucket 1 that began before and continue after the remapping.

Reallocation of Buckets to Blades

Modification of a B2B mapping table responsive to rescheduling data flows is illustrated in FIGS. 11A and 11B. An initial mapping between Buckets 1 through B and Blades 1, 2 and 3 is shown in FIG. 11A. This mapping may be modified, for example, to provide load balancing even though no blades have been added or removed. For example, a load of Blade 1 may increase so that some of its traffic should be offloaded to Blade 3 by reassigning Bucket 4 to Blade 3. The original serving blade (i.e., Blade 1) is recorded in the Old Blade ID column for bucket 4 while Blade 3 takes its place in the (current) Blade ID column for bucket 4. In FIG. 11B, Bucket 4 is considered to be in transient state while buckets 1, 2 and 3 are considered to be in steady state.

Transient Multicast/Broadcast Based Distributed Approach (Approach I)

A Multicast/Broadcast Based Distributed Approach may enable hitless (or reduced hit) addition, removal, and/or reallocation of blades while maintaining flow stickiness. In this approach, packets that belong to buckets in steady-state may be unicast from load balancer LB to respective blades (as identified by the current blade IDs for the respective steady state bucket IDs), packets that belong to buckets in transient state may be multicast/broadcast (to both current and old blades) for the buckets in transient state. In this case, additional operations may be performed on each blade to determine whether each received packet is to be processed or dropped. This sharing of operations between load balancer and servers is referred to as a distributed approach, and this approach may work for both type-1 and type-2 flows.

While discussion of transient multicast/broadcast operations is provided for a multicast group of 2 for the sake of conciseness, embodiments of inventive concepts may be implemented with larger multicast groups. Transient Multicast/Broadcast based distributed approaches, for example, may be generalized to larger multicast groups discussed below in the section entitled "Extended Operations For Multiple Cascaded Transients". Similarly, operations disclosed herein are not limited to multicast. These operations may be generalized using, for example, VLAN based broadcast, as briefly discussed below in the section entitled "VLAN Based Broadcast Implementation Alternative".

For Type-1 Flows

As discussed above, type-1 data flows are those data flows for which it is possible to detect the start of the data flow or the first data packet of the data flow by considering only bits in the first data packet of the data flow (i.e., without consulting any other data/information). In this section, a multicast based distributed approach is presented for type-1 flows, with type-1 flows being the ones that are most commonly encountered. This approach may be broken into two parts: data plane operations; and control plane operations.

Data plane operations may primarily be used to handle how incoming data packets are forwarded to and received by the blades assuming an instance of a B2B Mapping Table at any given point in time. Data plane operations may include operations running on both the load balancer and the blades. Control plane operations may primarily be used to handle maintenance and modification of the load balancer table.

Data Plane Operations for Type-1 Flows

In this approach, a two-stage 'distributed' mechanism may be followed. The first stage includes the screening of packets at the load balancer LB to make an appropriate forwarding decision. The second stage includes the screening of received packets at the blade.

Operations at the load balancer are discussed as follows. A B2B mapping table is maintained in memory 807 at load balancer LB. For every incoming data packet, load balancer processor 801 obtains the Bucket ID using the hash function. The bucket ID may be computed as a hash of element(s) of the packet header (e.g., a hash of the Flow ID including in the packet header). If the bucket is in steady state, the packet is unicast to the blade (identified in the current blade ID column of the B2B mapping table) corresponding to the bucket. If the bucket is in transient state (with both current and old blades identified for the bucket) and the data packet is an initial data packet of the data flow (as indicated by an INIT identifier), the packet is unicast to the current blade ID for the transient state bucket. If the bucket is in transient state and the data packet is not an initial data packet of the data flow, the packet may be multicast to both the current blade and the old blade as indicated in the blade ID and old blade ID columns of the B2B mapping table.

FIG. 12A is a flow chart illustrating load balancer processor 807 operations for type-1 data flows using transient multicast/broadcast based distributed approaches according to some embodiments. FIG. 12B is a B2B mapping table provided for the purpose of discussion with FIG. 12A. At block 1200, processor 801 defines/revises B2B mapping table of FIG. 12B in memory 807. As discussed above, a bucket is in the steady state if the corresponding Old Blade ID field is empty for that bucket. In the example of FIG. 12B, Buckets 2 and G are in steady-state while Bucket 1 is in transient state. Accordingly, any packet that belongs to Bucket 2 will be unicast only to Blade 3. This includes both initial (INIT) and subsequent (non-INIT) data packets of data flows. Any INIT packet that belongs to Bucket 1 will be unicast by load balancer LB only to Blade 4, and a non-INIT data packet that belongs to Bucket 1 will be multicast to both blades 4 and 7.

By way of example, a first data packet may be received at block 1201 from the network through network interface 805, and processor 807 may perform the hash function on a flow ID from a header of the first data packet at block 1203 to obtain a bucket ID corresponding to the flow ID. If the hash function outputs bucket ID 2, processor 807 consults the B2B mapping table (e.g., as shown in FIG. 12B) to determine the state (steady state or transient state) of bucket 2 at block 1205. As shown in FIG. 12B, bucket 2 is steady state because there is no old blade identified in its old blade field. Accordingly, the first data packet is unicast only to blade 3 (the blade identified for bucket 2 in the B2B mapping table of FIG. 12B) at block 1211 through server interface 803.

A second data packet may be received at block 1201 from the network through network interface 805, and processor 807 may perform the hash function on a flow ID from a header of the second data packet at block 1203 to obtain a bucket ID corresponding to the flow ID. If the hash function outputs bucket ID 1, processor 807 consults the B2B mapping table (e.g., as shown in FIG. 12B) to determine the state (steady state or transient state) of the bucket at block 1205. As shown in FIG. 12B, bucket 1 is in the transient state because bucket 7 is identified as an old blade in its old blade field. Provided that the second data packet is not an initial data packet of a data flow at block 1207, the data packet is multicast to both the current blade (blade 1) and the old blade (blade 7) at block 1209 through server interface 803. If the second data packet is an initial data packet of a data flow at block 1207, the data packet is unicast to only the current blade (blade 1) at block 1211 through server interface 803. By transmitting all initial data packets for new data flows to only the current blade of a bucket in the transient state, the current blade is effectively signaled to establish all new data flows for the bucket in the transient state. By multicasting all non-initial data packets to both the current and old blades for the bucket in the transient state, the current blade can service all new data flows initiated after the bucket entered the transient state, and the old blade can continue servicing all data flows that were initiated before the bucket entered the transient state. According to some embodiments, initial data packets for a transient state bucket (as determined at block 1207) may thus be unicast only to the current blade at block 1211, and non-initial data packets for a transient state bucket (as determined at block 1207) may be multicast to both current and old blades at block 1209.

In embodiments of FIG. 12A, some additional screening may occur at the blades to determine which blade should process packets that were multicast. For example, each blade may maintain a list of flow IDs for data flows being processed by that blade, and this list may be referred to as a 'my-flows-table'. While a more detailed architecture of the my-flows-table may be useful for discussion of control plane operations, for purposes of data plane operations, a 'my-flows-table' including a list of flow IDs for data flows being processed by that blade may be sufficient. If the blade receives an initial data packet of a data flow (e.g., indicated by an INIT flag in header information) indicating that this data packet is a first data packet for a new data flow, processor 701 adds the flow ID to its my-flow table and processes the packet. As shown in FIG. 12A, all initial data packets for transient state buckets are identified at block 1207 and unicast to only the current blade for the transient state bucket at block 1211 allowing the current blade for the transient state bucket to identify all new data flows. Stated in other words, load balancer LB is able to inform each blade of the data flows to be processed by that blade by unicasting all INIT packets only to the blade that is to process that data flow for the INIT packet. By creating a 'my-flows-table' for a blade based on the INIT packets received at that blade, a blade can process only those non-INIT packets having data flow IDs matching a data flow ID of an INIT packet received by that blade. The old blade for the transient state bucket will thus not add any new flows to its 'my-flows-table' once the bucket enters the transient state. The old blade, however, will maintain its 'my-flows-table' identifying data flows initiated before the bucket entered the transient state, and the old blade can continue accepting/processing non-initial data packets of these data flows that were initiated before the bucket entered the transient state.

If a received non-INIT data packet is unicast from load balancer LB at block 1211 for a steady state bucket, the packet is being sent only to the blade that is to process the non-INIT data packet, and the receiving blade should thus process this packet because the receiving blade should have the data flow for this non-INIT data packet in its 'my-flows-table'. As shown in FIG. 12A, a NON-INIT packet is unicast only for steady state buckets, while non-INIT packets for transient state buckets are always multicast to both the current and old blades at block 1209. If a blade receives a non-INIT data packet that was multicast to multiple blades, the blade checks if the non-INIT data packet belongs to one of the flows listed in my-flows-table. If the non-INIT data packet does belong to a data flow identified in the my-flows-table, the blade processes the packet. If the non-INIT data packet does not belong do a data flow identified in the my-flows-table, the blade drops the packet.

FIG. 13A is a flow chart illustrating blade/server operations for type-1 data flows using transient multicast/broadcast based distributed approaches corresponding to load balancer operations of FIG. 12A, and FIG. 13B is a 'my-flows-table' according to some embodiments. At block 1300, processor 701 defines/revises the my-flows-table (generically referred to as a server flow table) of FIG. 13B in memory 707. When a data packet is received through interface 703 at block 1301, processor 701 determines if the data packet is an initial data packet of a new flow at block 1303 (e.g., by checking for an INIT flag in a header of the data packet). If the data packet is an initial data packet at block 1303, processor 701 adds a data flow ID for the new data flow to the my-flows-table of FIG. 13B at block 1305, and processor 701 processes the data packet at block 1307. Processor 701 can thus take responsibility for every new data flow for which it receives the initial data packet (e.g., indicated by a INIT flag) because the load balancer unicasts each initial data packet of a data flow to only one blade (i.e., the current blade for the respective bucket) as discussed above with respect to FIG. 12A.

If the data packet is not an initial data packet (referred to as a non-initial data packet) at block 1303 (e.g., the non-initial data packet does not include an INIT flag), processor 701 determines if the non-initial data packet belongs to a data flow being handled by the blade. More particularly, processor 701 compares a data flow ID of the non-initial data packet (e.g., included in a header of the packet) with data flow IDs from the 'my-flows-table' of FIG. 13B (identifying data flows being handled by the blade). If the non-initial data packet does belong to a data flow being handled by the blade at block 1309, the blade processes the non-initial data packet at block 1307. If the non-initial data packet does not belong to a data flow being handled by the blade at block 1309, the blade drops the non-initial data packet at block 1311.

Alternate Data Plane Operations for Type-1 Flows

In this section, another two-stage 'distributed' data plane algorithm is described. These alternate operations may provide a relatively simplified load balancer, such that the load balancer merely forwards the packets based on the buckets they are hashed to. In this approach, there is no assumption as to whether load balancer is capable of identifying start-of-the-flow (INIT) packets. Even though some operations of this approach may be common with respect to operations discussed above with respect to FIGS. 12A-B and 13A-B, a detailed description is provided for clarity/completeness.

At the load balancer LB, a bucket to blade (B2B) mapping table is maintained, and for every incoming packet, the Bucket ID is obtained using the hash function (e.g., by computing a hash of an element of the packet header such as the Flow ID). If the bucket is in steady state, the packet is unicast to the blade corresponding to the bucket (i.e., the current blade from the B2B table for the bucket). If the bucket is in transient state, the load balancer multicasts the packet to both the current Blade ID and the Old Blade ID identified in the B2B mapping table.

FIG. 14A is a flow chart illustrating load balancer operations for data flows using transient multicast/broadcast based distributed approaches where knowledge of initial/non-initial data packet status is not used, and FIG. 14B is a B2B mapping table according to some embodiments. In FIG. 14A, operations of blocks 1200, 1201, 1203, and 1205 may be the same as discussed above with respect to FIG. 12A. If the hash function maps the flow ID of a received data packet to a bucket (e.g., bucket 1) in transient state at block 1205, LB processor 801 multicasts the data packet (through server interface 803) to both of the current and old blades (e.g., blades 4 and 7) for the transient state bucket identified in the B2B mapping table of FIG. 14B at block 1409. If the hash function maps the flow ID of a received data packet to a bucket (e.g., bucket 2) in steady state at block 1205, LB processor 801 unicasts the data packet (through server interface 803) to the current blade (e.g., blade 3) for the steady state bucket identified in the B2B mapping table of FIG. 14B at block 1411. In FIG. 14A, LB processor 801 does not consider an initial/non-initial status of the received data packets, effectively removing block 1207 of FIG. 12A.

As shown in FIGS. 1409 and 1411, load balancer LB may transmit data packets with a unicast/multicast indicator to identify the transmission as a multicast or unicast transmission to the receiving blade or blades. According to some embodiments, the multicast/unicast indicator may be provided as the destination address of the data packet. If the data packet is transmitted as a multicast to both the current and old blades of bucket 1 (in transient state) at block 1409, for example, load balancer processor 801 may include a multicast destination address (with addresses/IDs of both blade 4 and blade 7) in the header of the data packet. If the data packet is transmitted as a unicast to only the current blade of bucket 2 (in steady state) at block 1411, for example, load balancer processor 801 may include a unicast destination address (with address/ID of only blade 3) in the header of the data packet. The receiving blade or blades can thus determine whether a received data packet was transmitted from the load balancer as a unicast or multicast transmission based on the destination address or addresses included in the data packet. According to some other embodiments, the load balancer LB may transmit each data packet with an indicator flag having a first value (e.g., one) for a multicast transmission and a second value (e.g., zero) for a unicast transmission.

The potentially reduced complexity of load balancer operations of FIG. 14A (e.g., disregarding the initial/non-initial status of received data packets) relative to FIG. 12A, however, may require additional processing at the blades (relative to FIG. 13A) to decide whether a received packet is to be processed or dropped.

Each blade may maintain both a list of flow IDs for data flows being processed by that blade (also referred to as a server flow table) as well as list of buckets that the blade is serving (also referred to as a buckets table), and both lists may be provided in a table referred to as a 'my-flows-and-buckets-table'. A more detailed architecture of this table may be significant from a control plane perspective, but for purposes of data plane operations, each blade may include a list of flow IDs for data flows being processed by the blade and a list of buckets that the blade is serving.

If the load balancer unicasts a data packet (so that the data packet includes a unicast indicator) to only one blade in accordance with operations of FIG. 14A, the blade receiving the data packet (with the unicast indicator) is intended to process that packet. If an initial data packet with a unicast indicator is received at a blade through LB interface 703, the blade processor 701 may add a flow ID for the initial data packet to the list of data flows in the 'my-flows-and-buckets-table', and the blade processor may determine a bucket ID for the data flow (by computing a hash of the flow ID) and add the bucket ID to the list of bucket IDs in the 'my-flows-and-buckets-table'. If an initial data packet with a multicast indicator is received at a blade through LB interface 703, the blade processor 701 may obtain a bucket ID for the initial data packet by computing a hash of the flow ID and compare the resulting bucket ID with the list of bucked IDs in the 'my-flows-and-buckets-table' to determine if the initial data packet was from a bucket being served by the blade. If the multicast initial data packet is from a bucket being served by the blade, the blade processor 701 adds the flow ID to the list of flow IDs in the 'my-flows-and-buckets-table' and processes the data packet. If the multicast initial data packet is from a bucket that is not being served by the blade, the blade processor 701 drops the packet. If a non-initial data packet is received as a multicast (e.g., with a multicast indicator), the blade processor 701 looks up the flow ID in the my-flows-and-buckets table. If the flow ID is not present in flow ID list of the 'my-flows-and-buckets-table', the non-initial multicast data packet belongs to a flow of another blade, and the blade processor 701 can drop the packet. If the flow ID is present in the flow ID list of the 'my-flows-and-buckets-table', the non-initial multicast data packet belongs to a flow being handled by the blade, and the blade processor 701 can process the packet.

FIG. 15A is a flow chart illustrating blade/server operations for type-1 data flows using transient multicast/broadcast based distributed approaches corresponding to load balancer operations of FIG. 14A, FIG. 15B is a my-flows-table, and FIG. 15C is a my-buckets-table according to some embodiments. Operations of FIG. 15A may be performed by processor 701, and the my-flows-table and the my-buckets-table may be saved in memory 707. At block 1500, processor 701 may define/revise the server flows and buckets tables of FIGS. 15B and 15C in memory 707. When a data packet is received through interface 703 at block 1501, processor 701 determines if the data packet was transmitted from the load balancer LB as a unicast or a multicast transmission at block 1503. As discussed above with respect to FIG. 14A, a data packet may be transmitted with a unicast/multicast indicator (e.g., a unicast destination address or a multicast destination address) to allow blade processor 701 to determine whether the data packet was a unicast or multicast data packet at block 1503.

If the data packet is a unicast data packet at block 1503 and an initial data packet for a new data flow (e.g., as indicated by an INIT flag) at block 1505, processor 701 may perform the hash function on the flow ID of the data packet to compute a bucket ID used to process the data packet at the load balancer at block 1507. Processor 701 may then add the flow ID for the new flow to the my-flows table at block 1511, and process the data packet at block 1517. By adding the flow ID to the table of FIG. 15B in memory 707, processor 701 can identify subsequent data packets belonging to the new data flow for processing at block 1517 whether the subsequent data packets are unicast or multicast. If the data packet is a unicast data packet at block 1503 and a non-initial data packet for a previously established data flow (e.g., as indicated by the absence of an INIT flag) at block 1505, processor 701 may process the data packet at block 1517 without performing operations of blocks 1507 and/or 1511.

If the data packet is a multicast data packet at block 1503 and an initial data packet for a new data flow (e.g., as indicated by an INIT flag) at block 1519, processor 701 may perform the hash function on the flow ID of the data packet to compute a bucket ID used to process the data packet at the load balancer at block 1521. If the resulting bucket ID is included in the table of FIG. 15C (meaning that the blade is serving data flows from that bucket) at block 1523, processor 701 may add the data flow ID to the table of FIG. 15B at block 1511, and process the data packet at block 1517. If the resulting bucket ID is not included in the table of FIG. 15C at block 1523, then processor 701 may drop the data packet at block 1527. If the data packet is a multicast data packet at block 1503 and a non-initial data packet for a previously established data flow (e.g., as indicated by the absence of an INIT flag) at block 1519, processor 701 may determine at block 1525 if the flow ID of the data packet is included in the table of FIG. 15B. If the flow ID is included in the table of FIG. 15B at block 1525, processor 701 may process the data packet at block 1517. If the flow ID is not included in the table of FIG. 15B at block 1525, processor 701 may drop the data packet at block 1527.

In embodiments of FIG. 15C, the control plane may maintain the my-buckets-table for each server. The my-buckets-table may provide a list of bucket IDs identifying the buckets that are mapped to the server associated with the my-buckets-table. The control plane may thus define/update/modify a respective my-buckets table for each server coupled to the load balancer LB.

While not shown in FIG. 15B, the table of FIG. 15B may also include the bucket ID associated with each flow ID (separate from the table of FIG. 15C). Once the bucket ID is identified at block 1507 (or at block 1521), the flow ID and associated bucket ID for the new flow may be added to the My-Flows table at block 1511.

FIGS. 15D, 15E, and 15F illustrate alternative server operations (relative to those discussed above with respect to FIGS. 15A, 15B, and 15C) where the server/blade does not need to differentiate whether traffic is unicast or multicast. FIGS. 15E and 15F are my-flows and my-buckets tables that may be the same as FIGS. 15B and 15C discussed above. Where reference numbers of FIG. 15D are the same as corresponding reference numbers of FIG. 15A, the corresponding operations having the same reference numbers may be the same/similar.

FIG. 15D is a flow chart illustrating blade/server operations for type-1 data flows using transient multicast/broadcast based distributed approaches corresponding to load balancer operations of FIG. 14A, FIG. 15E is a my-flows-table, and FIG. 15F is a my-buckets-table according to some embodiments. Operations of FIG. 15D may be performed by processor 701, and the my-flows-table and the my-buckets-table may be saved in memory 707. At block 1500, processor 701 may define/revise the server flows and buckets tables of FIGS. 15B and 15C in memory 707. When a data packet is received through interface 703 at block 1501, processor 701 determines if the data packet is an initial or non-initial data packet for a data flow.

If the data packet is an initial data packet for a new data flow (e.g., as indicated by an INIT flag) at block 1519, processor 701 may perform the hash function on the flow ID of the data packet to compute a bucket ID used to process the data packet at the load balancer at block 1521. If the resulting bucket ID is included in the table of FIG. 15F (meaning that the blade is serving data flows from that bucket) at block 1523, processor 701 may add the data flow ID to the table of FIG. 15E at block 1511, and process the data packet at block 1517. If the resulting bucket ID is not included in the table of FIG. 15F at block 1523, then processor 701 may drop the data packet at block 1527. If the data packet is a non-initial data packet for a previously established data flow (e.g., as indicated by the absence of an INIT flag) at block 1519, processor 701 may determine at block 1525 if the flow ID of the data packet is included in the table of FIG. 15E. If the flow ID is included in the table of FIG. 15E at block 1525, processor 701 may process the data packet at block 1517. If the flow ID is not included in the table of FIG. 15E at block 1525, processor 701 may drop the data packet at block 1527.

In embodiments of FIG. 15D, the control plane may maintain the my-buckets-table for each server. The my-buckets-table may provide a list of bucket IDs identifying the buckets that are mapped to the server associated with the my-buckets-table. The control plane may thus define/update/modify a respective my-buckets table for each server coupled to the load balancer LB.

While not shown in FIG. 15E, the table of FIG. 15E may also include the bucket ID associated with each flow ID (separate from the table of FIG. 15F). Once the bucket ID is identified at block 1521, the flow ID and associated bucket ID for the new flow may be added to the My-Flows table at block 1511.

Control Plane Operations for Type-1 Flows

In this section, control plane embodiments are discussed. There are multiple viable ways in which a control plane can be implemented depending on the use case and various embodiments are disclosed herein.

As discussed above, the a bucket enters the transient state from the steady state when the Blade ID corresponding to the bucket is modified and the original Blade ID is recorded in the Old Blade ID column. Control plane operations may be used to decide when the bucket can return to the steady state after having entered the transient state. When a signal is received from the control plane indicating that the bucket should return to the steady state (from the current transient state), the Old Blade ID field corresponding to the bucket is erased. The control plane may thus decide when the Old Blade ID is no longer needed.

For example, an Old Blade ID may no longer needed when all flows belonging to the bucket that are mapped to the Old Blade ID have ended. In other words, the Old Blade ID for bucket 'x' may no longer be needed when a number of connections on and/or data flows to the old blade that correspond to bucket 'x' go to zero. This criterion, however, may be unnecessarily strict. For example, a few connections may be active for a very/relatively long time, connections may be inactive but kept open for a relatively long time, or FIN/FINACKs (end of data flow indicators) may go missing. Under such conditions, a bucket may be in the transient state for an unnecessarily long time, resulting in a loss of bandwidth due to unnecessary multicast transmissions and/or additional processing on blades. Therefore, a mechanism that provides a reasonable criterion to conclude that Old Blade ID for the bucket is no longer needed may be desired.

As discussed above, a more detailed architecture of the My-flows-table may be useful from the control plane perspective. FIG. 16A is a table illustrating an example of a my-flows table that may be stored in memory 707 of a blade. In table 16A, each data flow being processed by the blade is provided in a row of the my-flows-table, with each row identifying a different flow ID (identifying the respective data flow), a bucket ID identifying the bucket to which the flow ID maps (based on the hash function), a bit-rate for the data flow, and a timer value. The timer for a data flow refers to the time at which a last (most recent) data packet for the data flow was received. Based on information in the my-flows-table of FIG. 16A, the blade processor 701 may also generate a consolidated version of the my-flows-table which can be used to assist control plane decision making. The consolidated flows table of FIG. 16B provides the data of the my-flows-table grouped by bucket ID. Stated in other words, the my-flows-table of FIG. 16A provides a row for each data flow (with multiple data flows potentially mapping to the same bucket ID, e.g., with Flow IDs 216.43.56.23 and 200.1.12.10 both mapping to bucket ID 5), while the consolidated flows table of FIG. 16B provides one row for each bucket ID (without providing separate information for data flows). The number of connections column identifies the number of data flows handled by the blade that map to the respective bucket ID, the net bit-rate column identifies a net bit-rate for all of the data flows handled by the blade that map to the respective bucket ID, and the timer column identifies the time at which a last (most recent) data packet was received for any data flow mapping to the respective bucket ID. Of the data flows mapping to bucket 5 in the my-flows-table of FIG. 16A, the most recent of these timer values is used for bucket 5 in the consolidated flows table of FIG. 16B.

Information from the consolidated flows table of FIG. 16B, for example, may be used to determine when a flow of packets from an bucket to the blade is no longer significant. For example, a criterion may be based on a number of data flows (# connections) to the blade which map to a given bucket ID dropping below a certain threshold. As discussed above, requiring the number of data flows to drop to zero may be an unnecessarily strict criterion, and the number of data flows reaching a near zero number may be good enough. Care should be taken when using this criterion, however, because a relatively small number of data flows may be significant if the relatively small number of connections generate significant data throughput (i.e., net bit-rate). As shown in FIG. 16B, only two data flows may map to bucket 2, but these data flows may account for a significant net bit-rate.

Another criterion may be based on a net bit-rate corresponding to the bucket being less than a threshold. A low net bit-rate may be a good reason to drop the existing flows corresponding to the bucket and release the bucket to a steady state.

Still another criterion may be based on the timer which can be used to determine periods of inactivity. If the last data packet from any data flow for a bucket was received a relatively long time ago, data flows from that bucket may be inactive. If the flows corresponding to the bucket have been inactive for a sufficiently long period of time, that bucket may be dropped to the steady state without significant loss of data.

One or more of the above referenced criterion may be used alone or in combination to determine when a bucket should be returned from the transient state to the steady state. Additionally, For type-1 flows, a Consolidated Flows Table may also be created and maintained at the load balancer LB for each blade. The load balancer can keep track of numbers of connections for each blade by incrementing or decrementing a respective connection counter whenever an outgoing INIT/INITACK or FIN/FINACK packet is generated for the blade. It may also be possible to keep track of bucket net bit-rates and/or last packets received in a similar manner for each blade.

For Type 2 Flows

As discussed above, type-2 flows are data flows which may be substantially arbitrary such that initial packets of a type-2 data flow may be difficult to identify when considering packet header information. In this section, a multicast based distributed approach is discussed for type-2 data flows. The approach may include two parts: data plane operations; and control plane operations. Data plane operations may primarily handle how incoming data packets are forwarded to and received by the blades assuming an instance of a B2B Mapping Table at any given point in time. Data plane operations may include operations running on both the load balancer and the blades. Control plane operations may be used to maintain and modify the B2B Mapping Table residing on load balancer memory 807.

Data Plane Operations for Type-2 Flows

In this approach, a two-stage 'distributed' mechanism may be used (similar to that discussed above with respect to type-1 flows). The first stage includes screening data packets at the load balancer to make an appropriate forwarding decision. The second stage includes screening of received packets at the blade. Because the load balancer may be unable to identify start-of-the-flow/INIT data packets for type-2 data flows, the load balancer forwarding decisions for type-2 data flows may be based on whether the bucket to which a data packet maps is in steady state or transient state (without considering whether the data packet is an initial or subsequent data packet of its data flow).

Load balancer LB operations may include maintaining a B2B mapping table at load balancer memory 807. For each incoming data packet, load balancer processor 801 may obtain the Bucket ID using the hash function. As discussed above, the Bucket ID is computed as a hash of an element of the packet header such as the Flow ID. If the bucket is in steady state, the data packet is unicast to the blade corresponding to the bucket (i.e., the current blade identified for the bucket ID in the B2B mapping table). If the bucket is in transient state, the data packet is multicast to both current Blade ID and Old Blade ID (i.e., the current blade and the old blade identified for the bucket ID in the B2B mapping table).

FIG. 17A is a flow chart illustrating operations of the above data plane operations implemented by load balancer processor 801. Operations of FIG. 17A may be the same as and/or similar to those discussed above with respect to FIG. 14A. As discussed above, a bucket is in the steady state if the corresponding Old Blade ID field for that bucket is empty. As an example, in FIG. 17A, Bucket 2 is in steady-state while Bucket 1 is not (i.e. Bucket 1 is in transient state). Therefore, any data packet that maps/belongs to Bucket 2 will be forwarded to Blade 3 only, while any data packet that maps/belongs to Bucket 1 will be forwarded to both Blade 4 and Blade 7. These forwarding decisions will be the same for both initial (INIT) and non-initial (non-INIT) data packets because load balancer processor 801 may be unable to distinguish initial and non-initial data packets for type-2 data flows.

According to some embodiments, the multicast/unicast indicator may be provided as the destination address of the data packet. If the data packet is transmitted as a multicast to both the current and old blades of bucket 1 (in transient state) at block 1409, for example, load balancer processor 801 may include a multicast destination address (with addresses/IDs of both blade 4 and blade 7) in the header of the data packet. If the data packet is transmitted as a unicast to only the current blade of bucket 2 (in steady state) at block 1411, for example, load balancer processor 801 may include a unicast destination address (with address/ID of only blade 3) in the header of the data packet. The receiving blade or blades can thus determine whether a received data packet was transmitted from the load balancer as a unicast or multicast transmission based on the destination address or addresses included in the data packet.

At the Blades

A Multicast Partner of a blade for a given data packet/flow is defined as the other blade (in a multicast group) to which a data packet/flow is being multicast (forwarded). Stated in other words, a multicast group for a transient state bucket is defined to include the current and old blades for the transient state bucket, and each blade of the multicast group is defined as a multicast partner of the other blade(s) of the multicast group. In operations discussed above, a data packet may be multicast to at most two blades (the current and old blade for the corresponding transient state bucket). According to such embodiments, a blade will have at most one multicast partner for any given data packet. By way of example, for operations of FIGS. 17A and 17B, Blade 7 is the multicast partner of Blade 4, and Blade 4 is the multicast partner of Blade 7 for any data packets/flows that hash to Group 1 in the illustrated transient state.

A blade can determine its multicast partner for a given packet by considering the destination multicast group address that the data packet is sent to. As discussed above, the header of each data packet may include a unicast/multicast destination address allowing a receiving blade to determine whether the data packet was transmitted as a unicast or multicast transmission, and also allowing the receiving blade to identify a multicast partner(s) for any multicast data packets. Each receiving blade can thus maintain a mapping between active multicast group addresses and constituent blades. Each receiving blade can also determine its multicast partner(s) by hashing the flow ID of the packet to obtain Bucket ID and then looking it up in the B2B Mapping Table to determine which other (old or current) Blade ID it is being grouped with. The load balancer may also encode the multicast partner in one of the header fields. In summary, regardless of the implementation, a blade may be able to identify its multicast partner.

Operations running on the blades may be summarized as follows with reference to FIGS. 18A, 18B, and 18C.

Each blade maintains a list of data flow IDs being processed by that blade and a list of buckets being served by that blade, referred to as a 'my-flows-table' as shown in FIG. 18B and a 'my-buckets-table' as shown in FIG. 18D. While a more detailed architecture of this table may be significant from a control plane perspective, for data plane operations, the lists of FIGS. 18B and 18C are sufficient. For purposes of data plane operations, it may be sufficient to have on each blade a list of data flow IDs and buckets IDs for buckets being served by the blade (saved in memory 707). If the blade is a part of a multicast group, the blade also maintains a list of data flow IDs that its Multicast Partner is currently serving as shown in FIG. 18C. Note that the blade may need to maintain partner data flows only for transient state buckets being served by the blade. Furthermore, the blade only needs to maintain a list of those partner flows which correspond to transient state buckets being served by the blade.

At block 1800, processor 701 defines/revises data flow and bucket lists of FIGS. 18B and 18D and the list of multicast partners of FIG. 18C in memory 707. Responsive to receiving a data packet from the load balancer at block 1801 through LB interface 703, processor 701 determines if the packet was received as a unicast or a multicast at block 1803. If the packet header includes only one destination blade address (i.e., the blade address of the receiving blade), processor 701 can determine that the data packet was unicast. If the packet header includes multiple destination blade addresses (i.e., the blade addresses of the receiving blade and a multicast partner blade), processor 701 can determine that the data packet was multicast.

If the blade receives a packet as a unicast (e.g., only one destination blade address for the blade is included in the packet header) at block 1803, the data packet is intended for that blade for processing, and the blade processes the packet. If the data packet is an initial data packet for a new data flow (i.e., the flow address is not already included in the list of data flows of the my-flows table) at block 1805, processor 701: performs the hash function on the flow ID at block 1807 to determine the bucket ID for the data flow; adds the flow ID to the list of data flows at block 1811, and processes the data packet at block 1817. If the data packet is a subsequent data packet for an existing flow for the blade (i.e., the flow address is already included in the list of data flows of the my-flows-and-buckets-table) at block 1805, processor 701 may process the data packet at block 1817 without updating list of FIG. 18B.

If a data packet is received as a multicast at block 1803, processor 701 determines if the flow ID is present in the my-flows-and-buckets table of FIG. 18B at block 1819. If the data flow ID of the multicast data packet is present in the list of data flows of FIG. 18B, the data packet is part of a data flow being processed by the blade, and processor 701 processes the data packet at block 1817.

If a data packet is received as a multicast at block 1803 and its data flow ID is not found in the list of data flows for the blade of FIG. 18B at block 1819, processor 701 determines if the data packet belongs to one of the data flows of a multicast partner (provided in the list of FIG. 18C) at block 1821. If a data flow indication of the data packet is included in the list of FIG. 18C at block 1821, another multicast partner blade will process the data packet. Accordingly, processor 701 may drop the data packet at block 1827.

If the data packet is received as a multicast data packet at block 1803 and its data flow ID is not included in either of the lists of data flows of FIGS. 18B and 18C at blocks 1819 and 1821, processor 701 may determine that the data packet is an initial data packet of a new data flow. Accordingly, processor 701 obtains the bucket ID for the data packet at block 1823. More particularly, processor 701 computes the bucket ID of the data packet by performing the hash function on the data flow ID of the data packet as discussed above. If the bucket ID of the data packet is included to the list of my-buckets of FIG. 18D at block 1825, processor 701 may add the data flow ID of the data packet to the list of data flows of FIG. 18B at block 1811 and process the data packet at block 1817. If the bucket ID of the data packet is not included in the list of my-buckets of FIG. 18D at block 1825, processor 701 may drop the data packet at block 1827.

While FIG. 18A shows that Flow IDs of partner data flows may be checked at block 1821 before checking the list of buckets for the server/blade at block 1825, this order of operations/logic may be reversed. For example, if the flow ID is not included in my-flows-table at block 1819, processor 701 may perform operations of blocks 1823 and 1825 to determine if the bucket ID is included in the list of buckets for the server/blade of FIG. 18D. If the bucket ID is not included in the list, processor 701 may drop the data packet at block 1827. If the bucket ID is included in the list, processor 701 may determine if the flow ID is in the table of partner data flows of FIG. 18C. If the flow ID is included in the table of partner data flows of FIG. 18C, processor 701 may drop the data packet at block 1827, or if the flow ID is not included in the table of partner data flows of FIG. 18C (after determining that the bucket ID is included in the my-buckets-table), processor 701 may add the data flow ID to the table of FIG. 18B and process the data packet.

In embodiments of FIG. 18D, the control plane may maintain the my-buckets-table for each server. The my-buckets-table may provide a list of bucket IDs identifying the buckets that are mapped to the server associated with the my-buckets-table. The control plane may thus define/update/modify a respective my-buckets table for each server coupled to the load balancer LB.

While not shown in FIG. 18B, the table of FIG. 18B may also include the bucket ID associated with each flow ID (separate from the table of FIG. 18B). Once the bucket ID is identified at block 1807 (or block 1823), the flow ID and associated bucket ID for the new flow may be added to the My-Flows table at block 1811.

FIGS. 18E, 18F, 18G, and 18H illustrate alternative server operations (relative to those discussed above with respect to FIGS. 18A, 18B, 18C, and 18D) where the server/blade does not need to differentiate whether traffic is unicast or multicast. FIGS. 18F, 18G, and 18H may be the same as FIGS. 18B, 18C, and 18D discussed above. Where reference numbers of FIG. 18E are the same as corresponding reference numbers of FIG. 18A, the corresponding operations having the same reference numbers may be the same/similar.

At block 1800, processor 701 defines/revises data flow and bucket lists of FIGS. 18F and 18H and the list of multicast partners of FIG. 18G in memory 707. Responsive to receiving a data packet from the load balancer at block 1801 through LB interface 703, processor 701 determines if the flow ID is present in the my-flows-and-buckets table of FIG. 18B at block 1819. If the data flow ID of the multicast data packet is present in the list of data flows of FIG. 18F, the data packet is part of a data flow being processed by the blade, and processor 701 processes the data packet at block 1817.

If the data flow ID is not found in the list of data flows for the blade of FIG. 18F at block 1819, processor 701 determines if the data packet belongs to one of the data flows of a multicast partner (provided in the list of FIG. 18G) at block 1821. If a data flow indication of the data packet is included in the list of FIG. 18G at block 1821, another multicast partner blade will process the data packet. Accordingly, processor 701 may drop the data packet at block 1827.

If the data flow ID is not included in either of the lists of data flows of FIGS. 18F and 18G at blocks 1819 and 1821, processor 701 may determine that the data packet is an initial data packet of a new data flow. Accordingly, processor 701 obtains the bucket ID for the data packet at block 1823. More particularly, processor 701 computes the bucket ID of the data packet by performing the hash function on the data flow ID of the data packet as discussed above. If the bucket ID of the data packet is included to the list of my-buckets of FIG. 18H at block 1825, processor 701 may add the data flow ID of the data packet to the list of data flows of FIG. 18B at block 1811 and process the data packet at block 1817. If the bucket ID of the data packet is not included in the list of my-buckets of FIG. 18H at block 1825, processor 701 may drop the data packet at block 1827.

In embodiments of FIG. 18H, the control plane may maintain the my-buckets-table for each server. The my-buckets-table may provide a list of bucket IDs identifying the buckets that are mapped to the server associated with the my-buckets-table. The control plane may thus define/update/modify a respective my-buckets table for each server coupled to the load balancer LB.

While not shown in FIG. 18F, the table of FIG. 18F may also include the bucket ID associated with each flow ID (separate from the table of FIG. 18H). Once the bucket ID is identified at block 1823, the flow ID and associated bucket ID for the new flow may be added to the My-Flows table at block 1811.

While FIG. 18E shows that Flow IDs of partner data flows may be checked at block 1821 before checking the list of buckets for the server/blade at block 1825, this order of operations/logic may be reversed as discussed above with respect to FIG. 18A.

Control Plane Operations for Type-2 Flows

Control plane operations for type-2 flows may be similar to and/or the same as those discussed above with respect to FIGS. 16A and 16B for type-1 flows. Repetition of similar details is omitted here for the sake of conciseness. With type-2 flows, however, load balancer LB may be unable to implement control plane operations and/or underlying architectures (e.g., a Consolidated Flows Table), because initial (INIT) data packets (indicating the start of a new flow) cannot be identified by considering only header information of the data packet. Accordingly, control plane operations may be required to reside on blades when dealing with type-2 flows. This aspect of control plane operations for type-2 flows may thus differ from that of control plane operations for type-1 flows discussed above with respect to FIGS. 16A and 16B.

Extended Algorithm for Multiple Cascaded Transients

As discussed above, load balancer and blade operations have been discussed with respect to examples with one transient bucket (i.e., the blade corresponds to the bucket that changes from A to B and is not reassigned until it reaches steady state), which may be handled with a multicast group of size of at most 2.

It is possible, however, that a bucket may be reassigned multiple times in a short period of time (before it reaches steady state after the first of the multiple reassignments). For example, a certain bucket 'x' may be assigned to Blade A and then reassigned to Blade B. While the bucket 'x' is still in the transient state, it may be reassigned to Blade C. In such a scenario, an extended mechanism may be used as discussed in greater detail below.

To address this issue, a multicast group having a size greater than two may be used. In the example noted above (where bucket 'x' was initially assigned to Blade A, then reassigned to Blade B, and then reassigned to Blade C while the bucket 'x' is still in the transient state with Blade A as the old blade), processor 801 can store both Blade A and Blade B in the list of Old Blade IDs corresponding to the Bucket x. Blades A, B, and C may together form a multicast group having a size of three. Any data packet that belongs/maps to bucket 'x' can thus be multicast to a multicast group including Blade A, Blade B, and Blade C. A number of blades in the multicast group is thus 3. Respective processes running on each of the three blades (i.e., A, B, and C) in the multicast group will thus govern whether the data packet is to be dropped or processed by respective blades of the multicast group.

Briefly, multicast based load balancing mechanisms set forth above may be generic and may be extended to cases of multiple cascaded transients. If a number of cascaded transients for a particular bucket is T, then the multicast group for that bucket may include T+1 blades. Issues regarding these extended operations and workarounds relating thereto are discussed below.

Virtual Machine Based Cloud Infrastructure

In a virtual machine (VM) application, a server defined as discussed above with respect to FIGS. 13A, 15A, 15D, 18A, and/or 18E may be instantiated in a VM (Virtual Machine). Moreover, VMs may be moved from one physical server to another and all the connections of that server in that VM may be preserved as such to the new physical server with a new Server ID.

The load balancing logic (e.g., as discussed with respect to FIGS. 12A, 14A, and/or 17A) may apply with no change. The server side logic (e.g., as discussed with respect to FIGS. 13A, 15A, 15D, 18A, and/or 18E) may not be needed since there is only one server which simply moved to the new location, and hence, there may be no need to coordinate anything at the server level (unlike in previous cases where load is coordinated/split between two different servers. In other words, server side logic of FIGS. 13A, 15A, 15D, 18A, and/or 18E may not necessarily apply in VM based clout infrastructure applications. Once the control plane decides that some bucket is in the transient/transition mode (due to the server in the VM moving from one physical server to another) the control plane triggers the bucket to be in the transient mode and the load balancer logic is used to multicast/broadcast the traffic between the current and the old servers/blades during the time period of the server movement (while the bucket is in the transient/transition mode. Then, multicasting is stopped and unicasting to the new location of the server is initiated after the movement is completed. A need to provide synchronization of traffic switchover and server movement may thus be avoided.

VLAN Based Broadcast Implementation Alternative

Embodiments forwarding packets to multiple servers are not limited to multicast group mechanisms discussed above. For example, VLAN (Virtual Local Area Network) based broadcasts may be used. If a certain bucket 'x' was initially assigned to Blade A and the reassigned to Blade B, then load balancer processor 801 forwards data packets (or only non-INIT data packets, depending on the method) that correspond to bucket 'x' to both blades A and B. This can be implemented by considering both the blades to be in one VLAN. Then, the data packet is just forwarded to that VLAN, and the VLAN takes care that the packet is broadcasted to the individual blades.

FIG. 19 is a block diagram illustrating such a VLAN based alternative according to some embodiments. As shown in FIG. 19, Blades 1 and 2 are part of one VLAN referred to as VLAN-1. Any packets that are broadcast (i.e., multicast) to VLAN-1 will reach both Blades 1 and 2. If all buckets served by a blade are in the steady state, then that blade can be part of a single blade VLAN. For example, VLAN-2 may be a single blade VLAN including only blade 3, and VLAN-3 may be a single blade VLAN including only blade 4. Accordingly, data packets sent to VLAN-2 are received by blade 3 only, and data packets that are sent to VLAN-3 are received by blade 4 only. If a certain bucket is reassigned from Blade 3 to Blade 4, a new VLAN may be created that includes both Blade 3 and Blade 4. Such VLAN based implementations may provide a flexible way of broadcasting packets to multiple blades/servers within a group.

Advantages of Multicast Based Distributed Approaches

Multicast based distributed approaches discussed above may support load balancing with reduced hit or hitless addition and/or removal of blades. Accordingly, data flow disruption may be reduced when a new blade is added or when a blade is removed.

Even though mapping between data Flow IDs and Bucket IDs is static, the mapping between Bucket IDs and Blades can be changed dynamically to provide better uniformity (e.g., load balancing). Dynamic mapping between bucket IDs and blade IDs may be applicable when a blade is added or removed. In addition, dynamic mapping between bucket IDs and blade IDs may provide a mechanism allowing the load balancer to maintain a uniformity index (e.g., a Jain's fairness index) over time as loads of different blades change.

If the uniformity index drops below a certain threshold, processor 801 may call for a reassignment of one or more buckets to different blades. The buckets selected for reassignment may depend on parameters such as number of flows corresponding to the bucket(s), bit-rate corresponding to the bucket(s), current load on the blades, blades on downtime, and control parameters (e.g., when the last packet from the bucket was received). An exact mechanism governing this choice, however, may be beyond the scope of this disclosure. Approaches disclosed herein may enable a load balancer to provide a relatively smooth reassignment of buckets to blades with reduced loss of data flows when such a reassignment takes place.

Multicast Based Distributed Approaches disclosed herein may provide flow awareness. Each blade, for example, may decide whether to process or drop a received data packet depending on whether it belongs to a list of data flows that are being processed by the respective blade.

Multicast Based Distributed Approaches disclosed herein may support dynamicity of resources (e.g., blades), by enabling resources (e.g., blades) to be added and/or removed with reduced disruption to existing data flows.

In multicast based distributed approaches disclosed herein, a relatively low complexity load balancer may unicast or multicast the data packets based on whether the bucket is in the steady-state or in the transient state. Additional Load balancer architecture may include a hash module/function, fixed length B2B (Bucket-to-Blades) mapping and O(1) table lookup. Multicast based distributed approaches disclosed herein may support different types of data traffic and/or flows. While approaches have been discussed with respect to type-1 and type-2 data flows, other data types may be supported.

A B2B mapping table may have a fixed size and is not expected to change frequently. Therefore, a backup load balancer may not need to perform computationally intensive tasks (e.g., copying and syncing large tables or flow-level information) in real time, thereby providing a relatively low complexity failover mechanism for the load balancer. It may suffice for the backup load balancer to know the hash module/function and to sync up with the active load balancer B2B mapping table when the B2B mapping table changes.

Issues for Multicast Based Distributed Approaches

The relatively low complexity load balancer may generate a greater load on the blades. Rather than simply processing the received packets, blades may be required to first perform operations to determine whether or not to process the received packet. Increased processing and/or memory requirements may thus be imposed on blades potentially resulting in latency issues in some scenarios. Because multicast/broadcast transmissions only occur for buckets in the transient state this additional burden may be reduced/limited.

Broadcast/multicast transmission of data packets to multiple servers/blades may reduce backplane bandwidth available for other traffic because repetitive information (data packets) is forwarded over multiple links (i.e., between the load balancer and multiple blades) when different incoming packets could be forwarded over the links. Because the multicast/broadcast transmissions only occur for buckets in the transient state, this additional burden may be reduced/limited.

Handling of multiple cascaded transients (e.g., T number of cascaded transients) for a same bucket was discussed above using multicast group of size T+1. Bandwidth loss, however, may be proportional to a number of servers in the multicast group to which the packet is multicast/broadcast. For example, the packets may be broadcast to all the servers potentially consuming bandwidth that could otherwise be used to transmit other information. Moreover, in the context of type-2 flows, operations running on blades in case of type-2 flows may need access to the list of partner flows. In a multiple transient situation, if there are K blades in the multicast group, each blade may have K−1 partners. Therefore, at any point of time, each blade in transient may need to synchronize flow tables with all K blades in the group.

The blades, however, may not need to synchronize all their flows. The blades may only need to synchronize those flows corresponding to the bucket in the transient state which resulted in formation of the multicast group. As an example, even if there are one million existing flows, if 64K buckets are maintained, assuming reasonable uniformity, only tables of size about 100 rows (flows) per blade may need to be synchronized (as opposed to the one million flows).

To reduce/avoid issues of synchronizing large numbers of servers and/or to reduce/avoid waste of bandwidth, a number of simultaneous transitions allowed may be reduced/limited. In other words, a maximum number of blades in one multicast group may be reduced/limited to a certain upper limit. In some embodiments discussed above, that limit was set to two blades.

Transient Table Based Approach (Approach II)

Transient Table Based Approaches may enable reduced hit and/or hitless addition, removal, and/or reallocation of blades while increasing/maintaining flow stickiness. In this approach, a "Transient Table" is maintained that includes 'new' connections for every bucket in the transient state.

Transient table based approaches use unicast transmissions of each packet to the blade that will process that packet. Accordingly, multicast transmissions of packets to multiple blades may be reduced/avoided. Therefore, load balancing operations presented according to this approach may run solely at/on the load balancer, and additional load balancing operations running on blades may not be required. Accordingly, each blade may process the packets received at that blade without determining whether a given packet is intended for that blade.

Transient table based approaches, however, may be better suited for type-1 flows, and transient table based approaches may not be applicable to type-2 flows. As discussed above, type-1 flows are those flows for which it is possible to detect the start of a data flow or a first data packet of a data flow by only considering bits in the first data packet of the data flow, without considering any other information.

Transient table based approaches according to some embodiments disclosed herein may be broken into data plane operations and control plane operations. Data plane operations may be used primarily to handle how incoming data packets are forwarded to and received by the blades assuming an instance of a B2B Mapping Table at any given point in time.

Control plane operations may be used primarily to handle maintenance and/or modification of the B2B Mapping Table residing on/at the load balancer.

Data Plane Operations

As discussed above, operations of transient table based approaches may run on/at the load balancer without requiring additional operational overhead at the blades. Moreover, load balancer LB maintains an additional table(s) in memory 807 called a 'Transient Table' (also referred to as a 'Current Flows Table For Transient Bucket') for each bucket in the transient state.

Transient Table For Transient Bucket

A Transient Table for bucket 'x' includes a list of all flows corresponding to the bucket 'x' that are initiated while the bucket 'x' is in the transient state. Once a bucket that was in the transient state returns to the steady state, the Transient Table for the bucket may be cleared (e.g., erased, deleted, disregarded, etc.).

Bucket 'x' enters the transient state whenever the blade ID corresponding to bucket 'x' changes, for example, from blade A to blade B. During such a change, Blade B is the new current blade, and Blade A is recorded as the Old Blade ID in the B2B mapping table as discussed above. At the initiation of the transition from blade A to blade B, all existing data flows through bucket 'x' are being served by Blade A, and any data packets received for these existing data flows should be forwarded to the old blade, (i.e., Blade A). Any data flows that are initiated after this transition to the transient state and during the transient state are recorded in the "Transient Table" for the bucket 'x'. These data flows which are recorded in the "Transient Table" for bucket 'x' are to be forwarded to the new/current blade, i.e., Blade B.

Operations of load balancer processor 801 are illustrated in the flow chart of FIG. 20A. At block 2000, processor 801 defines/revises the mapping table of FIG. 20B and/or any transient tables for any transient buckets. When a data packet is received through network interface 805 at block 2001, processor 801 performs the hash function using a flow ID (or other header information) of the data packet to obtain a bucket ID to be used to process the data packet at block 2003. If the bucket identified by the bucket ID of block 2003 is in the steady state at block 2005 (e.g., bucket 2 from the B2B mapping table of FIG. 20B that is stored in memory 807), processor 801 clears the transient table from bucket 2 (the current bucket) at block 2009 (if a/the transient table for bucket 2 has not already been cleared), and unicasts the data packet to the current blade (e.g., blade 3) for the current bucket (e.g., bucket 2). Operations of block 2009 may be omitted, for example, if transient tables are automatically cleared when a bucket transitions from the transient state back to the steady state, if the transient table for the current bucket in steady state was cleared responsive to a previous data packet, if the current bucket was never before in the transient state, etc.

If the bucket identified by the bucket ID of block 2003 is in the transient state at block 2005 (e.g., bucket 1 from the B2B mapping table of FIG. 20B that is stored in memory 807), processor 801 determines if the data packet is an initial data packet (e.g., responsive to an INIT flag in a header of the data packet) of a new data flow at block 2007. If the data packet is an initial data packet at block 2007, processor 801 records the data flow ID for the data packet in the transient table of FIG. 20C at block 2011, and unicasts the data packet to the current blade (e.g., blade 4) for the bucket in transient state at block 2015. Accordingly, for each initial data packet for a new flow that is received for a bucket that is in transient state at blocks 2005 and 2007, the data flow ID from the initial data packet is saved in the transient table of FIG. 20C at block 2011 allowing subsequent data packets of the same data flow to be identified at block 2017 for transmission to the current blade while the bucket is in the transient state.

For each non-initial data packet for an existing data flow that is received for a bucket that is in transient state (e.g., bucket 1) at blocks 2005 and 2007, processor 801 determines if the flow ID of the data packet matches one of the flow IDs in the transient table of FIG. 20C for the current bucket at block 2017. If the flow ID of the data packet does not match any of the flow IDs in the transient table of FIG. 20C for the current bucket at block 2017, the data packet belongs to a flow being handled by the old blade of the transient state bucket, and processor 801 unicasts the data packet to the old blade (e.g., blade 7) of the transient state bucket (e.g., bucket 1) at block 2019. Stated in other words, the data packet belongs to a data flow that was initiated before the bucket entered the transient state, and data packets of this previously existing flow should continue to be processed by the old blade. If the flow ID of the data packet does match one of the flow IDs in the transient table of FIG. 20C for the current bucket at block 2017, the data packet belongs to a flow being handled by the current blade of the transient state bucket, and processor 801 unicasts the data packet to the current blade (e.g., blade 4) of the transient state bucket (e.g., bucket 1) at block 2015. Stated in other words, the data packet belongs to a data flow that was initiated after the bucket entered the transient state, and data packets of this flow should be processed by the current blade.

Examples of operations of FIG. 20A, 20B, and 20C when bucket 1 is in the transient state while Bucket 2 is in steady state are discussed below. Any data packet that belongs to steady state bucket 2 will be forwarded to the Blade 3 (in accordance with blocks 2005, 2009, and 2015), including both initial (INIT) and non-initial (non-INIT) data packets. Any initial (INIT) data packets that belongs to bucket 1 will be forwarded to Blade 4 (in accordance with blocks 2005, 2007, 2011, and 2015). Non-initial (non-INIT) data packets that belong to bucket 1 will be forwarded to Blade 4 if their flow IDs are included in the Transient Table for bucket 1 (in accordance with blocks 2005, 2007, 2017, and 2015), or non-initial (non-INIT) data packets that belong to bucket 1 will be forwarded to blade 7 if their flow IDs are not included in the transient table (in accordance with blocks 2005, 2007, 2017, and 2019).

As discussed above with respect to embodiments of FIGS. 20A, 20B, and 20C, the load balancer may track new data flows that are added to a bucket in the transient state to determine whether packets to the transient state bucket should be forwarded to the new or old server/blade. According to some other embodiments discussed below with respect to FIGS. 20D, 20E, and 20F, the load balancer may track old data flows for a bucket that are initiated for the bucket before it enters the transient state. For example, for a period of time before a bucket enters the transient state (while the bucket is still in steady state), Flow IDs for data packets that map to the bucket are saved in a transient table for the bucket. Once the bucket enters the transient state, the list of data flows in the transient table for the transient bucket is maintained (without adding new data flows) to determine how to forward data packets while the bucket is in the transient state. When the bucket is in the transient state, the load balancer uses the list of old data flows from the transient table for the transient bucket to either: (1) transmit data packets belonging to data flows included on the list to the old server/blade, or (2) transmit data packets belonging to data flows not included on the list to the current/new server/blade. Once the bucket returns to the steady state, the transient table may be discarded.

Operations of load balancer processor 801 are illustrated in the flow chart of FIG. 20D. At block 2000, processor 801 defines/revises the mapping table of FIG. 20E and/or any transient tables for any transient buckets. When a data packet is received through network interface 805 at block 2001, processor 801 performs the hash function using a flow ID (or other header information) of the data packet to obtain a bucket ID to be used to process the data packet at block 2003. If the bucket identified by the bucket ID of block 2003 is in the steady state at block 2005 (e.g., bucket 2 from the B2B mapping table of FIG. 20E that is stored in memory 807), processor 801 determines whether a decision has been made to move the bucket to transient state at block 2029. Once a decision is made to move a bucket to the transient state, for example, the bucket may be maintained in the steady state for a period of time to record flow identifications for data flows being routed to the old server/blade before moving the bucket to the transient state.

If bucket is in steady state at block 2005 and the bucket has not been designated for movement to the transient state at block 2029, processor 801 unicasts the data packet to the current blade (e.g., blade 3) for the current bucket (e.g., bucket 2) at block 2035. If the bucket is in steady state at block 2005 and the bucket has been designated for movement to the transient state at block 2029, processor 801 records the flow ID for the data flow in the existing transient table of FIG. 20F for the bucket (provided that the data flow has not been recorded already) at block 2031 and unicasts the data packet to the current blade (e.g., blade 3) for the current bucket (e.g., bucket 2) at block 2035. If the data flow has already been recorded in the table of FIG. 20F, processor 801 may unicast the data packet without recording. Processor 801 may thus add entries to the table of FIG. 20F for each data flow for which a data packet is received during the period of time that the bucket is designated for movement to the transient state before the bucket is moved to the transient state. The resulting transient table of FIG. 20F can then be used by processor 801 to determine which data flows should continue to be routed to the old server/blade when the bucket enters the transient state.

If the bucket identified by the bucket ID of block 2003 is in the transient state at block 2005 (e.g., bucket 1 from the B2B mapping table of FIG. 20E that is stored in memory 807), processor 801 determines if the flow ID of the data packet matches one of the flow IDs in transient table of FIG. 20F for the current bucket at block 2037. If the flow ID of the data packet matches any of the flow IDs in the transient table of FIG. 20F for the bucket at block 2037, the data packet belongs to a flow being handled by the old server/blade of the transient state bucket, and processor 801 unicasts the data packet to the old blade (e.g., blade 7) of the transient state bucket (e.g., bucket 1) at block 2039. Stated in other words, the data packet belongs to a data flow that was initiated before the bucket entered the transient state, and data packets of this previously existing flow should continue to be processed by the old server/blade. If the flow ID of the data packet does not match one of the flow IDs in the transient table of FIG. 20F for the current bucket at block 2037, the data packet likely belongs to a flow being handled by the current blade of the transient state bucket, and processor 801 unicasts the data packet to the current blade (e.g., blade 4) of the transient state bucket (e.g., bucket 1) at block 2039. Stated in other words, the data packet belongs to a data flow that was initiated after the bucket entered the transient state, and data packets of this flow should be processed by the current blade/server.

Control Plane

In this section, implementations of control planes using Transient Table Based Approaches are discussed according to some embodiments. As discussed above with respect to Multicast Based Distributed Approaches, a control plane can be implemented in different ways depending on the use case. Unlike Multicast Based Distributed Approaches, however, control planes for transient table based approaches may be implemented on/at only the load balancer, and additional processing on/at the blades may be reduced/avoided.

As discussed above, a bucket enters the transient state from the steady state when the Blade ID corresponding to the bucket is modified and the original Blade ID is recorded in the Old Blade ID column for the transient state bucket. Once a bucket has entered the transient state, control plane operations may decide when the bucket can return to the steady state from the transient state. When the signal is received from the control plane indicating that the bucket is ready to return to the steady state from the transient state, the Old Blade ID field corresponding to the old bucket is cleared/erased. The control plane may thus decide when is it reasonable to conclude that the Old Blade ID is no longer needed.

In some embodiments discussed above with respect to FIGS. 20A, 20B, and 20C, an Old Blade ID may no longer be needed when all data flows belonging to the bucket that are mapped to the Old Blade ID have ended. Requiring that all data flows mapped to the old blade ID have ended before returning to the steady state, however, may be an unnecessarily strict criterion. For example, a few data flows that are mapped to the old blade may remain active for a significant period of time after entering the transient state, and/or data flows can be inactive but kept open for a long time, and/or finish (FIN) or finish acknowledge (FINACK) indications (indicating the end of a data flow) may be missed/lost. Under such conditions, a bucket may remain in the transient state for an unnecessarily long period of time resulting in unnecessary processing overhead at the load balancer. A mechanism that provides a reasonable criterion to conclude that an Old Blade ID for the bucket is no longer needed may thus be desired.

Because transient table based approaches are used with type-1 data flows, load balancer LB can identify starts and ends of data flows by considering the initial (INIT/INITACK) or final (FIN/FINACK) data packets arriving for the data flows. Accordingly, it may be possible to maintain a Load Balancer Control Table in memory 807 as shown, for example, in FIG. 21. Load balancer control table, for example, may include a row for each bucket. Load balancer control table, for example, may include information (e.g., number of flows, net-bit rate, and timer information) for both current and old blades mapped to transient state buckets (e.g., buckets 1 and 3), but load balancer control table may include information (e.g., number of flows, net-bit rate, and timer information) for only the current blades mapped to transient state buckets (e.g., buckets 2 and B).

Load balancer processor 801 can thus keep track of numbers of data flows (connections) to each of the current and old blades mapped to a transient bucket by incrementing or decrementing the connection counter whenever it detects an outgoing initial (INIT/INITACK) data packet or final (FIN/FINACK) data packet for a data flow to one of the blades. Processor 801 may also keep track of a net bit-rate for each bucket and a time that a last packet was received for each bucket in a similar manner. Information included in the load balancer control table may thus be used by processor 801 to determine when a data flow to an old blade of a transient state bucket is no longer significant so that the transient state bucket can be returned to steady state (thereby terminating any remaining data flows to the old blade). Criteria that may be used to determine when a bucket can be returned to the steady state using information of a load balancer control table are discussed in greater detail below.

When a number of data flows being serviced by the Old Blade drops below a threshold, processor 801 may return the transient state bucket to the steady state. As discussed above, the number of flows serviced by an old blade dropping to zero may be an unnecessarily stringent criterion, and a number of data flows for an old blade reaching a near-zero number may be sufficient to return the transient state bucket to the steady state.

When a bucket is returned to steady state with a data flow to the old blade still active, the data flow to the old blade may be terminated because the current blade may be unable to service the data flow that was initiated with another blade. Accordingly, care may be taken to provide that a significant data flow is not lost even if a total number of data flows for an old blade falls below a threshold. Bucket 1 in the Load Balancer Control Table of FIG. 21, for example, is in the transient state with only two data flows remaining to the old blade. Even thought the remaining number of data flows to the old blade is small (i.e., 2 data flows), one or both of these data flows may be significant as indicated by the net-bit rate for the old blade. Accordingly, even if the number of data flows to the old bucket is below the threshold, processor 801 may wait until a net bit-rate corresponding to the Old Blade is below a threshold returning the transient state bucket to the steady state.

Considering only net-bit rates may result in unwanted loss of data flows. Bucket 3 of FIG. 21, for example, may be directing a relatively low bit-rate towards the old blade, but releasing bucket 3 to steady-state may result in dropping a relatively large number of data flows. Accordingly, other criteria and/or combinations of different criteria may be considered even if the total number of flows to the old blade and/or the net bit-rate to the blade are below the respective thresholds.

For example, processor 801 may consider a time elapsed since a last data packet to the old blade before returning a transient state bucket to the steady state. Processor 801, for example, may require some minimum period of time to pass after a last data packet to an old blade before returning the bucket to the steady state. If the last data packet received from any flow from the transient state bucket to the old blade was a sufficiently long period of time ago (e.g., exceeding a threshold), processor 801 may return the bucket to the steady state. Stated in other words, if the flows from the transient state bucket to the old blade have been inactive for a sufficiently long period of time, any remaining data flows to the old blade may be dropped.

Any of the criteria discussed above (based on information from the table of FIG. 21) may be used alone or in combination to determine when to return a transient state packet to the steady state. As shown in the flow chart of FIG. 22, processor 801 may monitor the information of FIG. 21 for transient state buckets to determine when to return each transient state bucket to steady state. As shown in FIG. 22, when a number of old blade data flows from the transient state bucket are less than a first threshold at block 2201, when a net-bit rate to the old blades from the transient state bucket is less than a second threshold at block 2205, and when a time since a last data packet transmission from the transient state bucket to the old blade exceeds a third threshold at block 2209, processor 801 may return the transient state bucket to the steady state. As shown in FIG. 22, the conditions of blocks 2201, 2205, and 2209 may be logically 'ANDed' so that all conditions must be fulfilled before processor 801 returns the transient state bucket to the steady state. According to some other embodiments, the conditions of blocks 2201, 2205, and 2209 may be logically 'ORed' so that satisfaction of the condition of any one of the decision blocks may be sufficient for processor 801 to return the transient state bucket to the steady state.

Multiple Transients

Transient table based approaches may also be able to handle multiple transients. For example, a bucket may be reassigned multiple times in a short period of time. For example, a certain bucket 'x' may be assigned to Blade A and then reassigned to Blade B. While the bucket 'x' is still in the transient state, it may again get reassigned to Blade C, a situation referred to as 3 layers of transitions (A, B and C). Blade C thus corresponds to the current blade while Blade A would still be designated as the Old Blade ID. In such a situation, the transient stateful table may be expected to have flows for both blades B and C. Once the control plane decides that all the flows associated to the OLD blade (i.e. Blade A) have been terminated gracefully, the stateless entry in the bucket to blade table can be switched to blade C, and all the related stateful table entries of blade C can be erased. However, there may still be stateful entries in the stateful table for blade B and such entries may need to be cleaned up as the lifetimes of the connections have ended. The above example can be extended to even greater numbers of transients by considering blade B as a set of blades instead of a single blade where the transients become A, B1, B2, . . . Bn, C where B={B1, B2 . . . , Bn}.

As discussed above, Transient table based approaches may thus provide reduced hit and/or hitless addition and/or removal of blades. Accordingly, disruptions of flows may be reduced/eliminated when a new blade is added and/or when an old blade is removed.

Despite mappings between Flow IDs and Bucket IDs that may be relatively static, the mapping between Bucket IDs and Blades can be changed dynamically to provide better uniformity and/or load balancing. This dynamic mapping of bucket IDs to blades may be applicable when a blade is added or removed, but dynamic bucket to blade mapping is not restricted to these two use cases. For example, a mechanism may be provided where load balancer processor 801 maintains some sort of a uniformity index (e.g., a Jain's fairness index) at all times. If the uniformity index drops below a certain threshold, processor 801 may call for a reassignment of one or more buckets to other blades. The bucket(s) selected for reassignment may depend on various parameters, such as, numbers of data flows corresponding to the buckets, bit-rates corresponding to the buckets, current loads on the blades, blades on downtime, and control parameters (e.g., when last packets from buckets were received). Approaches described herein may enable relatively smooth reassignments of buckets to blades with reduced loss of data flows when reassignments occur.

Transient table based approaches may provide/enhance flow awareness, because the load balancer temporarily maintains a list of flows for the old blade to provide flow stickiness while a bucket is in the transient state. Transient table based approaches may support dynamicity of resources (e.g., blades) by enabling addition/removal of resources (e.g., blades) with reduced disruption of the previously existing flows. In transient table based approaches, all load balancing functionality may reside on/at the load balancer so that additional processing at the blades (other than processing received packets) may be reduced. Transient table based approaches may not be limited to any particular type of traffic or flow provided that initial data packets of the data flows can be identified.

By reducing additional processing at the blades, additional processing may be required at the load balancer. The load balancer, for example, may need to store an additional table (Transient Table) for every bucket in the transient state. A number of rows in the Transient Table may be equal to the number of new data flows initiated for the bucket during the transient state. In a high traffic situation, the number of rows of a transient table may be relatively high. Assuming a total number of buckets is on the order of 64K (e.g., in current Smart Services Router Line Card implementations), only the states of the data flows for the buckets in transient state may need to be maintained. In practice, a total number of flow IDs that may need to be maintained in a transient table is expected to be relatively low, and a bucket is not expected to be in the transient state for long.

As discussed above, transient table based approaches may require that the load balancer identify the start of each data flow (e.g., using initial or INIT data packets). Therefore, transient table based approaches may be difficult to implement for type-2 flows.

In case of multiple transients, the temporary usage of memory 807 for transient tables may increase. As discussed above, for example, once all the data flows for Blade A are finished, the destination on the bucket 'x' can be switched to blade C and the transient stateful entries for blade B may still exist on the stateful table until all such flows are finished/terminated.

Alternative Approaches to Modifying B2B Mapping Tables

Before discussing third approaches of the present disclosure, a modified B2B mapping table is discussed. This modified B2B mapping table will be used in HTTP Redirect approaches discussed below. Note that underlying mechanisms may partially resemble embodiments of B2B tables discussed above, and such underlying mechanisms may be repeated below for the sake of clarity.

When a Blade ID corresponding to a certain bucket changes from Blade A to Blade B, the new Blade ID (i.e., Blade B) is recorded in an additional column called a New Blade ID column. The entry in the new Blade ID (i.e. Blade B) column is moved to the (current) Blade ID column when signaled by the control plane. This may typically happen when the original Blade ID (i.e. Blade A) is no longer needed.

Use Case 1—Addition of a Blade

Considering the situation of FIGS. 23A, 23B, and 23C, buckets 1 through B are initially mapped to Blades 1, 2 and 3 by the mapping shown in the table of FIG. 23A. When the blade 4 is added to the system, Buckets 2 and 3 are remapped to Blade 4, so that the new Blade ID (i.e. Blade 4) for buckets 2 and 3 appears in the New Blade ID column of FIG. 23B. The New blade ID (i.e. Blade 4) replaces the original blade IDs (i.e. Blade ID 1 and Blade ID 2) in FIG. 23C responsive to receiving a control signal from the control plane that the corresponding original Blade IDs (i.e., blade IDs 1 and 2) are no longer needed. While FIGS. 23B and 23C show blades 1 and 2 of buckets 2 and 3 are replaced with blade 4 at the same time, simultaneous replacement is not necessary.

In embodiments of FIGS. 23A-C, a bucket may be defined to be in steady-state if the New Blade ID field corresponding to that bucket is empty. Buckets 1 and 4 in FIG. 23B are considered to be in steady state. All buckets in FIGS. 23A and 23C are in steady state.

A bucket is defined to be in transient state if the New Blade ID field corresponding to that group is non-empty. Buckets 2 and 3 in FIG. 23B are considered to be in transient state, and no buckets are in transient state in either of FIG. 23A or 23B.

Use Case 2—Removal of a Blade

Considering the situation of FIGS. 24A, 24B, and 24C, Buckets 1 through B are initially mapped to Blades 1, 2 and 3 as shown in FIG. 24A, and Blade 3 is being removed, for example, for scheduled maintenance. Bucket 1 which was initially being served by Blade 3 is now assigned to Blade 2. The New blade corresponding to Bucket 1 (i.e. Blade 2) is now recorded in the New Blade ID column for bucket 1 as shown in FIG. 24B. Once a control signal is received from the control plane indicating that blade 3 is no longer needed, this change is reflected in the Blade ID column as shown in FIG. 24C. The original Blade ID (i.e. Blade 3) is recorded in the Old Blade ID column. In the example of FIGS. 24A-C, Bucket 1 is considered to be in the transient state in FIG. 24B, while buckets 2, 3 and 4 are considered to be in steady state in FIG. 24B. All buckets are in steady state in FIGS. 24A and 24C.

Use Case 3—Reallocation of Buckets to Blades

Considering the situation of FIGS. 25A, 25B, and 25C, an initial mapping between Buckets 1 through B and Blades 1, 2 and 3 is illustrated in FIG. 25A. This mapping is modified to provide load balancing (without adding or removing any blades). For example, Blade 1 may be heavily loaded relative to other blades so that some of its traffic should be offloaded to Blade 3 by reassigning Bucket 4 to Blade 3. Accordingly, the new serving blade (i.e. Blade 3) is recorded in the New Blade ID column as shown in FIG. 25B. Blade 3 then replaces Blade 1 in the (current) Blade ID column once a control signal is received from the control plane indicating that the original blade information (i.e. Blade 1) is no longer needed as shown in FIG. 25C. In FIG. 25B, Bucket 4 is considered to be in the transient state while buckets 1, 2 and 3 are considered to be in steady state. Once the control signal is received, bucket 4 switches to the steady-state as shown in FIG. 25C. In FIGS. 25A and 25C, all buckets are in the steady state.

HTTP Redirect Based Approach (Approach III)

In HTTP Redirect based approaches, concepts of HTTP redirect are used for every bucket in the transient state. HTTP Redirect based approaches can also be used for gradual load correction rather than taking a whole blade into congestion collapse.

In HTTP redirect based approaches, the Load balancing site (including load balancer LB and blades/servers S1-Sn of FIG. 6) may have a single IP address type architecture where all the servers/blades S1-Sn in the load balancing site expose a same primary virtual IP address towards the external network (including clients C1-Cm, outside server OS, etc.). In addition to the primary virtual IP address (also referred to as a primary IP address), the load balancing site also maintains an additional IP address, referred to as a stand-by virtual IP address (also referred to as a stand-by IP address). The external network is aware of the primary IP address and forwards any packets destined to this primary IP address to the load balancer. According to some embodiments, load balancer LB may separately handle any data packets that are addressed to the stand-by IP address (as opposed to the primary IP address). Load balancing operations may run at the load balancer and at individual blades/servers.

HTTP redirect based approaches may be organized into two parts, data plane operations, and control plane operations. Data plane operations may primarily handle how incoming data packets are forwarded to and received by the blades/servers assuming an instance of B2B Mapping Table at any given point in time. Control plane operations may handle maintenance and/or modification of the B2B Mapping Table residing on/at the load balancer. As discussed herein, a same primary IP address covers all of the blades/servers and a same stand-by IP address covers all of the blades/servers. A destination IP based router may be sufficient with HTTP redirect from the blades/servers with a control plane orchestrating the overall load distribution.

Data Plane Operations

As mentioned earlier, load balancing operations may run both at the load balancer and at the blades/servers. According to HTTP redirect based approaches, each blade/server also has access to the B2B mapping table that may reside on/at the load balancer.

When all blades/servers are operating in steady state, outside devices (e.g., clients C1-Cm) may transmit data packets to the system using the primary IP address. Upon receipt of data packets addressed to the primary IP address, the load balancer performs the hash function using the data flow ID of the data packet to generate a bucket ID for the data flow to which the data packet belongs, the load balancer uses the B2B mapping table to map the bucket ID to a respective current blade ID, and the load balancer forwards the data packet to the blade/server indicated by the current blade ID corresponding to the bucket ID. The blade can then process data packets received in this manner as discussed in greater detail below.

At the Blade

Operations performed at a blade/server may be used to decide whether to process or drop a data packet received from the load balancer as discussed in greater detail below with respect to FIGS. 26A-C. Moreover, each blade/server maintains a list of data flows that it is currently serving, and this list is referred to as 'my-flows table'. An architecture of this table may be determined by the control plane, and the blade/server will accept and process data packets of data flows identified in the my-flows-table. At block 2600, processor 701 defines/revises the my-flows-table of FIG. 26B and the mapping table of FIG. 26C.

When a data packet is received through LB interface 703 of blade/server S at block 2601, processor 701 determines at block 2603 if the data packet belongs to an existing data flow being processed by the server. This determination may be made with reference to the my-flows-table by determining if a flow ID of the data packet matches any flow IDs included in the my-flows-table. If the data packet belongs to an existing data flow being processed by the server at block 2603 (as indicated by the my-flows-table of FIG. 26B), processor 701 accepts and processes the data packet at block 2615.

If the data packet does not belong to an existing data flow being processed by the server at block 2603, the data packet is for a new data flow, and processor 701 should decide whether to accept or reject the data flow. For a data packet for a new data flow (not an existing data flow), processor 701 performs the hash function using the data flow ID of the data packet to determine a bucket ID to which the data flow is mapped at block 2607. At block 2609, processor 701 determines if the bucket ID is in steady state or in transient state with reference to the B2B mapping table of FIG. 26C. As discussed above, the B2B mapping table may be maintained at the load balancer and/or used by the load balancer to map received data packets from buckets to blades/servers.

If the bucket ID is in steady state (e.g., bucket ID 1, 2, or 3 of FIG. 26C) at block 2609, processor 701 adds the data flow ID to the my-flows-table of FIG. 26B at block 2611 and processes the data packet at block 2615.

If the bucket ID is in transient state (e.g., bucket ID 4 of FIG. 26C) at block 2609, processor 701 determines at block 2621 if the server is identified as the current blade or the new blade with reference to the B2B mapping table of FIG. 26C. If the server is identified as the new blade for the bucket ID (e.g., new blade 3 for bucket 4 from the B2B table of FIG. 26C), processor 701 adds the data flow ID to the my-flows-table of FIG. 26B at block 2611 and processes the data packet at block 2615.

If the server is identified as the current blade for the bucket ID (e.g., current blade 1 for bucket 4 from the B2B table of FIG. 26C) at block 2621, processor 701 responds by transmitting an HTTP redirect including the stand-by IP address at block 2623, and drops the data packet at block 2625. The HTTP redirect will thus be transmitted when the blade/server which received the data packet is identified as the current blade for a bucket in the transient state per the B2B mapping table of FIG. 26C.

The HTTP redirect is transmitted to the client device (e.g., client C1, C2, C3, etc.) outside of the load balancing system that originally generated the data packet that triggered the HTTP redirect. On receipt of the HTTP redirect (including the stand-by IP address), the client retransmits the data packet addressed to the stand-by IP address. Operations of load balancer will now be discussed in greater detail below with respect to FIG. 27.

At the Load Balancer

In general, the load balancer considers the packet header of a data packet and determines where to send the packet.

Data packets addressed to the stand-by IP address are transmitted to the new server/blade identified by the new Blade ID corresponding to the bucket that the packet flow belongs to. Operations at a load balancer may be summarized as follows: A B2B (Buckets-to-Blade) mapping table is stored at the load balancer. This BTB table may be provided as discussed above with respect to FIGS. 23A-C, 24A-C, and 25A-C;

For every incoming data packet, the load balancer computes the hash of the Flow ID (or equivalent) to obtain the Bucket ID;

If the bucket is in the steady-state, the packet is forwarded to the Current Blade ID;

If the packet belongs to a bucket in transient state and is sent to the Stand-by IP address, the load balancer forwards the packet to the New Blade ID corresponding to the Bucket ID; and If the packet belongs to a bucket in transient state and is sent to the Primary IP address, the load balancer forwards the packets to the (current) Blade ID corresponding to the Bucket ID.

Load balancer operations are discussed in greater detail below with respect to the flow chart of FIGS. 27A and 27B. At block 2700, processor 801 defines/revises the mapping table of FIG. 27B. When a data packet is received through network interface 805 at block 2701, processor 801 performs the hash function using a flow ID (or other header information) of the data packet to obtain a bucket ID to be used to process the data packet at block 2703. If the bucket identified by the bucket ID of block 2703 is in the steady state at block 2705 (e.g., bucket 2 from the B2B mapping table of FIG. 27B that is stored in memory 807), processor 801 transmits the data packet through the server interface to the current blade (e.g., blade 2 having blade ID 2 corresponding to bucket ID 3 of the B2B mapping table of FIG. 27B). More generally, when the bucket is in steady state at block 2705, the data packet is transmitted to the current server/blade for the bucket whether the data packet is addressed to the stand-by address or to the primary address.

If the bucket identified by the bucket ID of block 2703 is in the transient state at block 2705 (e.g., bucket 4 from the B2B mapping table of FIG. 27B that is stored in memory 807), processor 801 determines at block 2711 whether the data packet is addressed to the primary IP address or to the stand-by IP address. If the data packet is addressed to the primary IP address at block 2711, processor 801 transmits the data packet through the server interface to the current server/blade for the bucket (e.g., server/blade 1 having blade ID 1 corresponding to bucket ID 4 of the B2B mapping table of FIG. 27B). If the data packet is addressed to the stand-by IP address at block 2711, processor 801 transmits the data packet through the server interface to the new server/blade assigned to the bucket (e.g., server/blade 3 having blade ID 3 corresponding to bucket ID 4 of the B2B mapping table of FIG. 27B).

In embodiments of FIGS. 26A-C and 27A-B, the flow ID of an original HTTP data packet to the primary IP address as well as the flow ID of the redirected HTTP data packet to the standby IP address is the same even though the destination IP address has been changed. In this approach, all data packets are transmitted as a unicast transmissions to a single server/blade. Accordingly, the load balancer may not be required to store massive tables (e.g., having a size of the order of a number of connections).

Moreover, this approach may not be limited to a single transition. For example, consider mapping as Bucket 'x' changes from Blade A to Blade B and then changes again from Blade B to Blade C. In this case with two transitions, two a priori advertized stand-by IP addresses may be used. Server/blade A will respond with the HTTP redirect option with the first stand-by IP address for of any data packets of new flows that corresponds to Bucket 'x'. Load balancer will forward any packets from Bucket 'x' and are destined to first stand-by IP address to server/blade B whose ID will be stored in New Blade ID 1. At the same time, Bucket B will respond with HTTP redirect option with the second stand-by UP address for any data packets of new flows from Bucket 'x'. The load balancer will forward any packets from Bucket 'x' that are destined to the second stand-by IP address to server/blade C whose ID will be stored in New Blade ID 2. Server/blade C will process the new flows belonging to Bucket 'x'. Note that it is also possible that server/blade A sends the HTTP redirect option with the second stand-by IP address directly. These details may depend on corresponding control plane implementations. In summary, this approach can be generalized to any number of transitions lower than the number of available stand-by IP addresses. Moreover, this scenario may be different from each server/blade having its own IP address because of the resulting flexibility and dynamicity. In fact, it may be beneficial when a number of advertized IP addresses is smaller as compared to a number of servers/blades.

Control Plane Algorithm

In this section, control plane implementations are described. There are multiple viable ways in which the control plane may be implemented depending on the use case.

As discussed above with respect to FIGS. 23A-C, 24A-C, and 25A-C, a bucket enters the transient state from steady state when a New Blade ID corresponding to the bucket is added. Control plane operations may decide when the bucket can return from a current transient state to steady state. When a signal is received from the control plane indicating that the bucket is ready to return from a current transient state to a steady state, the New Blade ID replaces the original Blade ID in the B2B Mapping Table. HTTP redirect is no longer employed by the original Blade ID (since flows from the bucket in question will no longer be sent from the original Blade ID). The control plane may thus decide when is it reasonable that the original Blade ID is no longer needed.

In an ideal scenario, the original Blade ID is no longer needed when all existing flows belonging to the bucket that were mapped to the original Blade ID have ended. In other words, the original Blade ID for bucket 'x' is no longer needed when the number of connections on the original blade that correspond to bucket 'x' goes to zero. A requirement that all data flows to the original server/blade, however, may be an unnecessarily strict criterion. A few connections may be active for a very long time, connections may be inactive but kept open for a long time, and/or FIN/FINACKs can go missing. Under such scenarios, a bucket may be in the transient state for a relatively long time resulting in continued HTTP redirect processing and/or suboptimal routing for periods of time that may be longer than desired. Accordingly, mechanisms that provide reasonable criterion to conclude that an original Blade ID for the bucket is no longer needed may be desired.

Suitable implementations of the my-flows table may assist the control plane in making these decisions. A sample implementation of the my-flows table on every blade is discussed above with respect to FIGS. 16A and 16B. The heading "Timer" refers to the time at which a last data packet from the respective data flow was received. The servers/blades can also provide a consolidated version of the my-flows-table that may assist control plane decision making. As shown in FIG. 16B, the consolidated flows table is a grouped-by-bucket-ID version of the my-flows-table.

A criterion any/or criteria may thus be defined for a server/blade to reasonably conclude that the flow of data packets from the bucket is no longer significant. One or more of the following heuristics, for example, may be used:

A number of data flows corresponding to the bucket drops below a threshold. As discussed above, a number of flows dropping to zero may be an unnecessarily stringent criterion. A number of data flows reaching a near-zero number, however, might be good enough. Care should be taken, however, when employing this heuristic. For Bucket 2 in the consolidated flows table of FIG. 16B, for example, even though the number of data flows is relatively small (only 2), Bucket 2 may still corresponds to a significant data throughput.

A net bit-rate corresponding to the bucket dropping below a threshold may be a good reason to drop the existing flows corresponding to the bucket and release the bucket to a steady state.

A last packet received from any data flow to the bucket was a sufficiently long period of time ago. If the data flows corresponding to the bucket have been inactive for a sufficiently long period of time, the bucket may be released to the steady state without significant impact on performance.

Any combinations of the above and/or any other heuristics may also be used.

Appropriate control plane operations may be selected based on the use case. Whenever one or more (or combinations) of these criteria are met, the control plane may instruct the load balancer to replace original Blade ID for the bucket with the corresponding New Blade IDs and thereby release the bucket to the steady-state.

Additionally, a consolidated flows table can be created and maintained on/at the load balancer. The load balancer can keep track of a number of connections by incrementing or decrementing a connection counter(s) whenever it detects an outgoing SYN or FIN packet originating from one of the blades. Net bit-rates and/or last packets received of a bucket may be tracked in a similar manner. Operations/logic used to determine when to return a bucket to steady state are discussed above with respect to FIG. 22.

HTTP Redirect based approaches may provide reduced hit addition and/or removal of servers/blades.

HTTP redirect based approaches may provide increased uniformity.

Despite the fact that mapping between Flow IDs and Bucket IDs is static, the mapping between Bucket IDs and servers/blades can be changed dynamically to provide increased uniformity. This dynamic mapping may be applicable when a server/blade is added or removed, but dynamic mapping is not restricted to these use cases. For example, mechanism may be provided in which the load balancer maintains a uniformity index (e.g., a Jain's fairness index) at all times. If the uniformity index drops below a threshold, a reassignment of buckets to servers/blades may be initiated. Which buckets to reassign may depend on various parameters like number of flows corresponding to the bucket, bit-rate corresponding to the bucket, current load on the blades, blades on downtime and control parameters (such as when the last packet from the bucket was received). Approaches disclosed herein may enable a relatively smooth reassignment of buckets to servers/blades with reduced loss of data flows when such a reassignment takes place.

HTTP redirect based approaches may provide increased flow awareness, and/or HTTP redirect based approaches may support dynamicity of resources (servers/blades) by enabling addition/removal of resources (servers/blades) with reduced disruption of existing data flows.

Moreover, HTTP redirect based approaches may be implemented with relatively low complexity. With HTTP redirect base approaches, each data packet is unicast to only one server/blade. Accordingly, waste of backplane bandwidth may be reduced by reducing/eliminating multicasts of data packets to multiple servers/blades. Moreover, HTTP redirect based approaches may be implemented at the servers/blades without additional processing/operations other than responding to new data flows with an HTTP redirect option. Moreover, additional memory requirements at the load balancer and/or servers/blades may be reduced because additional flow tables may be reduced.

HTTP Redirect based approaches may work only for HTTP data traffic. Therefore, HTTP redirect based approaches may be of significant use in applications involving only HTTP traffic, but may not work for other types of application layer traffic. Because HTTP runs over TCP, HTTP redirect based approaches may only work for Type 1 data flows.

HTTP redirect is an application layer redirection method. Because the load balancer does not maintain a list of ongoing flows, every new flow from the bucket in transient state is first forwarded to the original blade which in turn forwards it to the appropriate server/blade via HTTP redirect. If the number of transitions (i.e., changes in the B2B table) and/or the number of flows are too large, significant overhead may occur at the load balancer site.

HTTP redirect based approaches may require use of Multiple IP addresses for the load balancer site. HTTP redirect based approaches discussed above may provide reduced hit support for one bucket-to-blade transition at a time using one additional IP address. If the blade corresponding to bucket changes multiple of times, additional IP addresses may be needed to support the additional transitions. Each of these IP addresses may need to be maintained at all times and advertized to the external network, thereby increasing cost. A maximum allowed number transitions per bucket may be limited to the number of stand-by IP addresses chosen.

HTTP redirect based approaches may result in multiple cascaded transients, and increased complexity of the control plane and/or an increased number of IP addresses may be needed to provide reduced hit support for data flows in the system.

Summary of Approaches

As discussed above, three different approaches may enable reduced hit addition and/or removal of servers/blades as well as reassignment of buckets to servers/blades.

Transient Multicast based Distributed Approaches may be based on the multicast of data packets that belong to a bucket in transient state. These approaches may provide a relatively low complexity load balancer without requiring significant/ huge tables, but efficiency of backplane bandwidth usage may be reduced and/or additional processing on the servers/blades may be required.

Transient Table based Approaches may be based on temporarily storing data flow IDs corresponding to a bucket in transient state. These approaches may provide increased efficiency of backplane bandwidth use without requiring additional processing on the servers/blades. Additional storage and/or computation on/at the load balancer, however, may result.

HTTP Redirect based Approaches may be based on HTTP redirect of unwanted new flows. HTTP redirect based approaches may provide increased efficiency of backplane bandwidth use without requiring additional table storage. HTTP redirect based approaches, however, may work only for HTTP traffic.

Sample Implementations and Embodiments

As discussed below, embodiments of load balancing frameworks disclosed herein may be adapted to different scenarios/applications/platforms.

Implementation on Multi-Application/Service Router (MASR) Platform (e.g., Ericsson's Smart Services Router SSR)

A Multi-Application/Service Router Platform is a Next Generation Router aimed at providing a relatively flexible, customizable, and high throughput platform for operators. An MASR platform may provide support for a number of applications, such as, B-RAS, L2/3 PE, Multi Service Proxy, Service Aware Support Node, GGSN+MPG (SGW, PGW of LTE/4G), etc.

Figure 28:
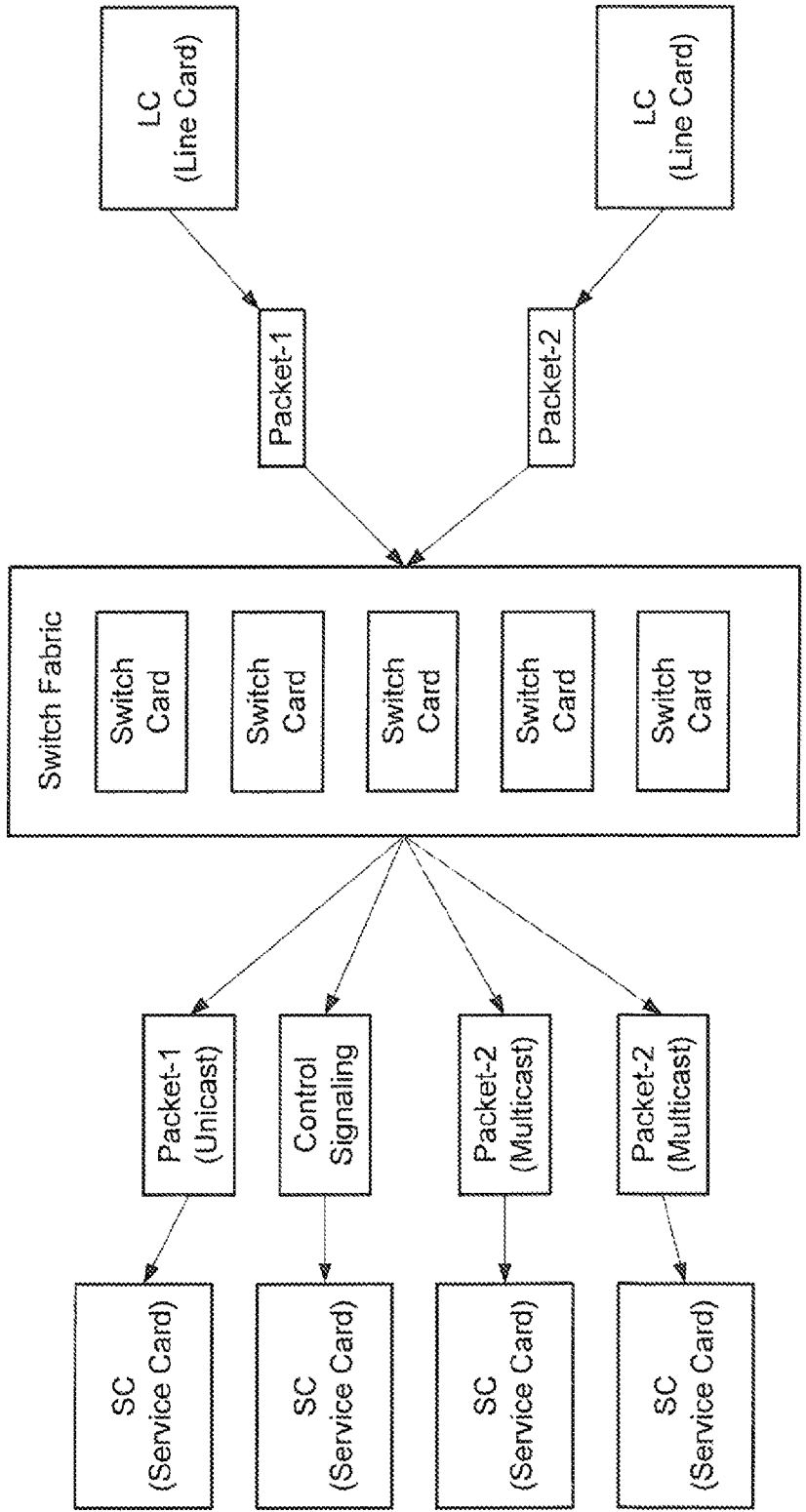
FIG. 28 is a block diagram illustrating a forwarding plane architecture as a load balancing site according to some embodiments.

An MASR architecture illustrated in FIG. 28 may include line cards (LCs or I/O cards) to make forwarding decisions (which correspond to load balancers of server load balancing sites discussed above), Service Cards SCs (e.g., Smart Service Cards SSCs according to some embodiments) to process application packets (which correspond servers/blades server load balancing sites discussed above), and switch cards with unicast/multicast/broadcast support (e.g. forming a backplane providing communication between the line cards and the SCs). As mentioned before, the cards (SC and LC) are interconnected through a switch fabric. The MASR platform may have other types of cards, but discussion thereof is not needed for the present disclosure.

As shown in FIG. 28, an MASR forwarding plane may provide a load balancing site. Line cards may act as load balancers, and Service Cards (SCs) may act as servers/blades. For example, an SC can act as a server to provide a service to an external UE (user equipment node), or an SC can act as a client seeking service from an external node like PCRF (Policy and Charging Rules Function). A line Card (LC) may forward data packets to one or more SCs for processing. Moreover, a line card may try to load balance between different SCs while forwarding the packets, but flow level granularity may need to be maintained. This is known as SC Traffic Steering.

Figure 5:
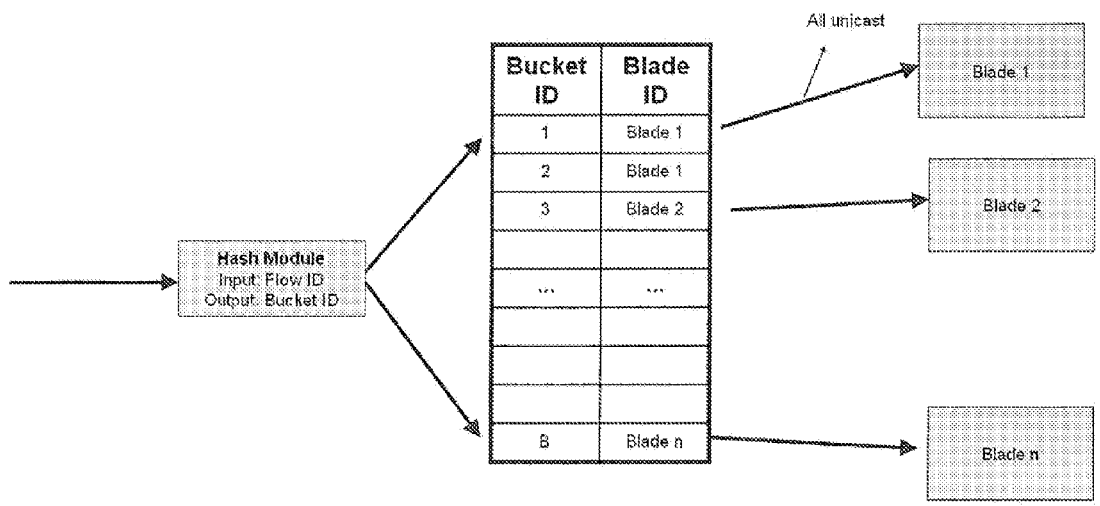
FIG. 5 is a block diagram illustrating a hash based implementation of a load balancing architecture.

SC Traffic Steering may follow a hash based implementation of a load balancer as discussed above, for example, with respect to FIG. 5. A server/blade may be a Service Card. Each service provided by an SC may be identified using a blade/server ID.

Transient multicast based distributed approaches and/or transient table based approaches, as discussed above, may be used in the context of MASR. In multicast based distributed approaches, line cards may unicast or multicast the data packets based on whether the bucket is in transient state. SC cards may have to do additional work to decide whether to process the packet or drop the packet. In transient table based approaches, the line card maintains an additional transient table corresponding to each bucket in transient state and forwards the packets according to operations discussed above. Similarly, for HTTP traffic, HTTP Redirect based approaches discussed above can also be used in the context of MASR.

Embodiments for CDN (Content Delivery Network) on MASR

CDN is a significant feature of MASR that may provide subscribers access to HTTP content without having to query an original host server for every subscriber. The MASR may have multiple SC cards dedicated to CDN and there may be a need for a load balancing mechanism within those CDN SCs. Approaches of embodiments disclosed herein may be applied to carry out load balancing between different CDN SCs. More specifically, the fact that CDN traffic is HTTP only may be used. Therefore, highly advantageous HTTP Redirect based approaches may be applied to perform load balancing for CDN traffic.

Embodiments for Multi-Application on MASR and Service Chaining

Figure 1:
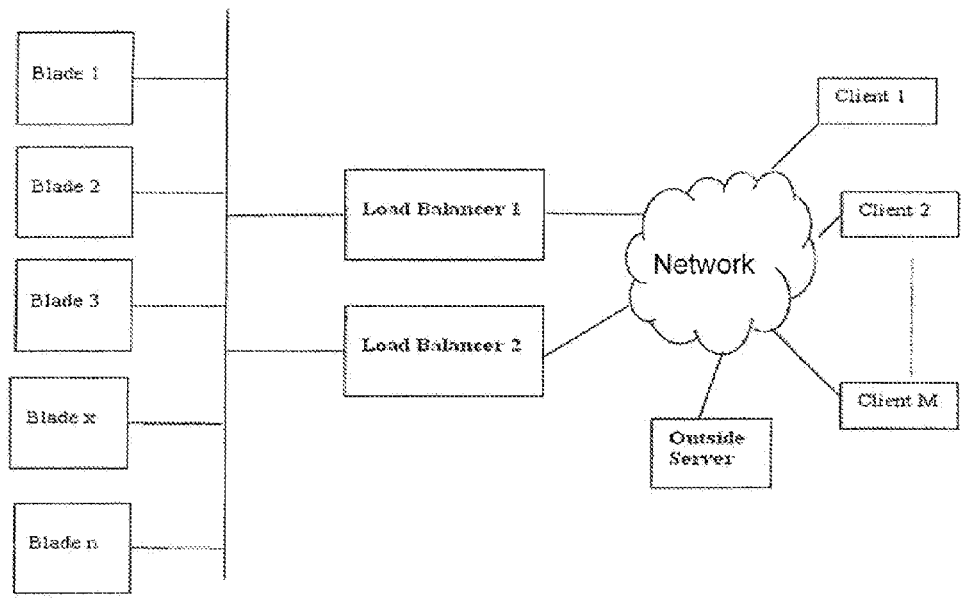
FIG. 1 is a block diagram illustrating a load balancing site including multiple blades and load balancers providing coupling to outside nodes through a network.
Figure 2:
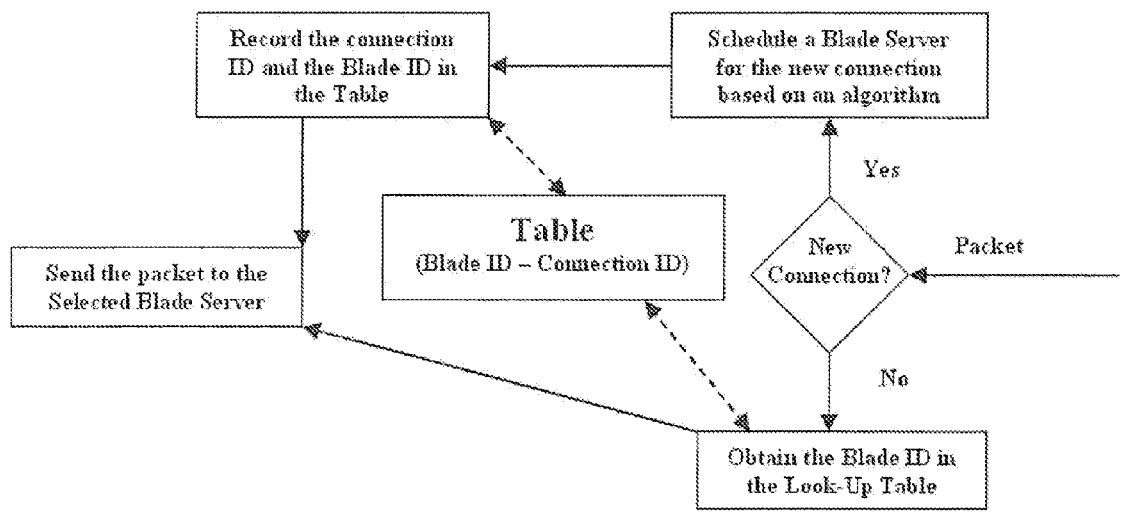
FIG. 2 is a flow chart illustrating operations of table Based Flow aware server load balancing.
Figures 3, 4:
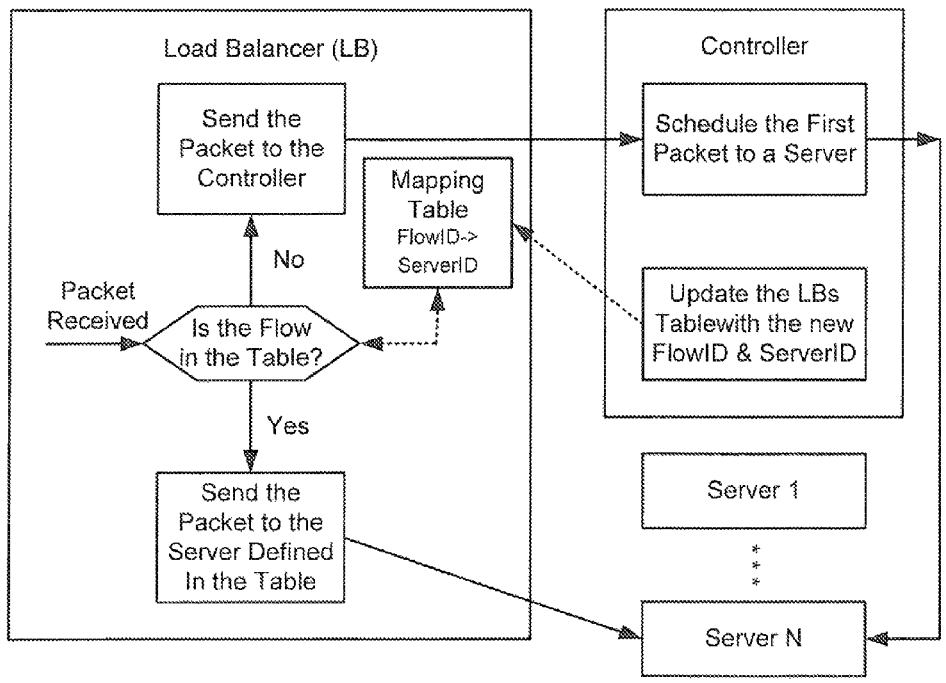
FIG. 3 is a flow chart illustrating load balancing with scheduling offload to a controller.
FIG. 4 is a table providing a summary of characteristics of stateful, stateless static, stateless per packet, and stateless protocol specific load balancing schemes.

Multiple Applications can be collocated at the same MASR chassis, causing certain qualifying traffic to travel to multiple applications/services within the same MASR. Thus an inter-SC load balancing may become necessary. Methods according to embodiments discussed above may cover all service chaining use cases, such that load balancing functionality may reside not only on/at the load balancer (e.g., an LC of an MASR) but also on the servers/blades as discussed above with respect to FIG. 1 (e.g. SC of MASR) where the traffic can not only be load balanced from load balancers (e.g., LCs) towards the servers/blades (e.g., SCs) but also from a server/blade (e.g., SC) to another server/blade (e.g., SC).

Load Balancing algorithms presented according to some embodiments of inventive concepts may have significant use cases for multi-application on MASR. Customers for CDN, TIC (Transparent Internet Caching), SASN (Service Aware Support Node), etc., are asking for a server load balancing which supports hitless ISSU (In Service Software Upgrade), hitless In service addition, and removal of Servers/SCs. Customers are interested in flexible, uniform load balancing that provides overall protection. At the same time, methods employed should desirably have low complexity, low cost, and/or low TTM (Time to Market). As discussed above, these may be advantages of some embodiments disclosed herein with respect to mechanisms used on MASR. While stateful methods for server load balancing, when implemented on a line card, may be expected to have performance issues with large state tables, embodiments disclosed herein may have reduced complexity, reduced costs, and/or increased performance. In addition, features such as energy efficient server load balancing can be performed by setting some of the servers in a sleep mode more gracefully (e.g., hitless or with reduced hits) when the load is not high.

A traffic flow may need to visit multiple servers at the same load balancing site, for example, if there are multiple services in the same load balancing site, each with multiple servers. In this case, when the traffic goes out from one of the service/server cards, the traffic may need to be load balanced again over the next service cards. In this respect, individual servers may also have a load balancer inside to perform similar load balancing as that done at the load balancer of the load balancing site.

Embodiments on Policy Based Forwarding (PBF/ACL) and Software Defined Networking Rule (SDN) Based Mechanisms.

SDN refers to separation of the control plane and the data plane where the data plane includes only a set of forwarding rules instructed by the central control plane. ACL/PBF also similarly has a control plane which sets up the set of simple forwarding rules.

In ACL/PBF, stateless hash based server load balancing may be provided using policy based forwarding (PBF) and/or Access Control List (ACL) and/or Software Defined Networking (SDN). Basically, legacy ACL/PBF/SDN data plane rules match a certain set of bits of the flow IDs (e.g., Source IP, Destination IP, Source/Destination Port, etc.) and map them statically to the servers/blades.

Transient Multicast/Broadcast Based Distributed Methods Via ACL/PBF/SDN

Assuming a set of SDN/ACL/PBF rules are set via an intelligent control plane realizing a stateless hash based server load balancing, each bucket in the B2B table may be realized using an ACL/PBF/SDN rule. The action associated with each rule can be switched (e.g., by the intelligent control plane) between unicast and multicast forwarding action (e.g., sending the matching packet to a single or to multiple destinations/servers/blades) depending on whether the rule/bucket is in steady or transient state respectively. As used herein, SDN means software defined networking, ACL means access control list, and PBF means policy based forwarding.

Figure 29:
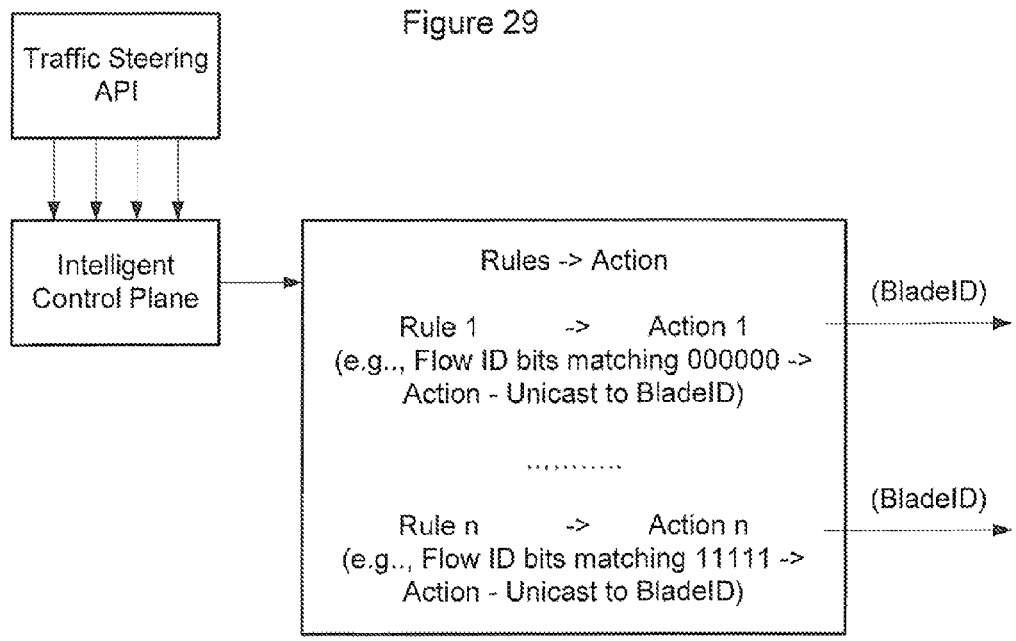
FIG. 29 is a block diagram illustrating some embodiments with all the buckets in steady state and all data packets being unicast for ACL/PBF/SDN (where ACL means access control listing, PBF means policy based forwarding, and SDN means software defined networking)
Figure 30:
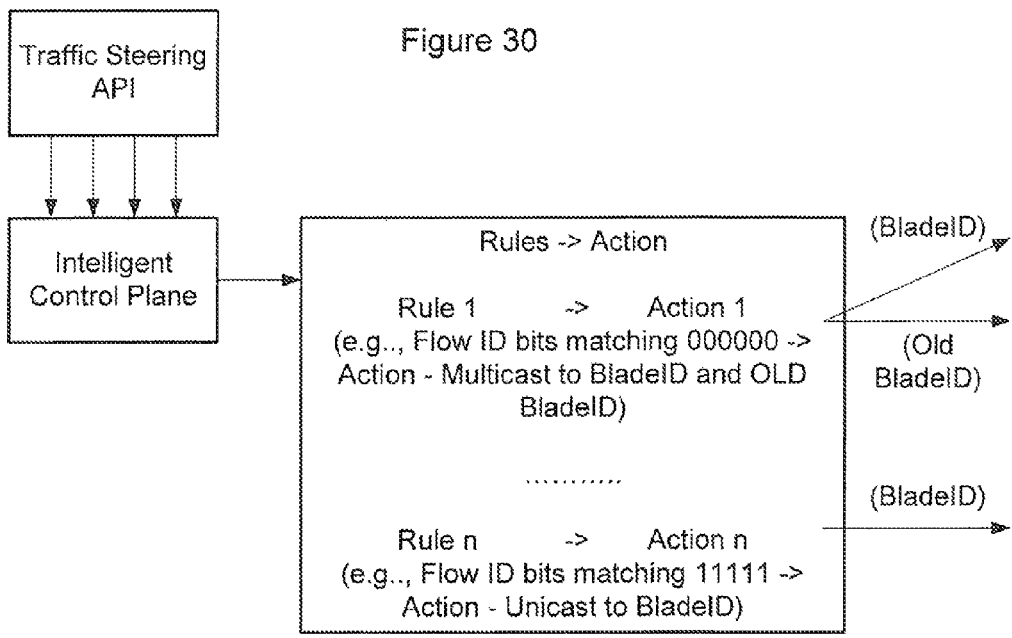
FIG. 30 is a block diagram illustrating some embodiments with a bucket/rule in transient state in transient state and corresponding data packets being multicast for ACL/PBF/SDN.

As an example of a load balancer and/or line card implementation, in FIGS. 29 and 30, load balancer operations of FIG. 14A are shown as provided by ACL/PBF/SDN. (Similarly, operations of FIG. 12A may can be implemented.) FIG. 29 illustrates an embodiment of a stateless SLB (server load balancing) using a set of rules. As shown in the embodiment of FIG. 29, all the rules/buckets may be in steady state in the sense that there is only unicast traffic forwarding action.

FIG. 30 illustrates an embodiment where the control plane decided to reassign the traffic (or at least the new traffic) associated with rule 1 from the OLD Blade to a NEW blade. At that time, the action of rule one is changed from unicast to multicast, such that rule 1 sends the traffic to both the current OLD blade as well as the NEW blade. Operations on the server(s)/blade(s) may stay the same and do not need to be changed. When all the connections/flows of the OLD blade associated with Rule 1 are finished/terminated/completed, then the multicast action of Rule 1 is switched back to Unicast with the destination as the New Blade ID.

Transient Table Based Approach via ACL/PBF/SDN

Figure 31:
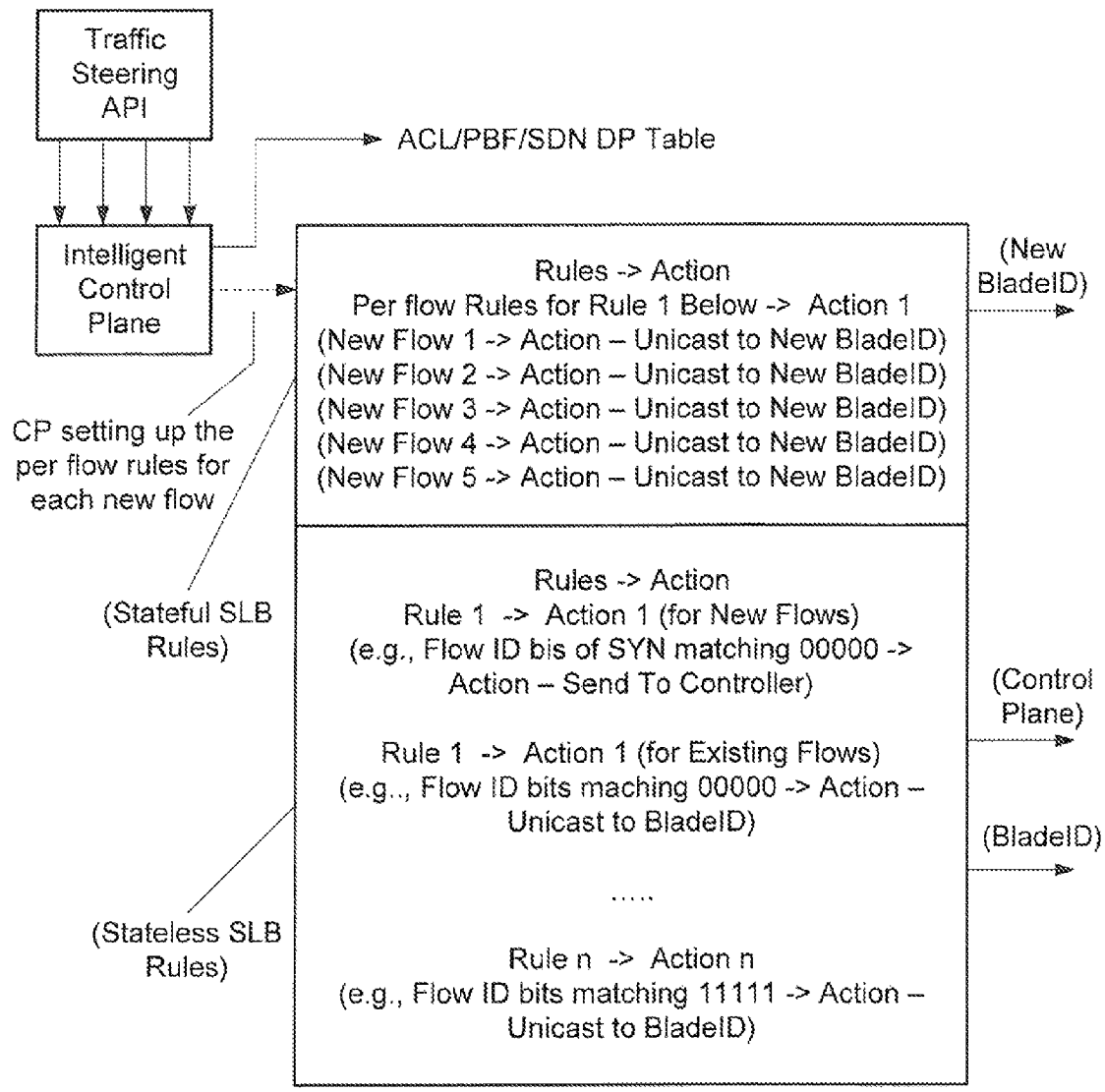
FIG. 31 is a block diagram illustrating some embodiments with a transient table and/or rules for ACL/PBF/SDN.

FIG. 29 may still apply for a steady state case where the traffic is load balanced over multiple static rules/buckets towards the blades/servers. FIG. 31 illustrates Transient Table and/or Rules for ACL/PBF/SDN according to some embodiments where the traffic to the first rule is to be reassigned to another server/blade. To achieve this in an SDN/ACL/PBF environment, the control plane may add an additional rule to the stateless side of the rules to send the initial packets of the new flows (e.g., SYN packets of the TCP traffic) to itself (i.e., the control plane, such as an OFC open flow controller). Then as the new connections/flows arrive, the control plane sets up rules per flow (which are called as stateful SLB rules in the figure) to send the new connections to the new blade. When all the old connections of the old blade are finished/terminated, then the control plane removes all the per flow (e.g., stateful) rules and removes the rule identifying the initial packets (SYN) and changes the blade ID of the original stateless rule (i.e., Rule 1's) destination to the new blade.

HTTP Redirect Method Via ACL/PBF/SDN

As can be seen from the previous two embodiments, HTTP redirect operations discussed above may be realized in an SDN/ACL/PBF environment.

Adapting to Elephant and Mice Flow Model

A significant volume of traffic in many networks (including the Internet) can be attributed to a relatively small number of data flows, known as Elephant flows. Other flows which are relatively large in number, may each consume relatively little bandwidth, and are known as Mice flows. For example, at least one study has shown that in a traffic trace, about 0.02% of all flows contributed more than 59.3% of the total traffic volume. See, Tatsuya et al., "Identifying elephant flows through periodically sampled packets," Proceedings of the 4th ACM SIGCOMM conference on Internet Measurement (IMC 2004), NY, N.Y., USA, 115-120. Some embodiments disclosed herein may be adapt a load balancer framework to an Elephant and Mice flow model case. A hybrid model, for example, may combine multicast based distributed approaches and transient table based approaches.

In such a hybrid model, transient table based operations may be performed for elephant flows while multicast based distributed approach operations may be performed for the mice flows. Elephant flows are relatively low in number but high in bandwidth. Accordingly, it may be easier to maintain elephant data flows in the transient table while relatively expensive to multicast them to multiple servers. Mice flows are relatively high in number. Accordingly, it may be relatively expensive to maintain a list of mice flows in the transient table but reasonable to multicast mice flows to multiple servers since they do not consume significant bandwidth. Note that this hybrid model is discussed here with respect to type 1 flows, and that concepts of a transient table may not work for type-2 flows. Details of the hybrid method are discussed below.

Operations of the hybrid method at the load balancer will now be discussed.

In the Transient Table based Approach, the load balancer maintains a table of new data flows for each bucket in the transient state (i.e., data flows that are created after the bucket enters the transient state). In this hybrid model, however, the load balancer will only maintain a list of elephant flows that are created after the bucket enters the transient state.

When a data packet arrives, the load balancer performs the hash function to determine the bucket for the data packet. If the data packet corresponds to a bucket in steady-state or is an INIT data packet of a new data flow, the packet is forwarded to the corresponding current blade. If the data packet is a non-initial data packet that corresponds to the bucket in the transient state, the load balancer checks if the packet is in the list of elephant flows corresponding to the bucket in the transient state. If the non-initial data packet is part of a data flow included in the list of elephant data flows, the load balancer forwards the data packet to the current blade. If the non-initial data packet is not part of a data flow included in the list of elephant flows, the load balancer assumes the data packet is a mice flow and multicasts the data packet to both current and old blades.

Operations of the hybrid method at the server(s)/blade(s) will now be discussed. As a packet arrives at a server/blade, the server/blade processes the data packet if the packet is unicast to the blade, and if the data packet is an INIT data packet of a new data flow, the server/blade records it in the "my-flows table". If the data packet is received as a multicast, the server/blade checks if the packet belongs to its "my-flows table". If yes, then the server/blade processes the packet, and if not, the server/blade drops the packet.

In addition, the servers/blades may also try to estimate whether a flow is an Elephant flow or a Mice flow. Identification of Elephant flows may already be an active research area and there may exist mechanisms by which such estimations may be performed. See, Tatsuya et al., "Identifying elephant flows through periodically sampled packets," Proceedings of the 4th ACM SIGCOMM conference on Internet Measurement (IMC 2004), NY, N.Y., USA, 115-120; and Yi Lu, et al., "ElephantTrap: A low cost device for identifying large flows," High-Performance Interconnects, Symposium on, pp. 99-108, 15th Annual IEEE Symposium on High-Performance Interconnects (HOTI 2007), 2007. Once a server/blade classifies a data flow as an Elephant flow, the server/blade instructs the Load Balancer to add the Flow ID and its Blade ID to the Elephant Flow table corresponding to the transient state group. Detection of elephant flows may thus occur at the blades/servers.

The assumption here is that when a packet arrives at the load balancer, if the data packet does not belong to any flow in the elephant flow table of the load balancer, then the data packet is automatically considered as a mice flow, and the load balancer multicasts data packet of the mice flow. Then the servers/blades decide whether to process or drop the data packet based on operations described above and elephant/mice detection is also performed at the server/blade which accepted the flow. If the flow is detected as a mice flow, there is no need for further action. However, if the flow is detected as an elephant flow, then the blade/server in question manipulates the elephant flow table and from that time on, the load balancer switches to unicasting the packets belonging to that flow.

There may be advantages of this hybrid method. Since elephant flows are not multicast to multiple servers, more efficient bandwidth utilization may be provided. Only data packets of mice flows (which correspond to a relatively small fraction of the load) are sent using multicast transmissions. Therefore, this hybrid strategy may save bandwidth. Similarly, all flows are not maintained in the transient table. Only elephant flows (which are relatively small in number) are maintained in the transient table. In other words, only a relatively small amount of information is saved in the transient table on/at the load balancer. In essence, this hybrid method may combine positive elements from multicast based distributed approaches and from transient table based approaches.

In the above-description of various embodiments of the present inventive concepts, it is to be understood that the terminology used herein is for the purpose of describing particular embodiments only and is not intended to be limiting of inventive concepts. Unless otherwise defined, all terms (including technical and scientific terms) used herein have the same meaning as commonly understood by one of ordinary skill in the art to which the present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of present inventive concepts. All such variations and modifications are intended to be included herein within the scope of present inventive concepts. Accordingly, the above disclosed subject matter is to be considered illustrative, and not restrictive, and the appended claims are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the following claims and their equivalents, and shall not be restricted or limited by the foregoing detailed description. Any reference numbers in the claims are provided only to identify examples of elements and/or operations from embodiments of the figures/specification without limiting the claims to any particular elements, operations, and/or embodiments of any such reference numbers.

That which is claimed is:

1. A method of forwarding data packets from a load balancer to a plurality of servers, the method comprising:
   receiving a first data packet of a data flow wherein the first data packet is addressed to a primary address for the load balancer and wherein the first data packet includes information for the data flow;
   computing a bucket ID for the first data packet as a function of the information for the data flow;
   responsive to the bucket ID for the first data packet mapping to first and second servers of the plurality of servers and responsive to the first data packet being addressed to the primary address for the load balancer, transmitting the first data packet to the first server;
   receiving a second data packet of the data flow wherein the second data packet is addressed to a stand-by address for the load balancer and wherein the second data packet includes the information for the data flow;
   computing a bucket ID for the second data packet as a function of the information for the data flow wherein the bucket IDs for the first and second packets are the same bucket ID;
   responsive to the bucket ID for the second data packet mapping to first and second servers of the plurality of servers and responsive to the second data packet being addressed to the stand-by address for the load balancer, transmitting the second data packet to the second server.

2. The method of claim 1 wherein the data flow is a first data flow and wherein the bucket ID for the first and second data packets is a first bucket ID, the method further comprising:
   receiving a third data packet of a second data flow wherein the third data packet is addressed to a primary address for the load balancer and wherein the third data packet includes information for the second data flow;
   computing a second bucket ID for the third data packet as a function of the information for the second data flow; and
   responsive to the second bucket ID for the third data packet mapping only to a third server of the plurality of servers, transmitting the third data packet to the third server.

3. The method of claim 2 further comprising:
   before receiving the first, second, and third data packets, defining a mapping table including a plurality of bucket identifications (IDs) identifying a respective plurality of buckets, wherein the mapping table maps the first bucket ID to the first server as a current server for the first bucket ID, wherein the mapping table maps the first bucket ID to the second server as a new server for the first bucket ID, and wherein the mapping table maps the second bucket ID to only the third server as a current server for the second bucket ID.

4. The method of claim 3 further comprising:
   after transmitting the first, second, and third data packets, revising the mapping table so that the mapping table maps the first bucket ID only to the second server as a current server for the first bucket ID, and wherein the mapping table maps the second bucket ID to only the third server as a current server for the second bucket ID.

5. The method of claim 4 further comprising:
   after revising the mapping table, receiving a fourth data packet wherein the fourth data packet is addressed to the primary address for the load balancer and wherein the fourth data packet includes information for the first data flow;
   computing the first bucket ID for the fourth data packet as a function of the information for the first data flow; and
   responsive to the first bucket ID for the fourth data packet mapping only to the second server of the plurality of servers, transmitting the fourth data packet to the second server.

6. The method of claim 1 wherein the primary address comprises a primary Internet Protocol (IP) address for the load balancer, and wherein the stand-by address comprises a stand-by Internet Protocol (IP) address for the load balancer.

7. The method of claim 1 wherein computing the bucket ID for the first data packet comprises performing a hash function on the information for the data flow.

8. The method of claim 7 wherein the information for the data flow includes a data flow identification (ID) for the data flow, and wherein performing the hash function comprises performing the hash function on the data flow ID.

9. A load balancer configured to forward data packets to a plurality of servers, the load balancer comprising:
   a network interface configured to receive data packets from an outside network;
   a server interface configured to forward data packets to the servers;
   a processor coupled to the network interface and the server interface, the processor being configured to,
   receive a first data packet of a data flow through the network interface wherein the first data packet is addressed to a primary address for the load balancer and wherein the first data packet includes information for the data flow,
   compute a bucket ID for the first data packet as a function of the information for the data flow, transmitting the first data packet through the server interface to the first server responsive to the bucket ID for the first data packet mapping to first and second servers of the plurality of servers and responsive to the first data packet being addressed to the primary address for the load balancer, receive a second data packet of the data flow through the network interface wherein the second data packet is addressed to a stand-by address for the load balancer and wherein the second data packet includes the information for the data flow, compute a bucket ID for the second data packet as a function of the information for the data flow wherein the bucket IDs for the first and second packets are the same bucket ID, and transmit the second data packet through the server interface to the second server responsive to the bucket ID for the second data packet mapping to first and second servers of the plurality of servers and responsive to the second data packet being addressed to the stand-by address for the load balancer.

10. The load balancer of claim 9 wherein the data flow is a first data flow and wherein the bucket ID for the first and second data packets is a first bucket ID, and wherein the processor is further configured to, receive a third data packet through the network interface wherein the third data packet is addressed to the primary address for the load balancer and wherein the third data packet includes information for a second data flow, compute a second bucket ID for the third data packet as a function of the information for the second data flow, and transmit the third data packet to a third server responsive to the second bucket ID for the third data packet mapping only to the third server of the plurality of servers.

11. The load balancer of claim 10 further comprising;

memory coupled to the processor, wherein before receiving the first, second, and third data packets, the memory is configured to define a mapping table including a plurality of bucket identifications (IDs) identifying a respective plurality of buckets, wherein the mapping table maps the first bucket ID to the first server as a current server for the first bucket ID, wherein the mapping table maps the first bucket ID to the second server as a new server for the first bucket ID, and wherein the mapping table maps the second bucket ID to only the third server as a current server for the second bucket ID.

12. A method of receiving data from a load balancer at a server, the method comprising:

defining a server flow table for the server, the server flow table including data flow identifications for data flows being processed by the server;

receiving a data packet of a data flow at the server from the load balancer wherein the data packet includes information for the data flow;

responsive to a data flow identification of the data flow being omitted from server flow table, computing a bucket identification (ID) for the data packet as a function of the information for the data flow;

responsive to the bucket ID for the data packet mapping to only the first server, adding a data flow identification for the data flow to the server flow table; and responsive to the bucket ID for the data packet mapping to only the first server, processing the data packet.

13. The method of claim 12 wherein the data packet comprises a first data packet, and wherein the data flow comprises a first data flow, the method further comprising:

after adding the data flow identification for the first data flow to the server flow table, receiving a second data packet of a second data flow at the server from the load balancer wherein the second data packet includes information for the second data flow;

responsive to a second data flow identification of the data flow being omitted from server flow table, computing a bucket identification (ID) for the second data packet as a function of the information for the second data flow, wherein the first and second data flows are different and wherein the bucket identifications for the first and second packets are the same;

responsive to the bucket ID for the first and second data packets mapping to the first server and to a second server and responsive to the bucket ID being mapped to the first server before being mapped to the second server, transmitting a redirect request associated with a stand-by address; and responsive to the bucket ID for the first and second data packets mapping to the first and second servers and responsive to the bucket ID being mapped to the first server before being mapped to the second server, dropping the second data packet.

14. The method of claim 13 wherein the stand-by address comprises a stand-by Internet Protocol (IP) address and wherein transmitting the redirect request comprises transmitting a Hypertext Transfer Protocol (HTTP) redirect request including the stand-by IP address.

15. The method of claim 13 wherein the second data packet originated from a client device, and wherein transmitting the redirect request comprises transmitting the redirect request associated with the stand-by address to the client device.

16. The method of claim 12 wherein the data packet comprises a first data packet, and wherein the data flow comprises a first data flow, the method further comprising:

receiving a second data packet of a second data flow at the server from the load balancer wherein the second data packet includes information for the second data flow;

responsive to a second data flow identification of the data flow being omitted from server flow table, computing a bucket identification (ID) for the second data packet as a function of the information for the second data flow, wherein the first and second data flows are different and wherein the bucket identifications for the first and second packets are the same;

responsive to the bucket ID for the second data packet mapping to the first server and to a second server and responsive to the bucket ID being mapped to the second server before being mapped to the first server, adding a data flow identification for the second data flow to the server flow table; and responsive to the bucket ID for the second data packet mapping to the first server and to a second server and responsive to the bucket ID being mapped to the second server before being mapped to the first server, processing the second data packet.

17. The method of claim 12 wherein the data packet is a first data packet, and wherein the data flow is a first data flow, the method further comprising:

receiving a second data packet of a second data flow at the first server from the load balancer wherein the second data packet includes information for the second data flow; and responsive to a data flow identification of the second data flow being included in the list of data flow identifications for data flows being processed by the first server, processing the second data packet at the first server.

18. The method of claim 12 wherein computing the bucket ID for the data packet comprises performing a hash function on the information for the data flow.

19. The method of claim 18 wherein the information for the data flow includes the data flow identification (ID) for the data flow, and wherein performing the hash function comprises performing the hash function on the data flow ID.

20. A server configured to process data packets, the server comprising:
- a load balancer interface configured to received data packets from a load balancer;
- a memory configured to store a server flow table for the server, the server flow table including data flow identifications for data flows being processed by the server; and
- a processor coupled to the load balancer interface and to the memory, wherein the processor is configured to,
- receive a data packet of a data flow through the load balancer interface from the load balancer wherein the data packet includes information for the data flow,
- compute a bucket identification (ID) for the data packet as a function of the information for the data flow, responsive to a data flow identification of the data flow being omitted from server flow table,
- add a data flow identification for the data flow to the server flow table responsive to the bucket ID for the data packet mapping to only the first server, and
- process the data packet responsive to the bucket ID for the data packet mapping to only the first server.

21. The server of claim 20 wherein the data packet comprises a first data packet, wherein the data flow comprises a first data flow, and wherein the processor is further configured to,
- receive a second data packet of a second data flow through the load balancer interface from the load balancer wherein the second data packet includes information for the second data flow after adding the data flow identification for the first data flow to the server flow table,
- compute a bucket identification (ID) for the second data packet as a function of the information for the second data flow responsive to a second data flow identification of the data flow being omitted from server flow table, wherein the first and second data flows are different and wherein the bucket identifications for the first and second packets are the same,
- transmit a redirect request associated with a stand-by address responsive to the bucket ID for the first and second data packets mapping to the first server and to a second server and responsive to the bucket ID being mapped to the first server before being mapped to the second server, and
- drop the second data packet responsive to the bucket ID for the first and second data packets mapping to the first and second servers and responsive to the bucket ID being mapped to the first server before being mapped to the second server.

* * * * *

UNITED STATES PATENT AND TRADEMARK OFFICE
CERTIFICATE OF CORRECTION

| | | |
|---|---|---|
| PATENT NO. | : 9,137,165 B2 | Page 1 of 1 |
| APPLICATION NO. | : 13/919411 | |
| DATED | : September 15, 2015 | |
| INVENTOR(S) | : Anand et al. | |

It is certified that error appears in the above-identified patent and that said Letters Patent is hereby corrected as shown below:

In the specification

In Column 17, Line 4, delete "51" and insert -- S1 --, therefor.

In Column 23, Line 7, delete "FIGS. 1409 and 1411," and insert -- FIGS. 14A and 14B, --, therefor.

Signed and Sealed this
Fifteenth Day of March, 2016

Michelle K. Lee
*Director of the United States Patent and Trademark Office*